(12) United States Patent
Kobayashi et al.

(10) Patent No.: US 7,913,072 B2
(45) Date of Patent: Mar. 22, 2011

(54) INFORMATION-PROCESSING APPARATUS AND ACTIVATION METHOD THEREOF

(75) Inventors: Kiyokazu Kobayashi, Nagano (JP); Kenichi Hashimoto, Nagano (JP); Tatsuo Hase, Nagano (JP)

(73) Assignee: Sony Corporation, Tokyo (JP)

( * ) Notice: Subject to any disclaimer, the term of this patent is extended or adjusted under 35 U.S.C. 154(b) by 739 days.

(21) Appl. No.: 11/675,796

(22) Filed: Feb. 16, 2007

(65) Prior Publication Data

US 2007/0220490 A1    Sep. 20, 2007

(30) Foreign Application Priority Data

Mar. 14, 2006   (JP) ................................ 2006-069734

(51) Int. Cl.
  *G06F 9/00*   (2006.01)
  *G06F 15/177*   (2006.01)
(52) U.S. Cl. ................. 713/2; 713/1; 713/100
(58) Field of Classification Search .............. 713/1, 2, 713/100
  See application file for complete search history.

(56) References Cited

U.S. PATENT DOCUMENTS

| | | | |
|---|---|---|---|
| 5,751,985 A * | 5/1998 | Shen et al. ............ | 712/218 |
| 7,376,860 B2 * | 5/2008 | Jia et al. ............... | 714/5 |
| 2002/0099933 A1 * | 7/2002 | Nevill et al. .......... | 712/228 |
| 2004/0216125 A1 * | 10/2004 | Gazda et al. ........... | 719/310 |
| 2005/0050339 A1 * | 3/2005 | Himmel et al. ........ | 713/189 |
| 2006/0143512 A1 * | 6/2006 | Jia et al. ............... | 714/13 |
| 2007/0005949 A1 * | 1/2007 | Ho et al. ............... | 713/2 |
| 2008/0216089 A1 * | 9/2008 | Jia et al. ............... | 719/312 |

FOREIGN PATENT DOCUMENTS

| | | |
|---|---|---|
| JP | 03-078812 | 4/1991 |
| JP | 06-051858 | 2/1994 |
| JP | 07-219753 | 8/1995 |
| JP | 07-244536 | 9/1995 |
| JP | 07-271561 | 10/1995 |
| JP | 08-161263 | 6/1996 |
| JP | 11-328137 | 11/1999 |
| JP | 11-353048 | 12/1999 |
| JP | 2001-067136 | 3/2001 |
| JP | 2003-198614 | 7/2003 |
| JP | 2005-149225 | 6/2005 |
| JP | 2005-174130 | 6/2005 |

OTHER PUBLICATIONS

U.S. Appl. No. 11/753,100, filed May 24, 2007, Hase, et al.

* cited by examiner

*Primary Examiner* — Thomas Lee
*Assistant Examiner* — Jaweed A Abbaszadeh
(74) *Attorney, Agent, or Firm* — Oblon, Spivak, McClelland, Maier & Neustadt, L.L.P.

(57) ABSTRACT

Disclosed herein is an information-processing apparatus which includes: a computer; an execution-state holding unit configured to hold an execution state of a program executed by the computer; and a return-point setting unit configured to set an execution point of the program, which is to be restored after activation of the information-processing apparatus, prior to the activation. The apparatus further includes an execution-state saving unit configured to save an execution state, which is held by the execution-state holding unit as a program execution state at an execution point set by the return-point setting unit as the execution point of the program to be restored after the activation, prior to the activation; and an execution-state transfer unit configured to transfer the execution state saved by the execution-state saving unit to the execution-state holding unit at an activation time.

13 Claims, 34 Drawing Sheets

INFORMATION-PROCESSING APPARATUS AND ACTIVATION METHOD THEREOF

CROSS REFERENCES TO RELATED APPLICATIONS

The present invention contains subject matter related to Japanese Patent Application JP 2006-069734, filed in the Japanese Patent Office on Mar. 14, 2006, the entire contents of which being incorporated herein by reference.

BACKGROUND OF THE INVENTION

1. Field of the Invention

The present invention relates to an information-processing apparatus. More particularly, the present invention relates to an information-processing apparatus that can be activated in a short period of time, an activation method adopted by the information-processing apparatus and a program to be executed by a computer of the information-processing apparatus to implement the activation method.

2. Description of the Related Art

An operating system of a computer is a basic program that treats hardware of the computer as an abstract entity and provides an operating environment to application programs running on the hardware. When the power-supply switch of an information-processing apparatus is turned on, a boot loader loads the kernel of the operating system into the hardware in order to activate the operating system. The functions of recent operating systems are enhanced, prolonging the time it takes to activate the operating system. A typical length of the time it takes to activate the operating system is about several tens of seconds.

In order to activate the operating system in a short period of time, a variety of techniques have been tried so far. In accordance with a typical disclosed technique, right after a power-supply plug is inserted into a power-supply outlet, the kernel of the operating system is loaded into a memory in order to carry out an expansion process in advance. Then, when the power-supply switch is turned on, the kernel of the operating system is executed on the memory in a short period of time. For more information, refer to FIG. 1 included in Japanese Patent Laid-open No. 2005-149225.

SUMMARY OF THE INVENTION

In the conventional technology described above, the time it takes to load an OS can be shortened but the time it takes to execute the operating system remains long as before.

In addition, when the operating system is activated after the power-supply switch of the information-processing apparatus executing the operating system is turned on, the execution point of a program to be restored may change in some cases in accordance with the property of the information-processing apparatus. It is thus desirable to be capable of setting any arbitrary execution point of a arbitrary program.

Addressing the problems described above, inventors of the present invention have innovated an activation method whereby, right after the operating system is activated, an execution point of a program to be restored can be set so that the program can be restored in a short period of time at the activation time.

In order to solve the problems described above, in accordance with a first embodiment of the present invention, there is provided an information-processing apparatus having a computer and an execution-state holding unit configured to hold the execution state of a program executed by the computer. The information-processing apparatus further includes: a return-point setting unit configured to set an execution point of a program, which is to be restored after activation of the information-processing apparatus, prior to the activation; and an execution-state saving unit configured to save an execution state, which is held by the execution-state holding unit as a program execution state at an execution point set by the return-point setting unit as the execution point of the program to be restored after the activation, prior to the activation. The apparatus still further includes an execution-state transfer unit configured to transfer the execution state saved by the execution-state saving unit to the execution-state holding unit at an activation time. Thus, the present invention brings about an effect of a capability of restoring the execution state of a program executed at an execution point set in advance as an execution point of the program in a short period of time.

It is to be noted that the execution state cited above includes contents of each register employed in the information-processing apparatus and data stored in a memory managed by the operating system executed in the information-processing apparatus. The registers, the contents of which are included in the execution state, vary from processor to processor. Nevertheless, the registers include general registers of the CPU, a timer register, a UART register, a clock controller register, an interrupt controller register, a GPIO register and a CPU special register.

In addition, in accordance with the first embodiment of the present invention, the return-point setting unit is capable of setting an execution point of a program, which is executed when a predetermined operation is carried out, as a program execution point to which the program is to be restored after the activation. For example, the return-point setting unit is capable of setting an execution point of a program, which is executed when a switch button is directly operated by the user, as a program execution point to which the program is to be restored after the activation. An example of a switch button, which can be directly operated by the user, is snapshot switch.

On top of that, in accordance with the first embodiment of the present invention, the execution-state saving unit can be provided with a non-volatile memory. Thus, the information-processing apparatus brings about an effect that the saved execution state can be sustained even after the power supply is turned off.

Furthermore, in accordance with the first embodiment of the present invention, the information-processing apparatus can be further provided with a callback function registration unit configured to register a callback function to be executed at a program execution point set by the return-point setting unit or at an activation time. Thus, the information-processing apparatus brings about an effect of being capable of executing a callback function registered in advance by using a return of execution control to an execution point set as a return point or an activation as a trigger.

Moreover, in accordance with the first embodiment of the present invention, the information-processing apparatus can be further provided with an activation-mode setting unit configured to set one activation mode selected from N activation modes, where N is an integer at least equal to 2, as a mode to be adopted at an activation time of the information-processing apparatus. In this case, the execution-state saving unit saves N execution states held by the execution-state holding unit and the execution-state transfer unit transfers an execution state selected from the N execution states saved by the execution-state saving unit in accordance with the activation mode set by the activation-mode setting unit to the execution-state holding unit. The information-processing apparatus brings about an effect of a capability of selecting one of the N execution states saved in advance at an activation time and carrying out the selected process in a short period of time.

In addition, in accordance with the first embodiment of the present invention, the information-processing apparatus can be further provided with: an activation-mode setting unit configured to set one activation mode selected from N activation modes, where N is an integer at least equal to 2, as a mode to be adopted at an activation time of the information-processing apparatus; and an activation process unit configured to select one activation process from N activation processes set in advance in accordance with the activation mode set by the activation-mode setting unit and carry out the selected process. Thus, the information-processing apparatus brings about an effect of a capability of selecting one of the N processes set in advance at an activation time and carrying out the selected process in a short period of time.

In accordance with a second embodiment of the present invention, there is provided an information-processing apparatus having a computer and an execution-state holding unit configured to hold the execution state of a program executed by the computer. The information-processing apparatus further includes: a return-point setting unit configured to set the execution point of a program, which is to be restored after activation of the information-processing apparatus, prior to the activation; and an execution-state saving unit configured to save an execution state, which is held by the execution-state holding unit as a program execution state at an execution point set by the return-point setting unit as the execution point of the program to be restored after the activation, prior to the activation. Thus, the present invention brings about an effect of a capability of saving an execution state, which exists at an execution point as the execution state of a program to be restored and is to be used as the execution state for restoring the program in a short period of time.

In accordance with a third embodiment of the present invention, there is provided a method for activating an information-processing apparatus having a computer and an execution-state holding unit configured to hold the execution state of a program executed by the computer. The method for activating an information-processing apparatus is characterized in that the activation method includes: a return-point setting step for setting the execution point of a program, which is to be restored after activation of the information-processing apparatus, prior to the activation; and an execution-state saving step for saving an execution state, which is held by the execution-state holding unit as a program execution state at an execution point set by the return-point setting step as the execution point of the program to be restored after the activation, prior to the activation. The activation method further includes an execution-state transfer step for transferring the execution state saved by the execution-state saving step to the execution-state holding unit at an activation time. Thus, the present invention brings about an effect of a capability of restoring the program execution state at an execution point set in advance as an execution point of the program in a short period of time.

In accordance with the present invention, an execution point of a program to be restored after activation of an operating system is set and a program execution state at the execution point is saved allowing the saved execution state of the program to be restored in a short period of time at an activation time.

DETAILED DESCRIPTION OF THE PREFERRED EMBODIMENTS

Next, embodiments of the present invention are explained in detail by referring to diagrams as follows.

Figure 1:
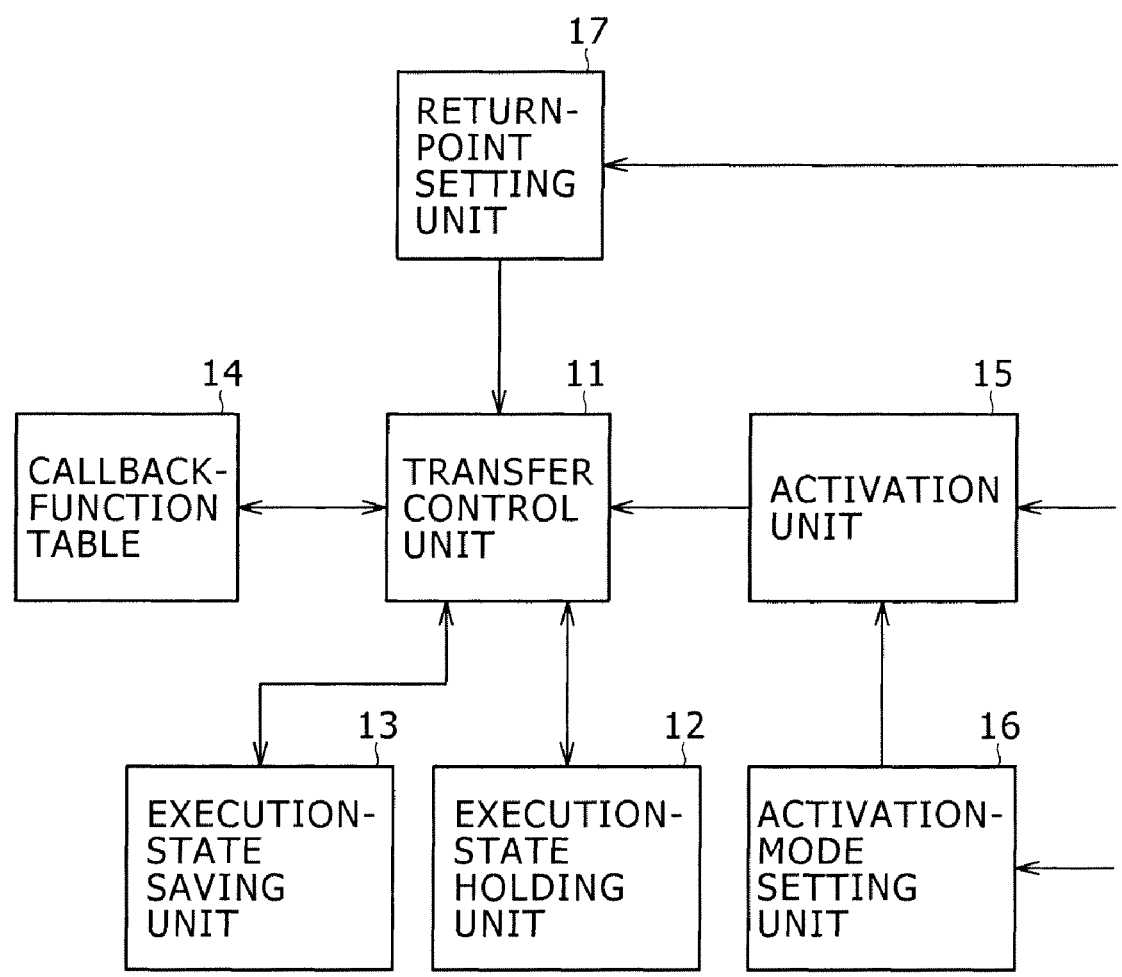
FIG. 1 is a diagram showing a typical functional configuration of an information-processing apparatus according to an embodiment of the present invention.

FIG. 1 is a diagram showing a typical functional configuration of an information-processing apparatus according to an embodiment of the present invention. As shown in the figure, this typical functional configuration includes a transfer control unit 11, an execution-state holding unit 12, an execution-state saving unit 13, a callback-function table 14, an activation unit 15, an activation-mode setting unit 16 and a return-point setting unit 17.

The execution-state holding unit 12 is a section for holding the execution state of a program being executed by a computer. The execution state includes contents of each register employed in the information-processing apparatus and data stored in a memory managed by the operating system. The registers employed in the information-processing apparatus include registers of a CPU (Central Processing Unit) and registers of peripheral circuits. The execution-state holding unit 12 is typically a volatile memory such as a SDRAM (Synchronous Dynamic Random Access Memory).

The execution-state saving unit 13 is a section for saving an execution state held by the execution-state holding unit 12. The execution-state saving unit 13 is typically a non-volatile memory such as a flash memory. Thus, the execution state saved in the execution-state saving unit 13 is retained as it is even after the power supply is turned off.

The transfer control unit 11 is a section for transferring an execution state held in the execution-state holding unit 12 to the execution-state saving unit 13 and transferring an execution state saved in the execution-state saving unit 13 to the execution-state holding unit 12.

The callback-function table 14 is a table used for registering a callback function to be executed at a time an return point is set by the return-point setting unit 17 or a time activation is carried out by the activation unit 15. A callback function has a mechanism for requesting another program to call a function provided by itself. What is registered in advance in the callback-function table 14 are pointers each pointing to callback function such as an application program or a device driver. Thus, at a time an execution state is saved or an activation time of the computer, the callback function can be executed.

The activation unit 15 is a section of activating the operating system when the power supply of the information-processing apparatus is turned on. The activation-mode setting unit 16 is a section for setting an activation mode when the activation unit 15 activates the operating system. A typically conceivable implementation of the activation-mode setting unit 16 is an activation-mode changeover switch. In the case of the embodiment of the present invention, the activation mode is a normal activation mode or a fast activation mode. In the normal activation mode, the kernel of the operating system is loaded for execution. In the fast activation mode, on the other hand, the operating system is activated in a short period of time.

When the power supply of the information-processing apparatus is turned on with the fast activation mode set by the activation-mode setting unit 16, the activation unit 15 requests the transfer control unit 11 to execute control to transfer an execution state saved in the execution-state saving unit 13 to the execution-state holding unit 12. In accordance with the request, the transfer control unit 11 executes the control to transfer an execution state saved in the execution-state saving unit 13 to the execution-state holding unit 12 so that the execution state can be restored after activation of the operating system.

The return-point setting unit 17 is a section for setting an execution point, to which a program is to be restored when the power supply of the information-processing apparatus is turned on in the fast activation mode, as a return point. A typically conceivable implementation of the return-point setting unit 17 is a snapshot switch. That is to say, when the snapshot switch is pressed, the transfer control unit 11 executes the control to transfer an execution state held in the execution-state holding unit 12 to the execution-state saving unit 13.

Figure 2:
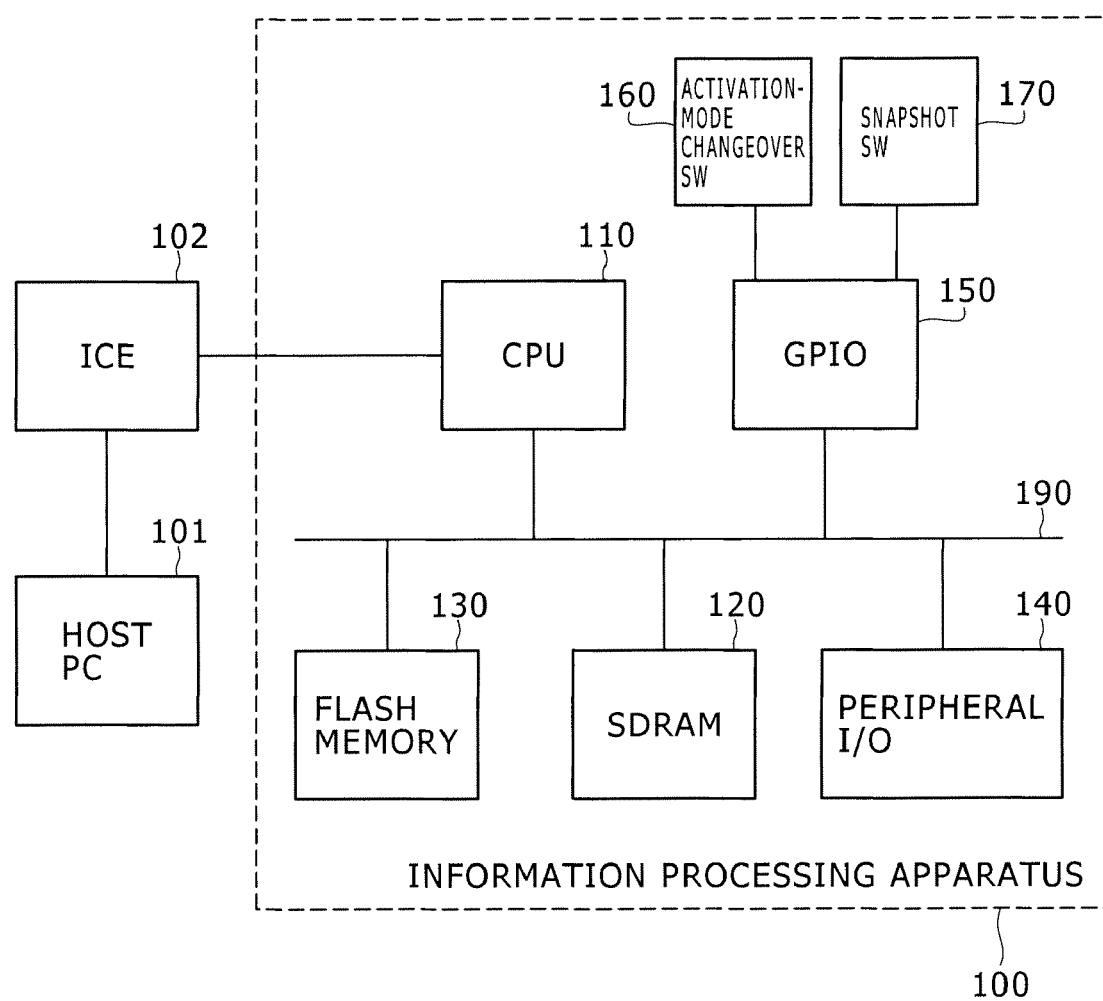
FIG. 2 is a diagram showing a typical hardware configuration of the information-processing apparatus according to the embodiment of the present invention.

FIG. 2 is a diagram showing a typical hardware configuration of an information-processing apparatus 100 according to an embodiment of the present invention. As shown in the figure, the information-processing apparatus 100 includes a CPU 110, an SDRAM 120, a flash memory 130, a peripheral I/O (input/output) 140, a GPIO (General-Purpose Input/Output) 150, an activation-mode changeover switch 160, a snapshot switch 170 and a system bus 190.

The CPU 110 is a processor for carrying out main processing of the information-processing apparatus 100. The architecture of the CPU 110 is not limited to a specific one in particular. The SDRAM 120 is a work memory used for storing data necessary for the operation of the CPU 110. The SDRAM 120 is no more than a typical work memory employed in the embodiment. That is to say, the work memory is not limited to an SDRAM but can be a memory of a type other than the SDRAM. For example, the work memory can also be a RAM.

The flash memory 130 is a rewritable non-volatile memory used for saving some data stored in the SDRAM 120. The flash memory 130 is no more than a typical memory used for saving such data. That is to say, the memory used for saving such data is not limited to the flash memory 130 but can be a memory of a type other than the non-volatile memory.

The peripheral I/O 140 is an I/O unit for carrying out peripheral processing of the information-processing apparatus 100. Typically, the peripheral I/O 140 includes a timer and a controller.

The GPIO 150 is a general-purpose I/O unit for carrying out input/output processing of the information-processing apparatus 100. In the case of the embodiment, the GPIO 140 receives inputs from the activation-mode changeover switch 160 as well as the snapshot switch 170, and software is capable of identifying the states of the activation-mode changeover switch 160 as well as the snapshot switch 170 on the basis of the inputs.

The activation-mode changeover switch 160 is a switch for changing the activation mode. In the case of the embodiment, the activation-mode changeover switch 160 can be operated to select either a normal activation mode or a fast activation mode as an activation mode to be adopted at an activation time.

The snapshot switch 170 is a switch functioning as a trigger to save (or copy in a snapshot manner) an execution state held in the execution-state holding unit 12 to the execution-state saving unit 13. In the fast activation mode, the information-processing apparatus 100 is activated in an execution state existing at the time the snapshot switch 170 is pressed.

The system bus 190 is a bus for connecting the CPU 110, the SDRAM 120, the flash memory 130, the peripheral I/O 140 and the GPIO 150 to each other.

The CPU 110 is connected to an ICE (in-circuit emulator) 102. The ICE 102 is a unit functioning as a debugger of the CPU 110. To be more specific, the ICE 102 reads out the contents of each register employed in the CPU 110 and data stored in the SDRAM 120 as well as writes data into the registers and the SDRAM 120. The ICE 102 is connected to a host PC 101. The user operates the ICE 102 through the host PC 101. It is to be noted that the ICE 102 is no more than a typical implementation of the transfer control unit 11. That is to say, the ICE 102 can be replaced by other software for carrying out a function equivalent to the function of the ICE 102.

Figure 3:
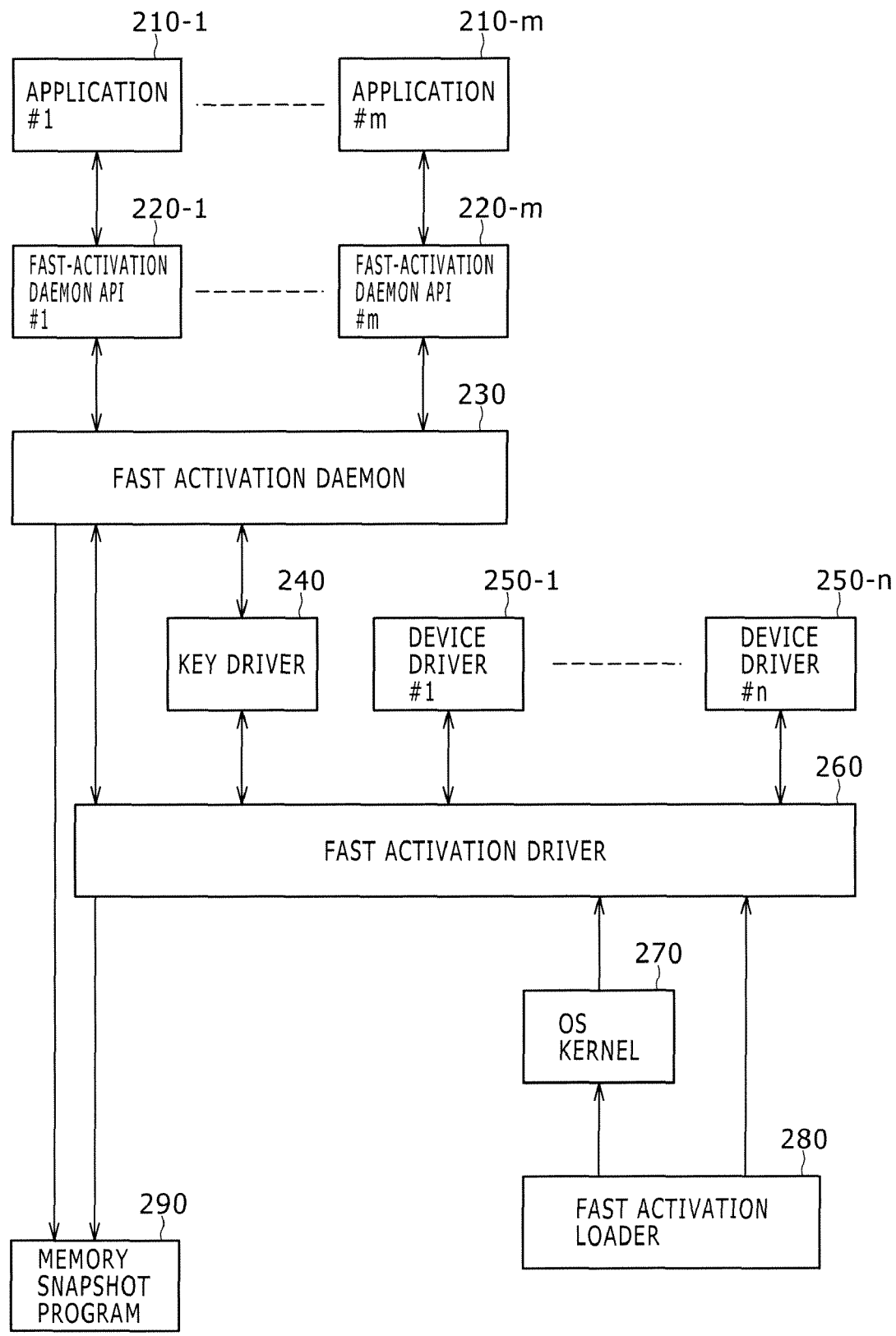
FIG. 3 is a diagram showing a typical software configuration of the information-processing apparatus according to the embodiment of the present invention.

FIG. 3 is a diagram showing a typical software configuration of the information-processing apparatus 100 according to the embodiment of the present invention. As shown in the figure, the typical configuration includes m applications 210-1 to 210-*m*, m fast-activation daemon APIs (application program interfaces) 220-1 to 220-*m*, a fast activation daemon 230, a key driver 240, n device drivers 250-1 to 250-*n*, a fast activation driver 260, an OS kernel 270, a fast activation loader 280 and a memory snapshot program 290 where m and n are each a positive integer.

The applications 210-1 to 210-*m* are each an application program operating on the CPU 110. The applications 210-1 to 210-*m* issue a request for registration of a callback notification to the fast activation daemon 230. It is thus necessary to prepare a snapshot acquisition callback function and a fast-activation callback function in advance.

Provided for the applications 210-1 to 210-*m* respectively, the fast-activation daemon APIs 220-1 to 220-*m* are each an application interface for calling the fast activation daemon 230. The fast-activation daemon APIs 220-1 to 220-*m* are used in operations carried out by the applications 210-1 to 210-*m* respectively to issue a request for registration of a callback notification and a request for cancellation of a callback notification to the fast activation daemon 230. It is to be noted that, since the fast-activation daemon APIs 220-1 to 220*m* have the same function, an API common to all the applications 210-1 to 210-*m* can be shared by the applications 210-1 to 210-*m*.

The fast activation daemon 230 is a daemon for issuing a command to execute a snapshot acquisition callback process to all registered applications 210-1 to 210-*m* at a snapshot acquisition time and a command to execute a fast-activation callback process to all registered applications 210-1 to 210-*m* at a fast activation time.

The key driver 240 is software for detecting an operation to press the snapshot switch 170. For the key driver 240, it is necessary to prepare a snapshot acquisition callback function and a fast-activation callback function in advance.

The device drivers 250-1 to 250-*n* are each software for driving a peripheral apparatus also referred to as a device. The device drivers 250-1 to 250-*n* register a callback function in the fast activation driver 260. It is thus necessary to prepare a snapshot acquisition callback function and a fast-activation callback function in advance. It is to be noted that, even though the applications 210-1 to 210-*m* issue a system call to the fast-activation daemon APIs 220-1 to 220-*m* respectively in order to operate registers, the device drivers 250-1 to 250-*n* are capable of directly operating registers associated with the device drivers 250-1 to 250-*n*.

The fast activation driver 260 is a driver for executing a snapshot acquisition callback function for all registered device drivers 250-1 to 250-*n* at a snapshot acquisition time and executing a fast-activation callback function for all registered device drivers 250-1 to 250-*n* at a fast activation time.

The OS kernel 270 is software having basic functions of the operating system. The embodiment of the present invention is explained by assuming that Linux (a registered trademark) is employed as the operating system. Nevertheless, the operating system is by no means limited to Linux.

The memory snapshot program 290 is a program for saving contents of each register employed in the CPU 110 in the SDRAM 120 and saving data stored in the SDRAM 120 in the flash memory 130. Since the memory snapshot program 290 is used for saving contents of each register employed in the CPU 110 in the SDRAM 120, it is necessary to write the memory snapshot program 290 in an assembly language.

It is to be noted that, while the operating system operates on the assumption that addresses are each a logical address (or in an on state of an MMU), the memory snapshot program 290 operates on the assumption that addresses are each a physical address (or in an off state of the MMU). The MMU is an abbreviation of a memory management unit. That is to say, when the operating system makes a jump to the logical address of the beginning of the memory snapshot program 290, an operation to jump to a physical address corresponding to the logical address is carried out and, then, the state is changed from the on state of the MMU to the off state of the MMU. Thus, it is necessary to place the memory snapshot program 290 at a logical address corresponding to a physical address that has the same value as the logical address.

The fast activation loader 280 is a loader that initially operates after the power supply of the information-processing apparatus 100 is turned on. The fast activation loader 280 activates the operating system in a fast activation mode by making use of an activation image acquired by the memory snapshot program 290. Provided independently of the operating system, the fast activation loader 280 operates as ordinary firmware stored in the flash memory 130.

It is necessary to provide the fast activation loader 280 in such a way that the CPU 110 sees a virtual address space and a physical address space as the same space. When the operating system is activated, it activated on the physical address space, however, the on state of the MMU is set in order to allow all specified addresses to be handled as logical addresses. In the on state of the MMU, the operating system makes a jump to an entry point of the fast activation driver 260.

Figure 4A:
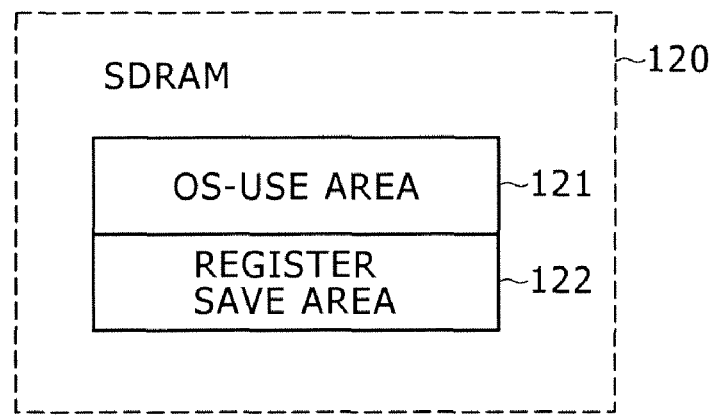
FIGS. 4A and 4B are each a diagram showing a memory map of the information-processing apparatus according to the embodiment of the present invention.

FIG. 4 is a diagram showing memory maps of the information-processing apparatus 100 according to the embodiment of the present invention. To be more specific, FIG. 4A shows the memory map of the SDRAM 120. As shown in FIG. 4A, the memory map of the SDRAM 120 includes a OS-use area 121 and a register-content saving area 122.

The OS-use area 121 is an area used by the operating system to store program code and data. The callback-function table 14 explained before by referring to FIG. 1 is also stored in the OS-use area 121. While executing the operating system, the CPU 110 recognizes the OS-use area 121 as a virtual address space. While executing the fast activation loader 280, on the other hand, the CPU 110 recognizes the OS-use area 121 as a physical address space.

On the other hand, the register-content saving area 122 is an area used by the memory snapshot program 290 to save contents of registers employed in the CPU 110 and the GPIO 150. Since the register-content saving area 122 is provided independently of the operating system, the operating system do not makes an access to the register-content saving area 122.

Figure 4B:
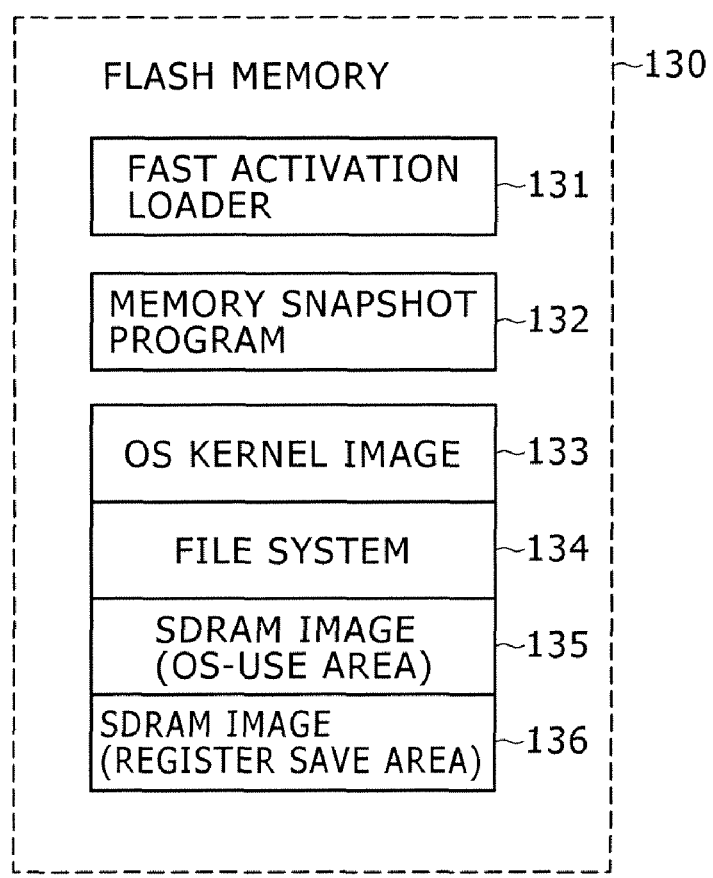

On the other hand, FIG. 4B shows the memory map of the flash memory 130. As shown in the figure, the memory map of the flash memory 130 includes areas used for storing a fast activation loader 131, a memory snapshot program 132, an OS kernel image 133, a file system 134, an SDRAM image 135 (OS-use area) and an SDRAM image 136.

The area referred to as the fast activation loader 131 is an area used for storing the fast activation loader 280. Since the fast activation loader 280 is executed right after the power supply of the information-processing apparatus 100 is turned on, it is necessary to store the fast activation loader 280 in the flash memory 130.

The area referred to as the memory snapshot program 132 is an area used for storing the memory snapshot program 290. Even though the memory snapshot program 132 can be implemented as a driver included in the operating system, in the case of the embodiment of the present invention, the memory snapshot program 132 is provided independently of the operating system. In addition, it is necessary to set the memory snapshot program 132 in the flash memory 130 at a logical address corresponding to a physical address that has the same value as the logical address when seen from the operating system.

The area referred to as the OS kernel image 133 is an area used for storing the kernel image of the operating system. In the case of Linux operating system, there are an XIP method and an SDRAM method. In accordance with the XIP method, the kernel image of the operating system is executed on the OS kernel image 133 as it is. In accordance with the SDRAM method, on the other hand, the code of the kernel and its data are transferred to the SDRAM 120 and the kernel on the SDRAM 120 is executed. In the embodiment of the present invention, the later method is assumed. However, it is by no means limited to this.

The area referred to as the file system 134 is an area used for storing a file system. The format of the file system can be ext2, XFS or another format. However, the file system is by no means limited to a specific format.

The area referred to as the SDRAM image 135 serving as an OS-use area is an area used for saving the SDRAM image for fast activation in advance. The SDRAM image is the code and data, which are stored in the OS-use area 121 included in the SDRAM 120. This is because, since information stored in the SDRAM 120 is lost when the power supply is turned off, it is necessary to save the information in the flash memory 130 in advance. Thus, at a fast activation time, by transferring the information from the SDRAM image 135 serving as an OS-use area to the OS-use area 121 included in the SDRAM 120, the contents of the OS-use area 121 can be recovered.

The area referred to as the SDRAM image 136 serving as a register-content saving area is an area used for saving contents of registers including registers employed in the CPU 110 and the peripheral I/O 140 in advance. The data saved in the SDRAM image 136 is the same as that stored in the register-content saving area 122 included in the SDRAM 120. This is because, since information stored in the SDRAM 120 is lost when the power supply is turned off as described above, it is necessary to save the information in the flash memory 130 in advance. Thus, at a fast activation time, by transferring the information from the SDRAM image 136 serving as a register-content saving area to the register-content saving area 122 included in the SDRAM 120, the contents of registers including registers employed in the CPU 110 and the peripheral I/O 140 can be recovered.

It is to be noted that, in the case of the embodiment, the SDRAM image 136 used as a register-content saving area is provided as an area independent of management executed by the operating system only for the sake of convenience. In addition, it is necessary to set the SDRAM image 136 used as a register-content saving area in the flash memory 130 in a space wherein each logical address corresponds to a physical address having the same value as the logical address when seen from the CPU 110.

As described above, the fast activation loader 280 can be executed mainly in either of the normal activation mode and the fast activation mode, which are each provided as activation mode that can be selected by operating the activation-mode changeover switch 160. In the normal activation mode, after the information-processing apparatus 100 is reset, the SDRAM 120 and the related peripheral I/O 140 are initialized. Then, after the OS kernel image 133 is transferred to the OS-use area 121, the activation is carried out by jumping to the entry point of the operating system stored in the OS-use area 121.

In the fast activation mode, on the other hand, after the information-processing apparatus 100 is reset, the SDRAM 120 and the related peripheral I/O 140 are initialized. Then, information is transferred from the SDRAM image 135 serving as an OS-use area to the OS-use area 121 and from the SDRAM image 136 serving as a register-content saving area to the register-content saving area 122. Subsequently, after contents of registers including those employed in the CPU 110 and the peripheral I/O 140 are restored on the basis of the information stored in the register-content saving area 122, the activation is carried out by jumping to the entry point of the operating system stored in the OS-use area 121.

In the fast activation mode, in the case of the embodiment of the present invention, after information is transferred from the SDRAM image 136 serving as a register-content saving area to the register-content saving area 122, the contents of the registers including those employed in the CPU 110 and the peripheral I/O 140 are restored on the basis of the information stored in the register-content saving area 122 as described above. It is to be noted that the contents of the registers including those employed in the CPU 110 and the peripheral I/O 140 can be restored by directly referring to the information stored in the SDRAM image 136 serving as a register-content saving area without transferring the information from the SDRAM image 136 to the register-content saving area 122.

By referring to diagrams, the following description explains flows of the entire operation of the information-processing apparatus 100 according to the embodiment of the present invention. In the following description, the entire operation is divided into four pieces of processing, i.e., snapshot acquisition preparatory processing, snapshot acquisition processing, fast activation processing and software termination processing, which is also referred to as a shutdown.

Figure 5:
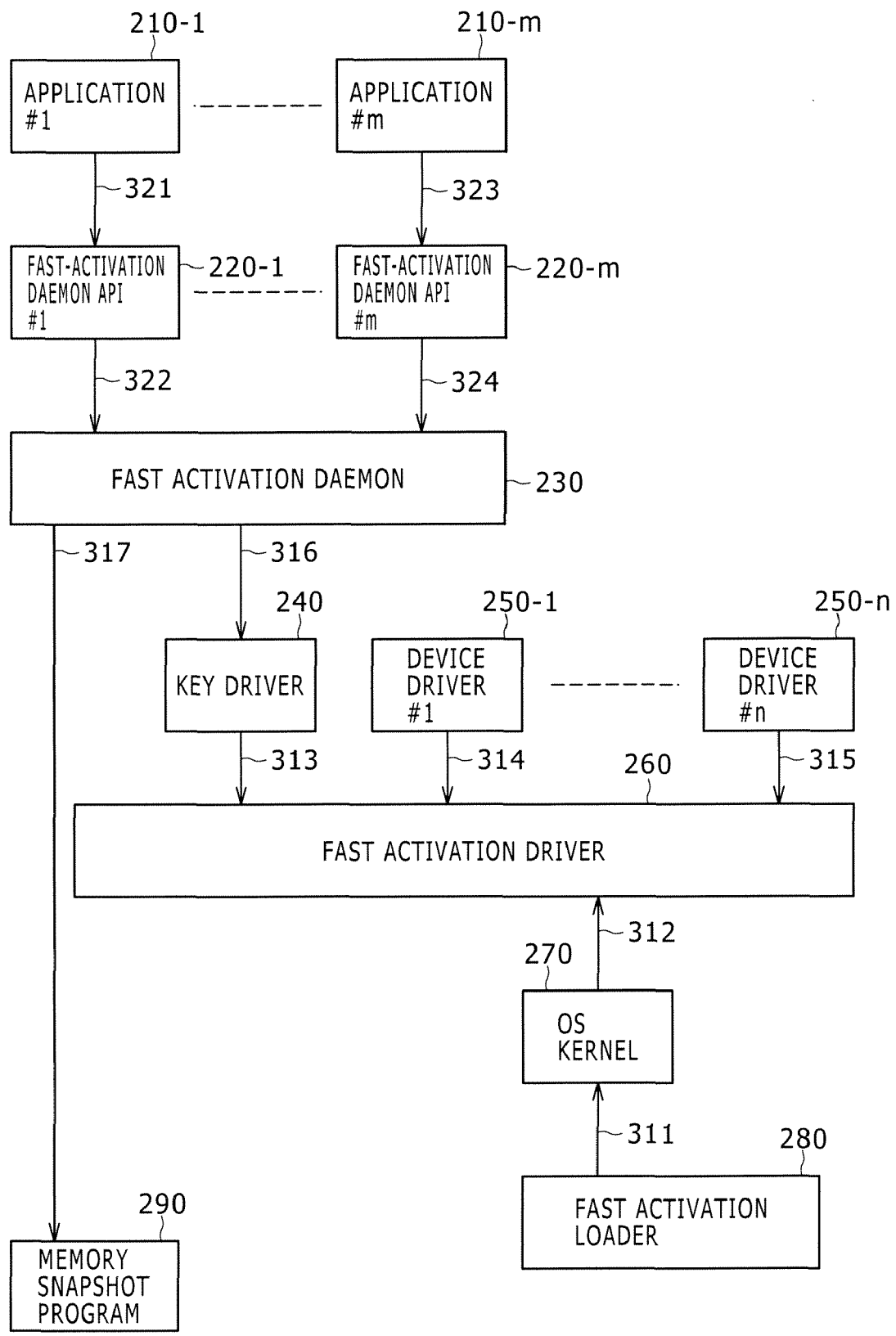
FIG. 5 is a diagram showing typical snapshot acquisition preparatory processing according to the embodiment of the present invention.

FIG. 5 is a diagram showing typical snapshot acquisition preparatory processing according to the embodiment of the present invention. First of all, when the power supply of the information-processing apparatus 100 is turned on with the activation-mode changeover switch 160 set at a position for the normal activation mode, the fast activation loader 280 is invoked after the hardware is reset. As indicated by an arrow 311, the fast activation loader 280 carries out an activation process in accordance with the setting position of the activation-mode changeover switch 160 along a boot sequence of an ordinary operating system.

In the boot sequence, the fast activation driver 260 is installed as indicated by an arrow 312. The process to install the fast activation driver 260 is a process to connect the module, which is the fast activation driver 260, to the operating system and put the module in an operatable state after activation of the OS kernel 270.

Then, the key driver 240 capable of detecting an operation to press the snapshot switch 170 is installed. The key driver 240 carries out a process to register callback functions in the fast activation driver 260 as indicated by an arrow 313. The callback functions are the snapshot acquisition callback function and the fast-activation callback function. It is to be noted that the key driver 240 requires that implementation of the snapshot acquisition callback function and the fast-activation callback function be completed.

Then, the n device drivers 250-1 to 250-*n* are installed in an order of increasing driver numbers. That is to say, the device driver 250-1 is installed to be followed by installation of the device driver 250-2, installation of the device driver 250-3 . . . and installation of the device driver 250-*n*. The n device drivers 250-1 to 250-*n* carry out a process to register callback functions in the fast activation driver 260 as indicated by arrows 314 and 315. It is to be noted that the n device drivers 250-1 to 250-*n* require that implementation of the snapshot acquisition callback function and the fast-activation callback function be completed.

As the processes carried out by the key driver 240 and the n device drivers 250-1 to 250-*n* to register the callback functions are completed, the fast activation daemon 230 is activated. The fast activation daemon 230 opens the key driver 240 as indicated by an arrow 316, putting the key driver 240 in a state of being capable of detecting an operation to press the snapshot switch 170. In addition, the memory snapshot program 290 is loaded into the SDRAM 120 as indicated by an arrow 317.

Then, the m applications 210-1 to 210-*m* are activated in an order of increasing application numbers. That is to say, the application 250-1 is activated to be followed by activation of the application 210-2, activation of the application 210-3 . . . and activation of the application 210-*m*. The m applications 210-1 to 210-*m* call registration processes making use of callback notification registration request APIs of the fast-activation daemon APIs 220-1 to 220-*m* respectively as indicated by arrows 321 and 323. It is to be noted that, in order to call registration processes, it is necessary to complete implementation of the snapshot acquisition callback function and the fast-activation callback function. The fast-activation daemon APIs 220-1 to 220-*m* propagate registrations of callback notifications to the fast activation daemon 230 as indicated by arrows 322 and 324.

Figure 6:
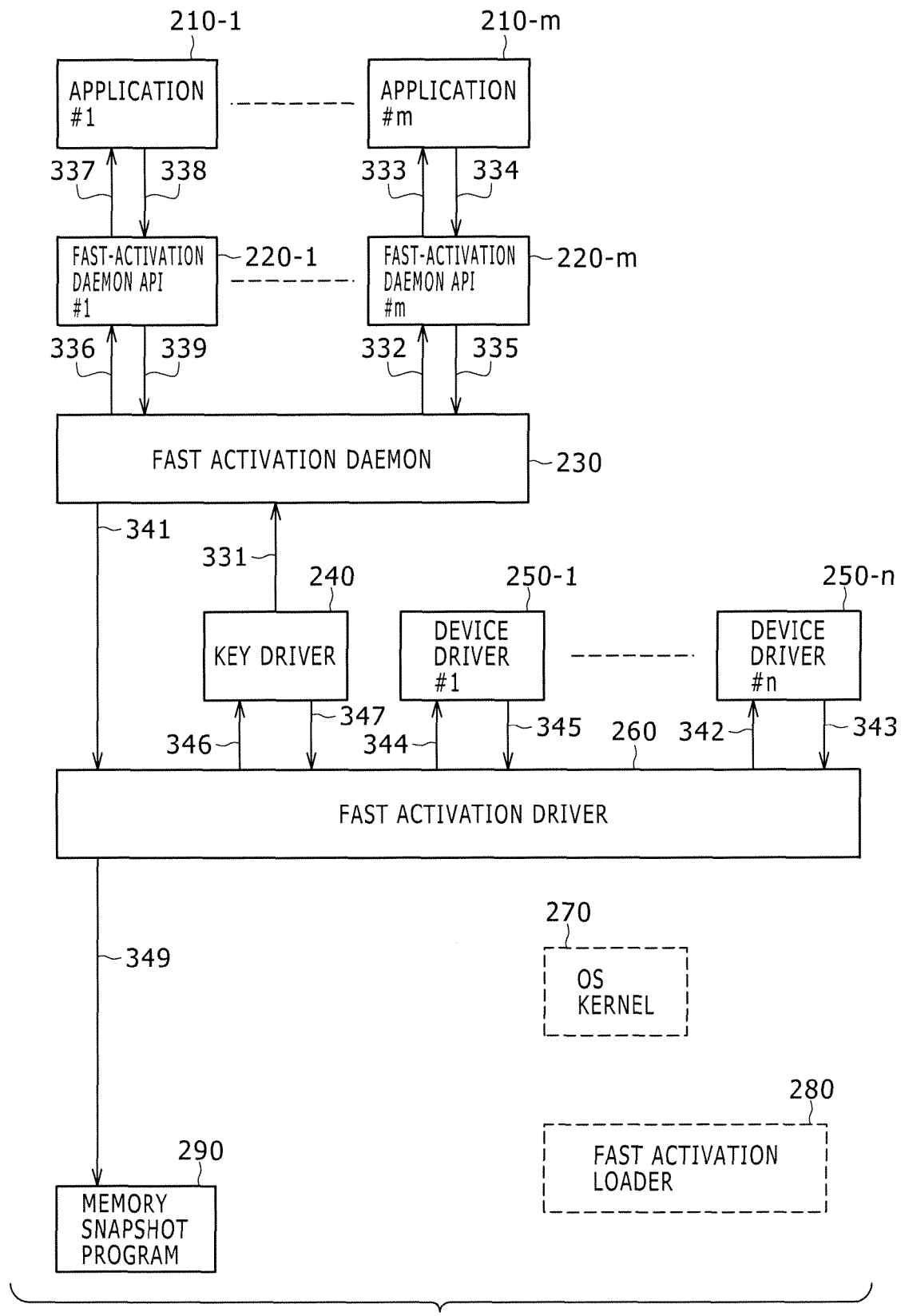
FIG. 6 is a diagram showing typical snapshot acquisition processing according to the embodiment of the present invention.

FIG. 6 is a diagram showing typical snapshot acquisition processing according to the embodiment of the present invention. When the snapshot switch 170 is pressed, as indicated by an arrow 331, the key driver 240 notifies the fast activation daemon 230 that the snapshot switch 170 has been pressed.

The fast activation daemon 230 propagates a request for execution of a snapshot acquisition callback process to the fast-activation daemon APIs 220-1 to 220-*m* in an order of decreasing daemon API numbers. That is to say, the fast activation daemon 230 propagates a request for execution of a snapshot acquisition callback process to the fast-activation daemon API 220-*m* to be followed by request propagation to the fast-activation daemon API 220-(m−1), request propagation to the fast-activation daemon API 220-(m−2). . . and request propagation to the fast-activation daemon API 220-1 as indicated by arrows 332 and 336. In accordance with the requests received from the fast activation daemon 230, the fast-activation daemon APIs 220-1 to 220-*m* carry out snapshot acquisition callback processes of the applications 210-1 to 210-*m* respectively as indicated by arrows 333 and 337. It is to be noted that, typically, a snapshot acquisition callback process may include processing to execute a program up to a program execution point corresponding to a proper delimiter of the program in order to acquire a snapshot. The snapshot acquisition callback processes are carried out also in an order of decreasing daemon API numbers in order to satisfy characteristics of dependence among the processes.

When the snapshot acquisition callback processes of the applications 210-1 to 210-*m* are all completed, operations to return to the callers are carried out as indicated by arrows 334 and 338. Then, the fast-activation daemon APIs 220-1 to 220-*m* propagate notices of completions of the snapshot acquisition callback processes to the fast activation daemon 230 as indicated by arrows 335 and 339.

After the fast activation daemon 230 receives all the snapshot acquisition callback process completion notices 335 to 339 from the fast-activation daemon APIs 220-1 to 220-*m*, the fast activation daemon 230 issues a command to the fast activation driver 260 as indicated by an arrow 341. Receiving the command, the fast activation driver 260 executes a snapshot acquisition callback function for the device drivers 250-1 to 250-*n* in an order of decreasing device-driver numbers. That is to say, the fast activation driver 260 executes a snapshot acquisition callback function for the device driver 250-*n* to be followed by execution of the snapshot acquisition callback function for the device driver 250-(n−1), execution of the snapshot acquisition callback function for the device driver 250-(n−2). . . and execution of the snapshot acquisition callback function for the device driver 250-1 as indicated by arrows 342 and 344. As the execution of the snapshot acquisition callback function for each of the device drivers 250-1 to 250-*n* is completed, operations to return to the callers are carried out as indicated by arrows 343 and 345. It is to be noted that, typically, the snapshot acquisition callback process may include processing to save contents of relevant registers and values of relevant variables in the SDRAM 120.

The snapshot acquisition callback functions are carried out also in an order of decreasing device-driver numbers in order to satisfy characteristics of dependence among the functions.

In addition, the fast activation driver 260 executes a snapshot acquisition callback function for the key driver 240 as indicated by an arrow 346. As the execution of the snapshot acquisition callback function for the key driver 240 is completed, an operation to return to the caller is carried out as indicated by an arrow 347.

When execution of all the snapshot acquisition callback for each of the drivers 240 and 250-1 to 250-$n$ is completed, the fast activation driver 260 makes a jump to the start address of the memory snapshot program 290 as indicated by an arrow 349. After the jump to the start address of the memory snapshot program 290 is made, the memory snapshot program 290 saves contents of registers including those employed in the CPU 110 and the peripheral I/O 140 to the register-content saving area 122 of the SDRAM 120. Then, the in-circuit emulator 102 saves information stored in the OS-use area 121 and the register-content saving area 122, which are included in the SDRAM 120, in the host PC 101. Subsequently, the information stored in the OS-use area 121 and the register-content saving area 122 is saved in the SDRAM image 135 serving as an OS-use area and the SDRAM image 136 serving as a register-content saving area respectively. Finally, the power supply of the information-processing apparatus 100 is turned off.

Figure 7:
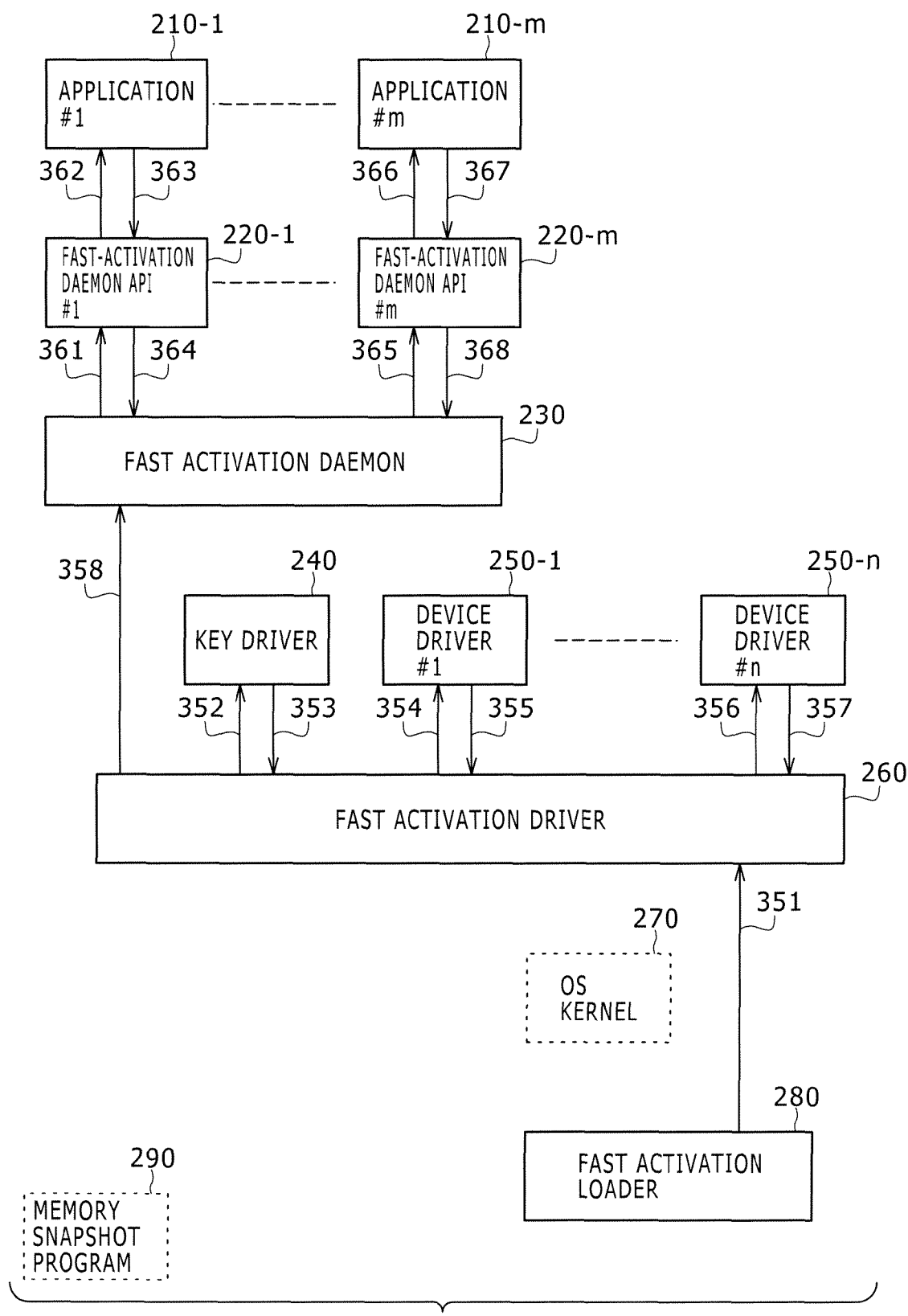
FIG. 7 is a diagram showing typical fast activation processing according to the embodiment of the present invention.

FIG. 7 is a diagram showing typical fast activation processing according to the embodiment of the present invention. The fast activation processing is carried out when the power supply of the information-processing apparatus 100 is turned on with the activation-mode changeover switch 160 set at a position for the fast activation mode. After the hardware is reset, the fast activation loader 280 is activated.

The fast activation loader 280 carries out an activation process in the fast activation mode in accordance with the setting position of the activation-mode changeover switch 160. First of all, the fast activation loader 280 initializes the SDRAM 120 and the relevant peripheral I/O 140. Then, information stored in the SDRAM image 135 serving as an OS-use area and the SDRAM image 136 serving as a register-content saving area is transferred to the OS-use area 121 and the register-content saving area 122 respectively. After the transfer of the information, the fast activation loader 280 makes a jump to the fast activation driver 260 serving as a caller as indicated by an arrow 351.

The fast activation driver 260 executes a fast activation function of the key driver 240 as indicated by an arrow 352. Then, as the execution of the fast activation function of the key driver 240 is completed, an operation to return to the caller is carried out as indicated by an arrow 353.

In addition, the fast activation driver 260 executes fast-activation callback functions of the device drivers 250-1 to 250-$n$ in an order of increasing device-driver numbers. That is to say, the fast activation driver 260 executes a fast-activation callback function for the device driver 250-1 to be followed by execution of the fast-activation callback function for the device driver 250-2, execution of the fast-activation callback function for the device driver 250-3 . . . and execution of the fast-activation callback function for the device driver 250-$n$ as indicated by arrows 354 and 356. As the execution of the fast-activation callback function for each of the device drivers 250-1 to 250-$n$ is completed, operations to return to the callers are carried out as indicated by arrows 355 and 357.

As the execution of the fast-activation callback function for each of the device drivers 250-1 to 250-$n$ is completed, the execution of the command is also completed and an operation to return from the fast activation driver 260 to the fast activation daemon 230 serving as a caller is carried out as indicated by an arrow 358.

The fast activation daemon 230 issues a request for execution of a fast-activation callback process to the fast-activation daemon APIs 220-1 to 220-$m$ in an order of increasing daemon API numbers. That is to say, the fast activation daemon 230 issues a request for execution of a fast-activation callback process to the fast-activation daemon API 220-1 to be followed by issuance of a request for execution of a fast-activation callback process to the fast-activation daemon API 220-2, issuance of a request for execution of a fast-activation callback process to the fast-activation daemon API 220-3 . . . and issuance of a request for execution of a fast-activation callback process to the fast-activation daemon API 220-$m$ as indicated by arrows 361 and 365. In accordance with the requests received from the fast activation daemon 230, the fast-activation daemon APIs 220-1 to 220-$m$ carry out the fast-activation callback processes of the applications 210-1 to 210-$m$ respectively as indicated by arrows 362 and 366.

As the fast-activation callback processes of the applications 210-1 to 210-$m$ are completed, operations to return to the callers are carried out as indicated by arrows 363 and 367. Then, the fast-activation daemon APIs 220-1 to 220-$m$ notify the fast activation daemon 230 that the fast-activation callback processes of the applications 210-1 to 210-$m$ have been completed as indicated by arrows 364 and 368.

Figure 8:
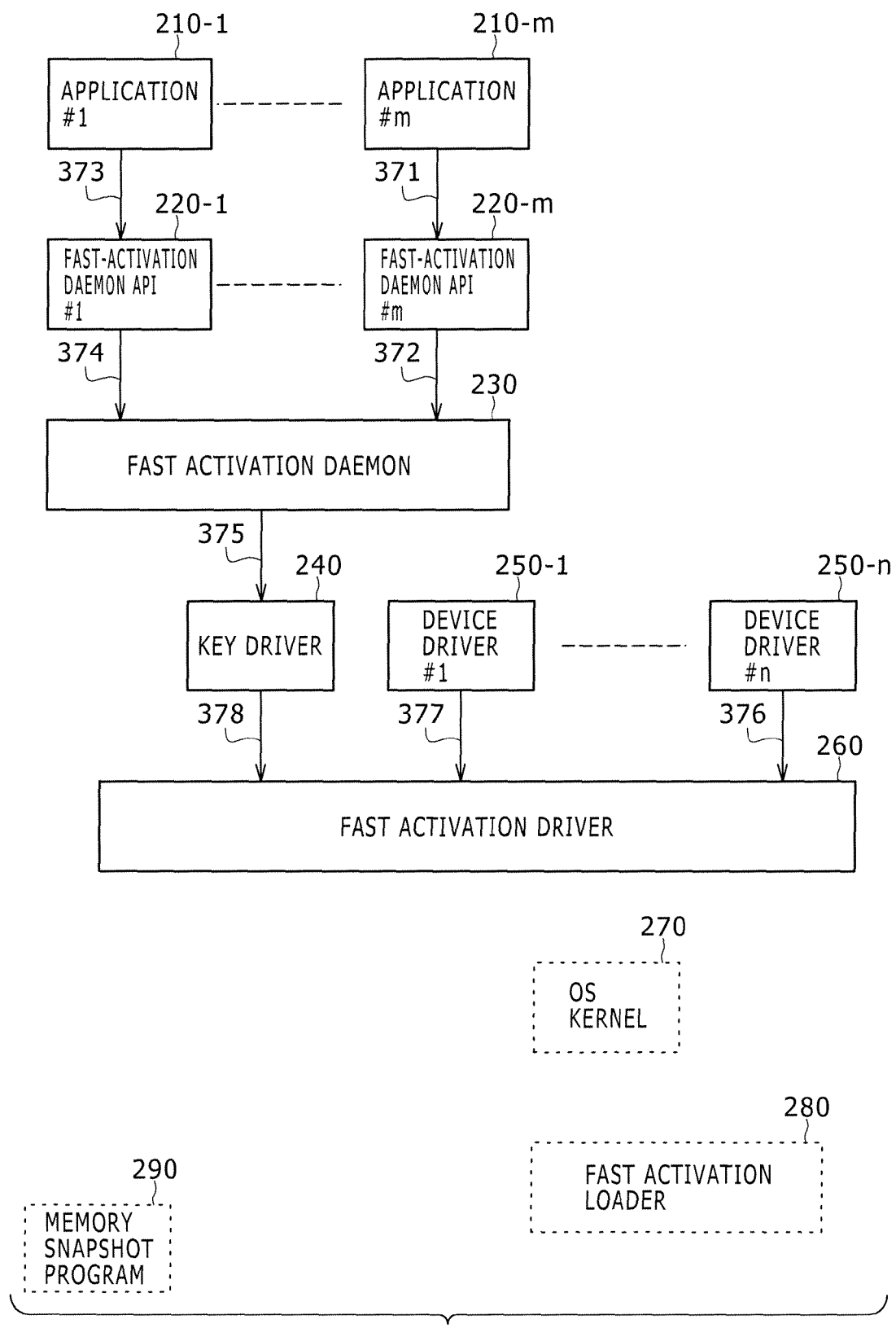
FIG. 8 is a diagram showing typical software termination processing according to the embodiment of the present invention.

FIG. 8 is a diagram showing typical software termination processing according to the embodiment of the present invention. In the software termination processing, the applications 210-1 to 210-$m$ issue calls for a deletion process to the fast-activation daemon APIs 220-1 to 220-$m$ respectively by making use of callback notification deletion request APIs of the fast-activation daemon APIs 220-1 to 220-$m$ in an order of decreasing application numbers. That is to say, the application 210-$m$ issues such a call to be followed by issuance of such a call from the application 210-(m−1), issuance of such a call from the application 210-(m−2) . . . and issuance of such a call from the application 210-1 as indicated by arrows 371 and 373. Then, the fast-activation daemon APIs 220-1 to 220-$m$ propagate the calls for deletion of callback notifications to the fast activation daemon 230 as indicated by arrows 372 and 374. Subsequently, the applications 210-1 to 210-$m$ are terminated.

The fast activation daemon 230 then closes the key driver 240 as indicated by an arrow 375. Subsequently, when the fast activation daemon 230 receives the calls for deletion of callback notifications from the fast-activation daemon APIs 220-1 to 220-$m$ as indicated by arrows 372 and 374, the execution of the fast activation daemon 230 is ended.

In addition, the device drivers 250-1 to 250-$n$ request the fast activation driver 260 to delete their registered callback functions in an order of decreasing device-driver numbers. That is to say, the device driver 250-$n$ makes a request to delete the callback function to be followed by the device driver 250-(n−1) that has made the request to delete the callback function, the device driver 250-(n−2) that has made the request to delete the callback function, . . . and the device driver 250-1 that has made the request to delete the callback function as indicated by arrows 376 and 377. Then, the key driver 240 requests the fast activation driver 260 to delete its registered callback function as indicated by an arrow 378. As all the registered callback functions of the device drivers 250-1 to 250-$n$ and the key driver 240 are deleted, the fast activation driver 260 is deleted.

By referring to diagrams, the following description explains a processing procedure implemented by executing software of the information-processing apparatus 100 according to the embodiment of the present invention.

Figure 9:
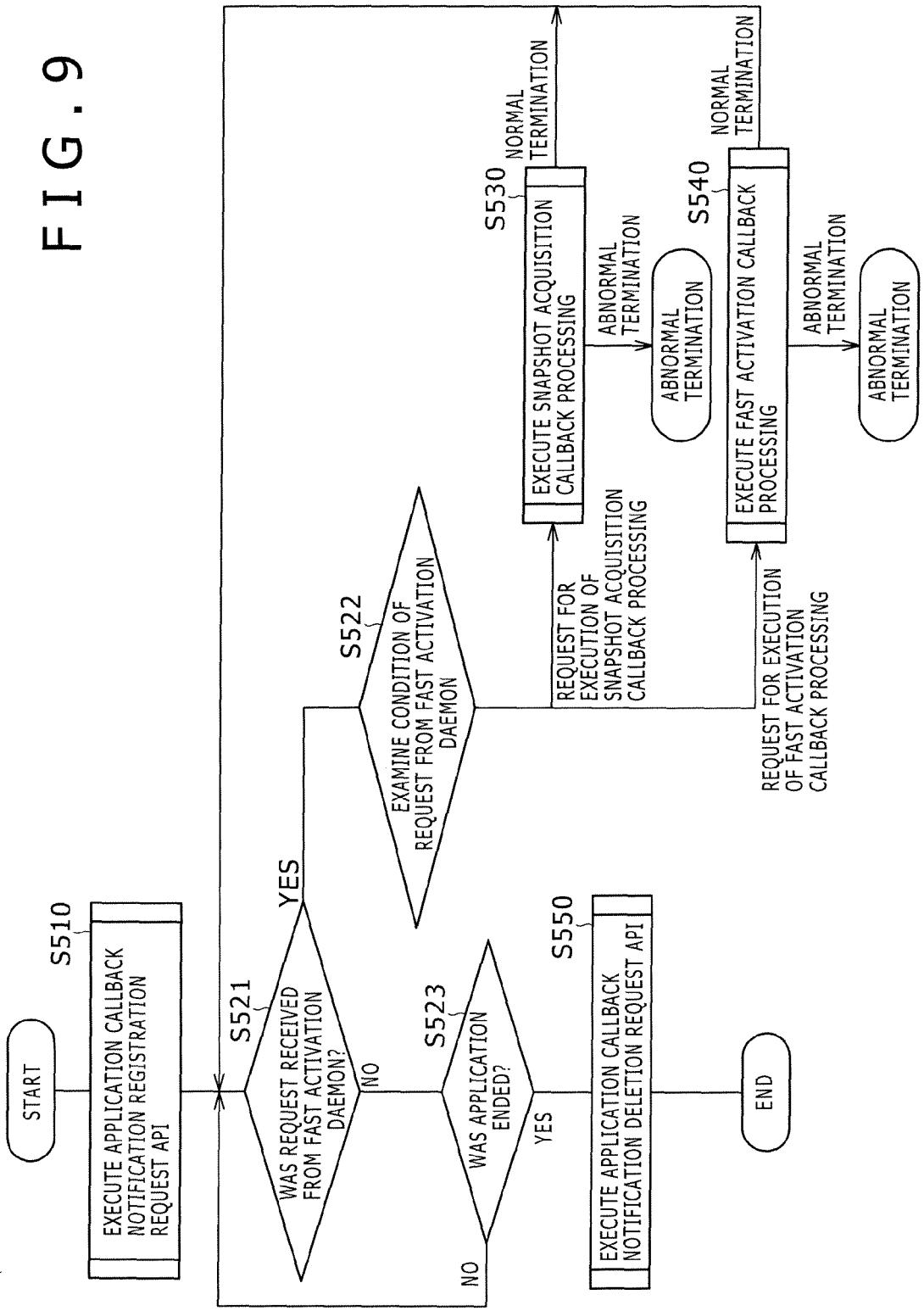
FIG. 9 is a diagram showing a typical procedure of entire processing carried out by the fast-activation daemon APIs in accordance with the embodiment of the present invention.

FIG. 9 is a diagram showing a typical entire processing procedure of processing carried out by the fast-activation daemon APIs 220-1 to 220-*m* in accordance with the embodiment of the present invention.

As shown in the figure, the processing procedure begins with a step S510 at which any specific one of the applications 210-1 to 210-*m* calls an application callback notification registration request API. Then, the flow of the processing procedure goes on to a step S521 at which the corresponding one of the fast-activation daemon APIs 220-1 to 220-*m* produces a result of determination as to whether or not a request has been received from the fast activation daemon 230. In the mean time, the specific one of the applications 210-1 to 210-*m* may carry out processes, which are to be naturally performed. The corresponding one of the fast-activation daemon APIs 220-1 to 220-*m* is associated with the specific one of the applications 210-1 to 210-*m*.

If the determination result produced at the step S521 indicates that a request has been received from the fast activation daemon 230, the flow of the processing procedure goes on to a step S522 at which the corresponding one of the fast-activation daemon APIs 220-1 to 220-*m* examines a condition set in the request received from the fast activation daemon 230. That is to say, if the request received from the fast activation daemon 230 is a request for execution of snapshot acquisition callback processing, the flow of the processing procedure goes on to a step S530 at which the corresponding one of the fast-activation daemon APIs 220-1 to 220-*m* executes the snapshot acquisition callback processing. If the request received from the fast activation daemon 230 is a request for execution of fast-activation callback processing, on the other hand, the flow of the processing procedure goes on to a step S540 at which the corresponding one of the fast-activation daemon APIs 220-1 to 220-*m* executes the fast-activation callback processing. If no abnormality is detected during the execution of the snapshot acquisition callback processing at the step S530 or the execution of the fast-activation callback processing at the step S540, the flow of the processing goes back to the step S521 at which the corresponding one of the fast-activation daemon APIs 220-1 to 220-*m* enters a state of waiting for a request to be made by the fast activation daemon 230.

If the determination result produced at the step S521 indicates that a request has not been received from the fast activation daemon 230, on the other hand, the flow of the processing procedure goes on to a step S523 at which the corresponding one of the fast-activation daemon APIs 220-1 to 220-*m* produces a result of determination as to whether or not the process carried out by the specific one of the applications 210-1 to 210-*m* has been ended. If the determination result produced at the step S523 indicates that the process carried out by the specific one of the applications 210-1 to 210-*m* has been ended, the flow of the processing procedure goes on to a step S550 at which the corresponding one of the fast-activation daemon APIs 220-1 to 220-*m* calls an application callback notification deletion request API.

Figure 10:
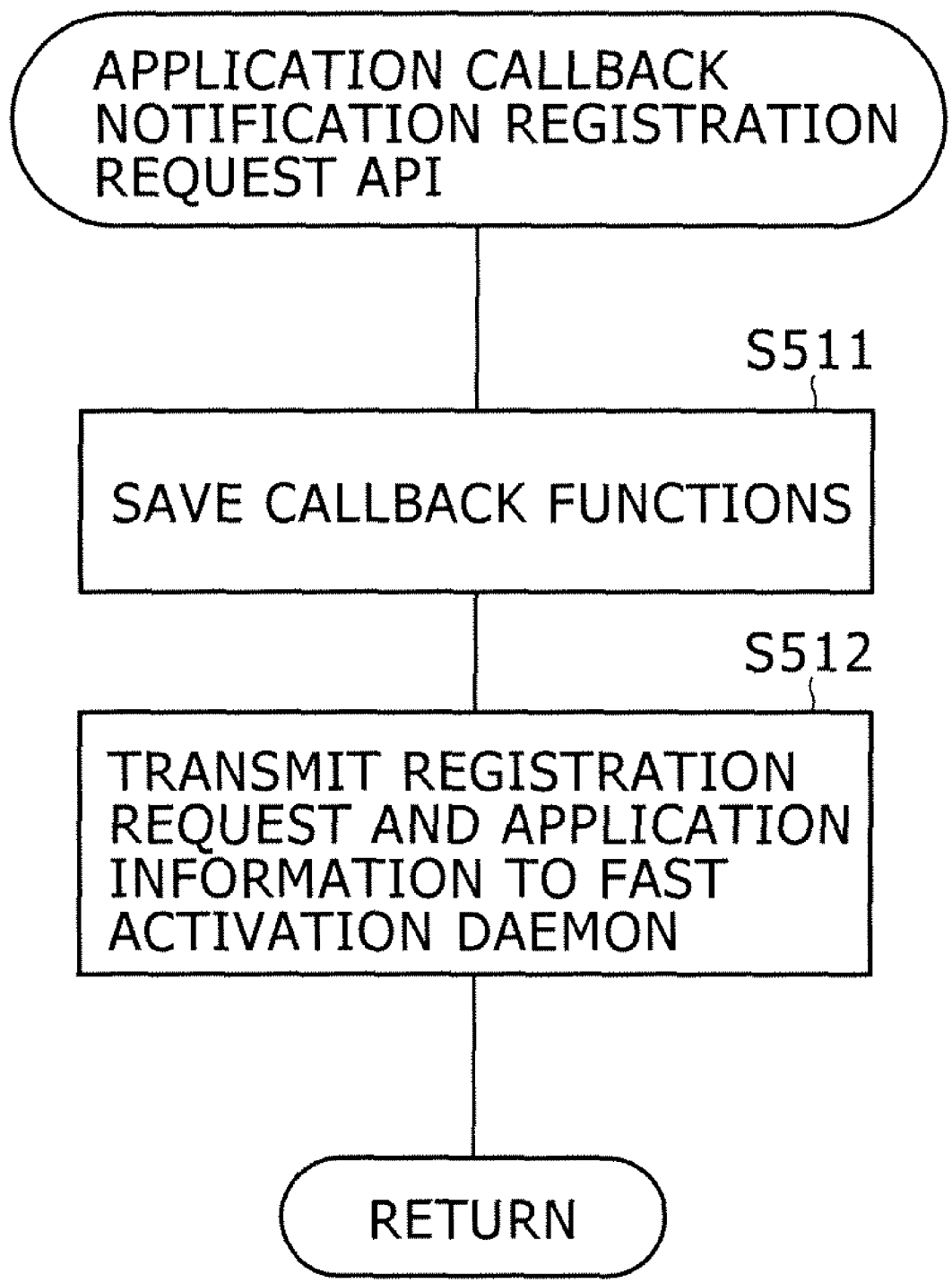
FIG. 10 is a diagram showing the processing procedure of the application callback notification registration request API carried out by the fast-activation daemon API in accordance with the embodiment of the present invention.

FIG. 10 is a diagram showing the procedure of processing by the fast-activation daemon API 220 to process an application callback notification registration request API called by an application 210 at the step S510 in accordance with the embodiment of the present invention.

As shown in the figure, the processing procedure begins with a step S511 at which the corresponding one of the fast-activation daemon APIs 220-1 to 220-*m* saves callback functions in the callback-function table 14 when the application callback notification registration request API is called. The saved callback functions are the snapshot acquisition callback function and the fast-activation callback function.

Then, at the next step S512, the corresponding one of the fast-activation daemon APIs 220-1 to 220-*m* transmits a request for registration of an application callback notification and information on the specific one of the applications 210-1 to 210-*m* that has made the request to the fast activation daemon 230. The information on an application 210 is unique information used for identifying the application 210. An example of the information on an application 210 is a PID (process identifier) of the application 210.

Figure 11:
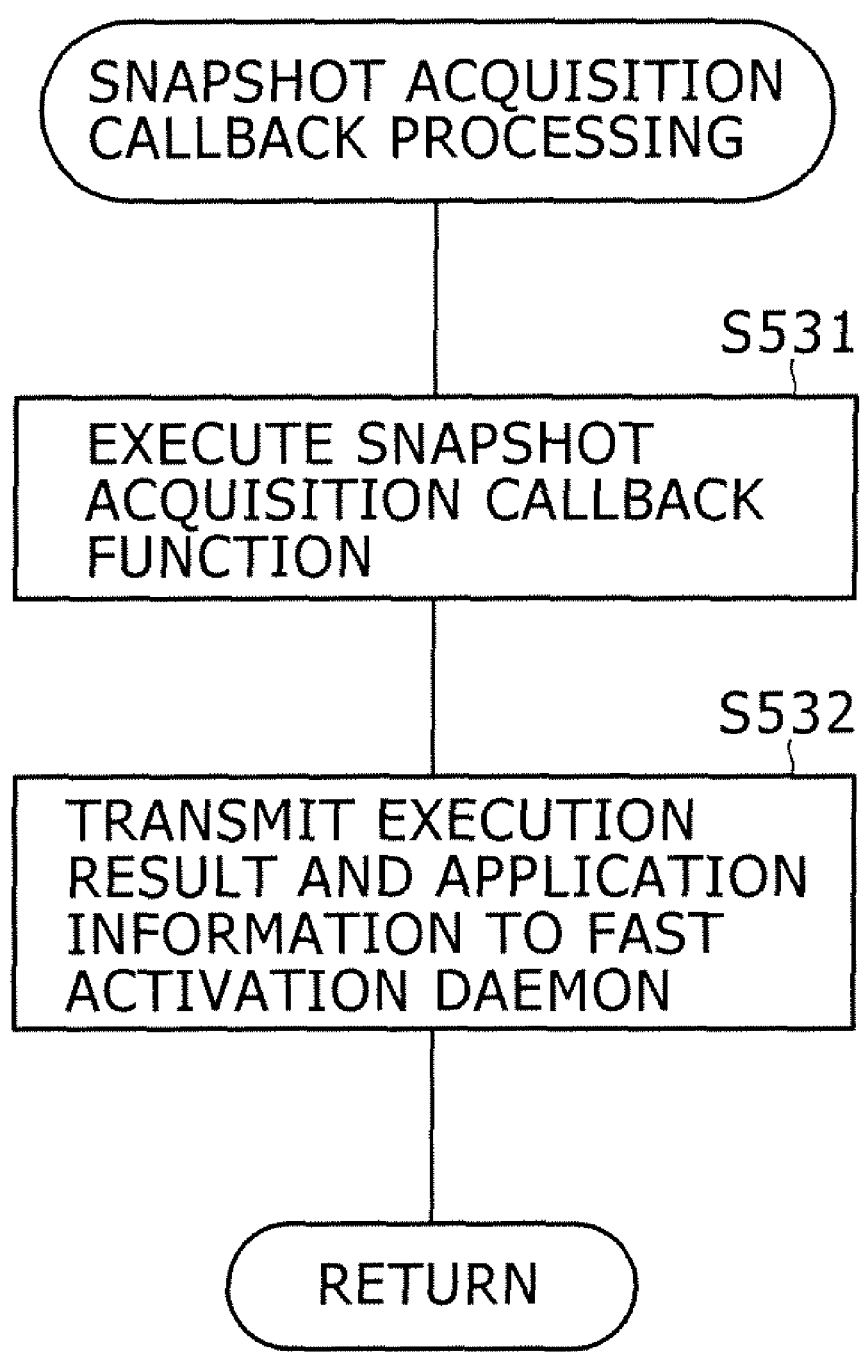
FIG. 11 is a diagram showing the procedure of the snapshot acquisition callback processing in accordance with the embodiment of the present invention.

FIG. 11 is a diagram showing the procedure of the snapshot acquisition callback processing carried out by the fast-activation daemon API 220 at the step S530 in accordance with the embodiment of the present invention.

As shown in the figure, the processing procedure begins with a step S531 at which the corresponding one of the fast-activation daemon APIs 220-1 to 220-*m* executes the snapshot acquisition callback function when a request for execution of the snapshot acquisition callback processing is made.

Then, at the next step S532, the corresponding one of the fast-activation daemon APIs 220-1 to 220-*m* transmits a result of the execution of the snapshot acquisition callback function and information on the specific one of the applications 210-1 to 210-*m* that has made the request to the fast activation daemon 230.

Figure 12:
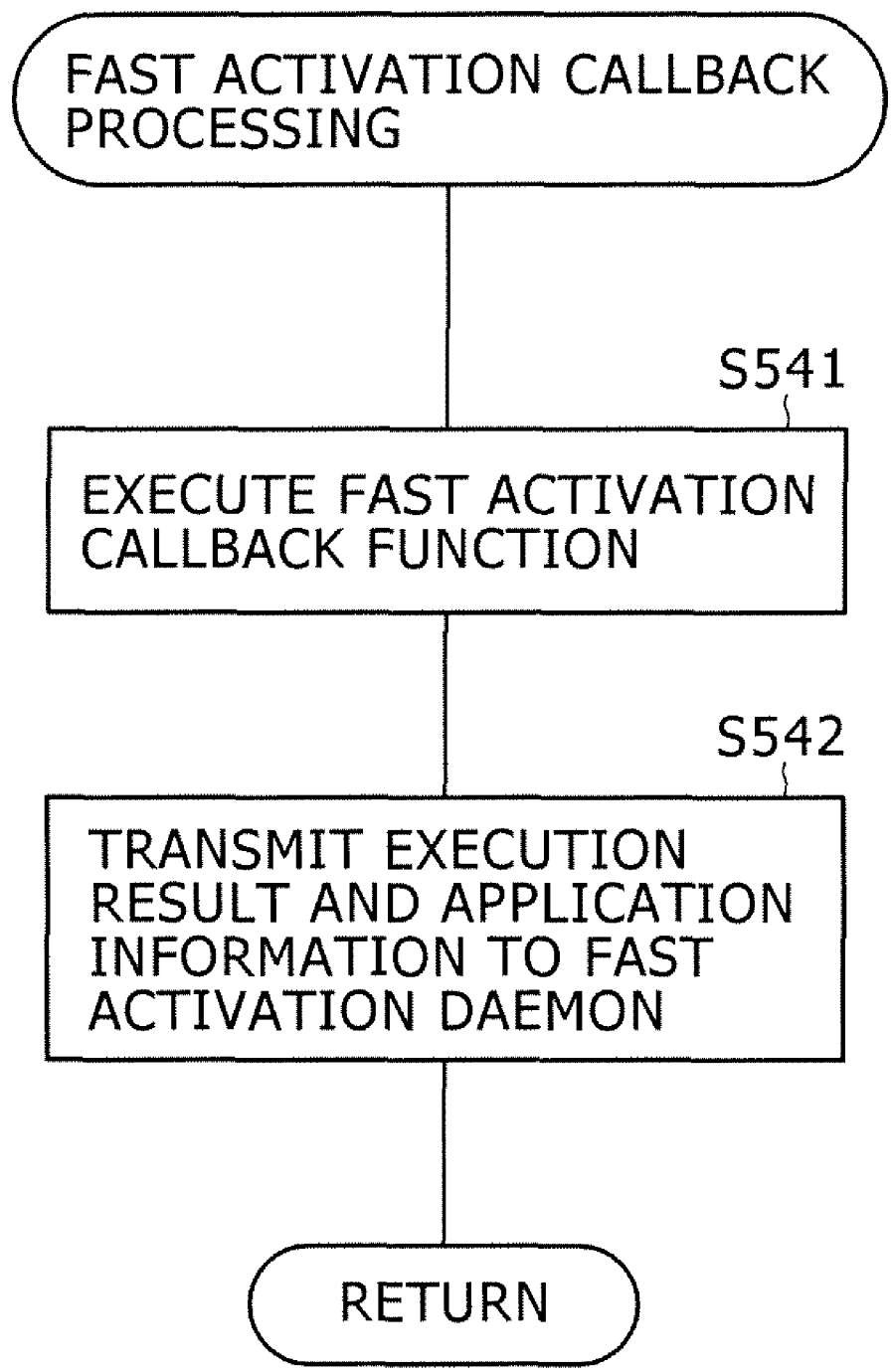
FIG. 12 is a diagram showing the procedure of the fast-activation callback processing in accordance with the embodiment of the present invention.

FIG. 12 is a diagram showing the procedure of the fast-activation callback processing carried out by the fast-activation daemon API 220 at the step S540 in accordance with the embodiment of the present invention.

As shown in the figure, the processing procedure begins with a step S541 at which the corresponding one of the fast-activation daemon APIs 220-1 to 220-*m* executes the fast-activation callback function when a request for execution of the fast-activation callback processing is made.

Then, at the next step S542, the corresponding one of the fast-activation daemon APIs 220-1 to 220-*m* transmits a result of the execution of the fast-activation callback function and information on the specific one of the applications 210-1 to 210-*m* that has made the request to the fast activation daemon 230.

Figure 13:
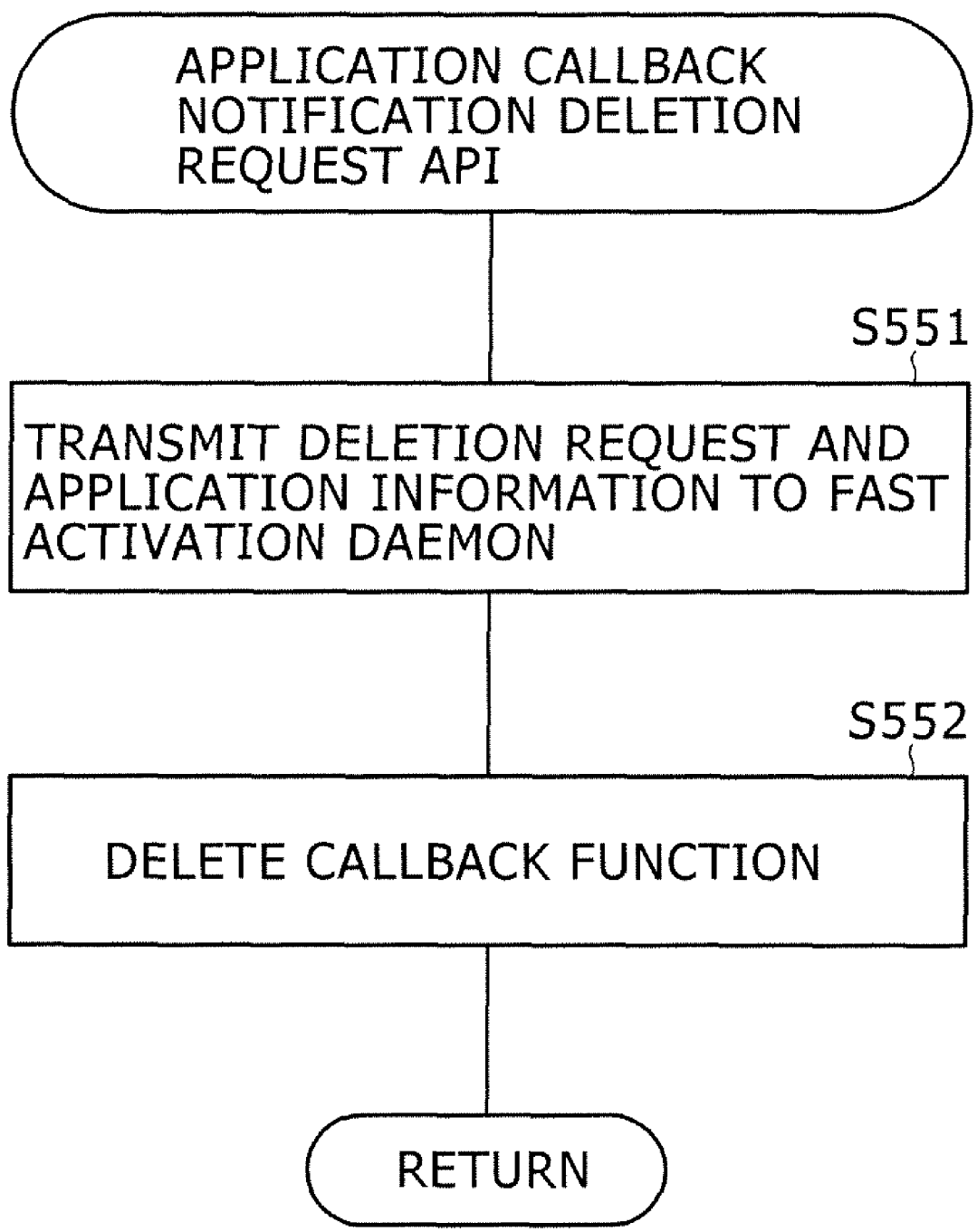
FIG. 13 is a diagram showing the processing procedure of the application callback notification deletion request API in accordance with the embodiment of the present invention.

FIG. 13 is a diagram showing the procedure of processing by the fast-activation daemon API 220 at the step S550 to process an application callback notification deletion request API in accordance with the embodiment of the present invention.

As shown in the figure, the processing procedure begins with a step S551 at which the corresponding one of the fast-activation daemon APIs 220-1 to 220-*m* transmits a request for deletion of the application callback notification and information on the specific one of the applications 210-1 to 210-*m* that has made the request to the fast activation daemon 230 when the application callback notification deletion request API is called.

Then, at the next step S552, the corresponding one of the fast-activation daemon APIs 220-1 to 220-*m* deletes the callback function from the callback-function table 14.

Figure 14:
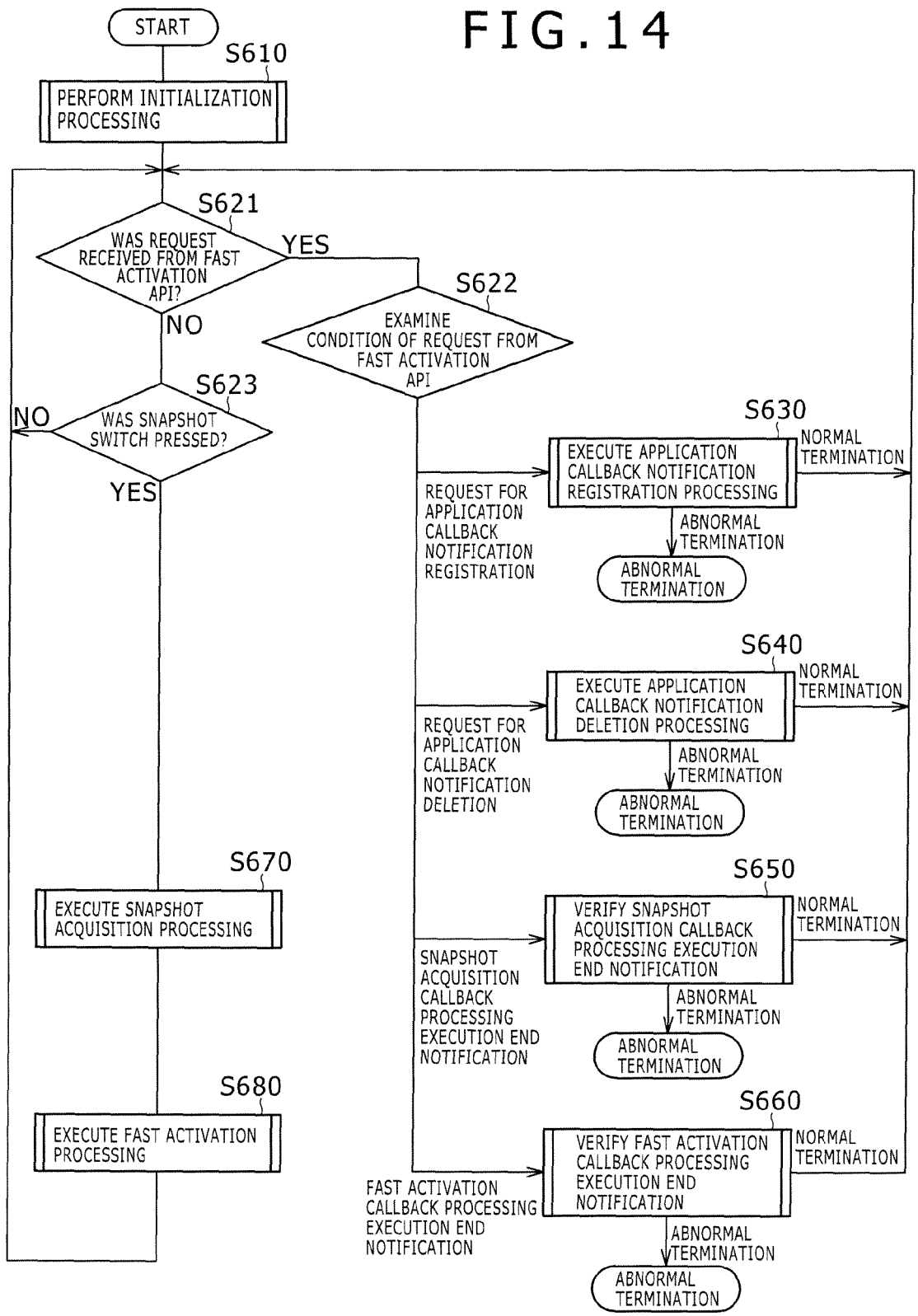
FIG. 14 is a diagram showing a typical procedure of entire processing carried out by a fast activation daemon in accordance with the embodiment of the present invention.

FIG. 14 is a diagram showing a typical procedure of entire processing carried out by the fast activation daemon 230 in accordance with the embodiment of the present invention.

As shown in the figure, the processing procedure begins with a step S610 at which the fast activation daemon 230 carries out initialization processing upon installation of the fast activation daemon 230. Then, the fast activation daemon 230 enters a state of waiting for a request to be made by any specific one of the fast-activation daemon APIs 220-1 to 220-*m* at a step S621 or waiting for the snapshot switch 170 to be pressed at a step S623 in case no request has been made by any specific one of the fast-activation daemon APIs 220-1 to 220-*m*.

If the snapshot switch 170 is found already pressed at the step S623, the flow of the processing procedure goes on to a step S670 at which the fast activation daemon 230 carries out snapshot acquisition processing. Then, at the next step S680, the fast activation daemon 230 carries out fast activation processing.

If a request is found already made by any specific one of the fast-activation daemon APIs 220-1 to 220-*m* at the step S621, the flow of the processing procedure goes on to a step S622 at which the fast activation daemon 230 examines a condition set in the request received from the specific one of the fast-activation daemon APIs 220-1 to 220-*m*. That is to say, if the request received from the specific one of the fast-activation daemon APIs 220-1 to 220-*m* is a request for registration of an application callback notification, the flow of the processing procedure goes on to a step S630 at which the fast activation daemon 230 carries out processing to register the application callback notification. If the request received from the specific one of the fast-activation daemon APIs 220-1 to 220-*m* is a request for deletion of an application callback notification, the flow of the processing procedure goes on to a step S640 at which the fast activation daemon 230 carries out processing to delete the application callback notification. If the request received from one of the fast-activation daemon APIs 220-1 to 220-*m* is actually a notification revealing the end of the execution of the snapshot acquisition callback processing, the flow of the processing procedure goes on to a step S650 at which the fast activation daemon 230 verifies the notification revealing the end of the execution of the snapshot acquisition callback processing. If the request received from one of the fast-activation daemon APIs 220-1 to 220-*m* is actually a notification revealing the end of the execution of the fast-activation callback processing, the flow of the processing procedure goes on to a step S660 at which the fast activation daemon 230 verifies the notification revealing the end of the execution of the fast-activation callback processing. If no abnormality is detected during the processing carried out the step S630 to register an application callback notification, the processing carried out the step S640 to delete an application callback notification, the processing carried out at the step S650 to verify a notification revealing the end of the execution of the snapshot acquisition callback processing or the processing carried out at the step S660 to verify a notification revealing the end of the execution of the fast-activation callback processing, the fast activation daemon 230 enters a state of waiting for a request to be made by any of the fast-activation daemon APIs 220-1 to 220-*m* at a step S621 or waiting for the snapshot switch 170 to be pressed at a step S623 in case no request has been made by any of the fast-activation daemon APIs 220-1 to 220-*m* as described above.

Figure 15:
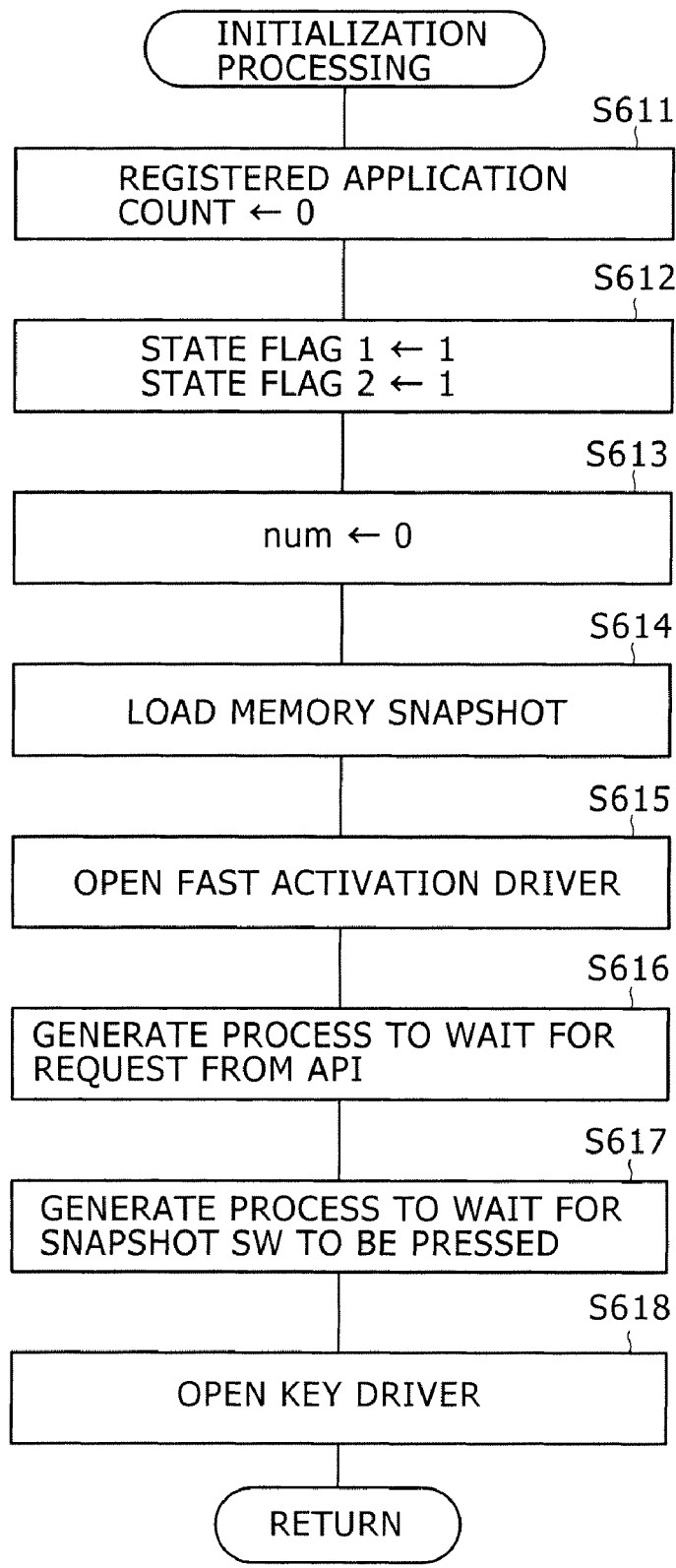
FIG. 15 is a diagram showing a typical procedure of entire initialization processing carried out by the fast activation daemon in accordance with the embodiment of the present invention.

FIG. 15 is a diagram showing a typical procedure of the entire initialization processing carried out by the fast activation daemon 230 at the step S610 in accordance with the embodiment of the present invention.

As shown in the figure, the processing procedure begins with a step S611 at which the fast activation daemon 230 clears a counter used for counting the number of registered applications to 0. Then, at the next step S612, the fast activation daemon 230 sets state flag 1 and state flag 2 at 1. State flag 1 is a flag, which has a value of 0 during a period of time between acquisition of a snapshot and the next activation in the fast activation mode. During periods other than such a period of time, state flag 1 has a value of 1. On the other hand, state flag 2 is a flag used for synchronization of the snapshot acquisition processing carried out at the step S670 with the processing carried out at the step S650 to verify a notification revealing the end of the execution of the snapshot acquisition callback processing as well as synchronization of the fast activation processing carried out at the step S680 with the processing carried out at the step S660 to verify a notification revealing the end of the execution of the fast-activation callback processing.

Subsequently, at the next step S613, the fast activation daemon 230 clears a variable num to 0. The variable num is a counter used for counting the number of callback functions terminated normally.

Then, at the next step S614, the fast activation daemon 230 loads a memory snapshot program 290 into the SDRAM 120. Subsequently, at the next step S615, the fast activation daemon 230 opens the fast activation driver 260. Then, at the next step S616, the fast activation daemon 230 generates a process to wait for a request to be made by any one of the fast-activation daemon APIs 220-1 to 220-*m*. This process is the processing carried out at the step S621 described earlier. Then, at the next step S617, the fast activation daemon 230 generates a process to wait for the snapshot switch 170 to be pressed. This process is the processing carried out at the step S623 described earlier. Finally, at the step S618, the fast activation daemon 230 opens the key driver 240 in order to set a state of being capable of detecting an operation to press the snapshot switch 170. The step S618 is the last step of the initialization processing.

Figure 16:
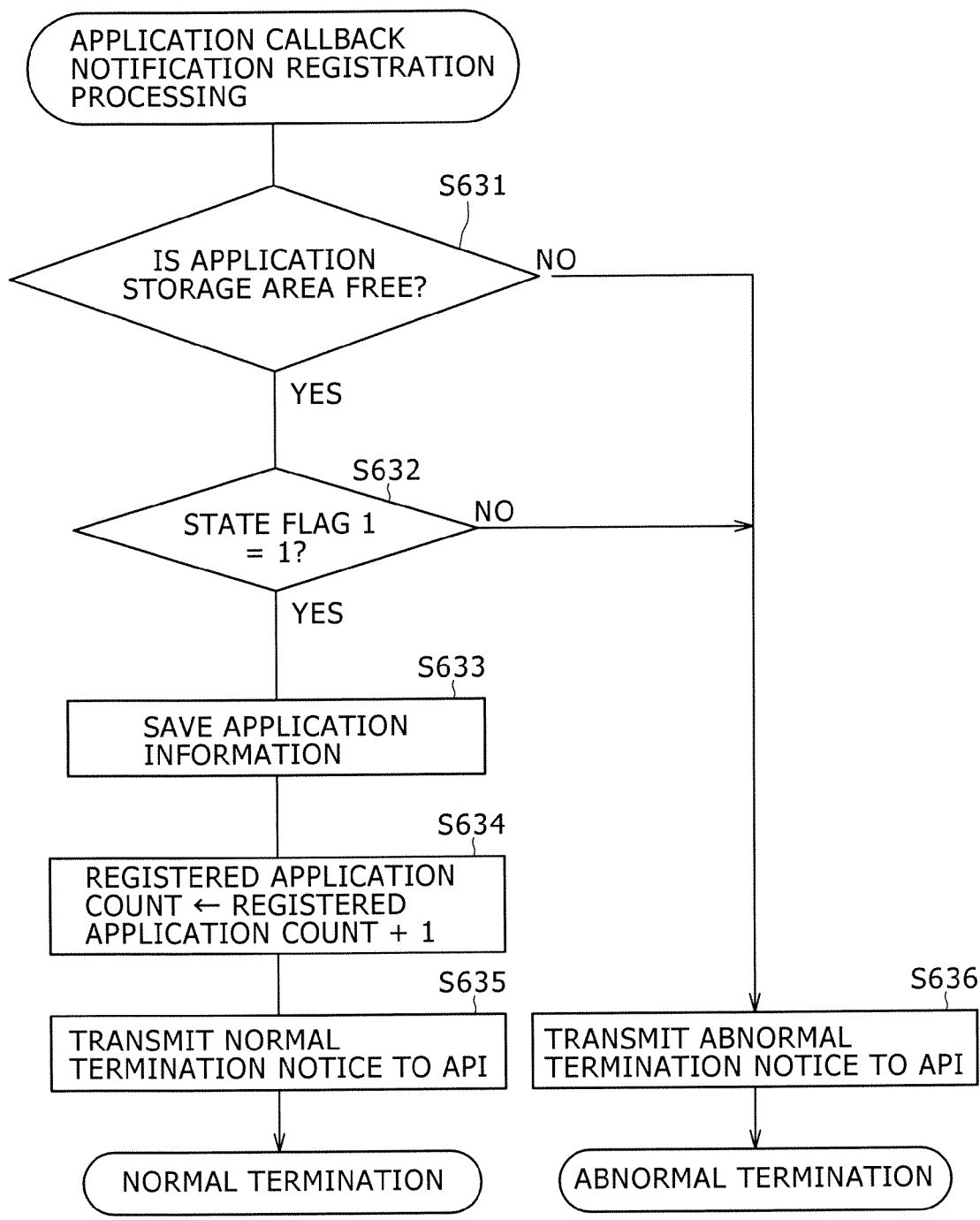
FIG. 16 is a diagram showing a typical procedure of entire application callback notification registration processing in accordance with the embodiment of the present invention.

FIG. 16 is a diagram showing a typical procedure of the entire processing carried out by the fast activation daemon 230 at the step S630 to register an application callback notification in accordance with the embodiment of the present invention.

As shown in the figure, the processing procedure begins with a step S631 at which the fast activation daemon 230 produces a result of determination as to whether or not an application storage area for storing applications has a free area. If the result of the determination indicates that the application storage area for storing applications has a free area, the flow of the processing procedure goes on to a step S632 at which the fast activation daemon 230 produces a result of determination as to whether or not state flag 1 has been set at 1. If the determination result produced at the step S631 indicates that the application storage area for storing applications does not have a free area or the determination result produced at the step S632 indicates that state flag 1 has not been set at 1, the flow of the processing procedure goes on to a step S636 at which the fast activation daemon 230 informs the specific one of the fast-activation daemon APIs 220-1 to 220-*m* that has made the request that the execution of the processing to register an application callback notification has been ended abnormally.

If the determination result produced at the step S631 indicates that the application storage area for storing applications has a free area and the determination result produced at the step S632 indicates that state flag 1 has been set at 1, on the other hand, the flow of the processing procedure goes on to a step S633 at which the fast activation daemon 230 saves information received from the specific one of the fast activation daemons API 220-1 to 220-*m* that has made the request as information on the corresponding one of the applications 210-1 to 210-*m* in the callback-function table 14. Then, at the next step S634, the fast activation daemon 230 increments the value of the counter used for counting the number of registered applications by 1. Subsequently, at the next step S635, the fast activation daemon 230 informs the specific one of the fast-activation daemon APIs 220-1 to 220-*m* that has made the request that the execution of the processing to register an application callback notification has been ended normally.

Figure 17:
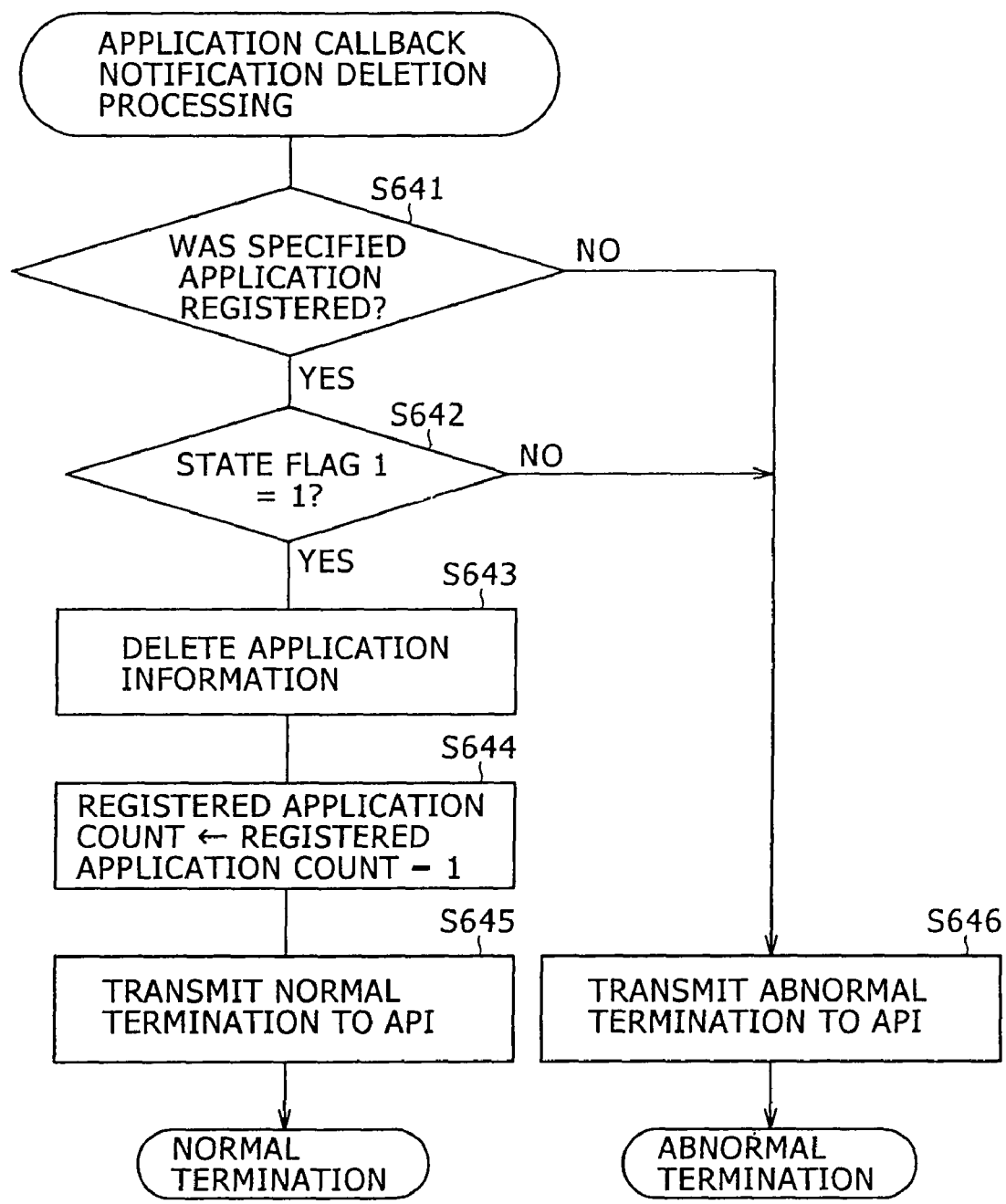
FIG. 17 is a diagram showing a typical procedure of entire application callback notification deletion processing in accordance with the embodiment of the present invention.

FIG. 17 is a diagram showing a typical procedure of the entire processing carried out by the fast activation daemon 230 at the step S640 to delete an application callback notification in accordance with the embodiment of the present invention.

As shown in the figure, the processing procedure begins with a step S641 at which the fast activation daemon 230 produces a result of determination as to whether or not a specified application has been registered. If the result of the determination indicates that a specified application has been registered, the flow of the processing procedure goes on to a step S642 at which the fast activation daemon 230 produces a result of determination as to whether or not state flag 1 has been set at 1. If the determination result produced at the step S641 indicates that specified no application has been registered or the determination result produced at the step S642 indicates that state flag 1 has not been set at 1, the flow of the processing procedure goes on to a step S646 at which the fast activation daemon 230 informs a specific one of the fast-activation daemon APIs 220-1 to 220-*m* that has made the request that the execution of the processing to delete an application callback notification has been ended abnormally.

If the determination result produced at the step S641 indicates that a specified application has been registered and the determination result produced at the step S642 indicates that state flag 1 has been set at 1, on the other hand, the flow of the processing procedure goes on to a step S643 at which the fast activation daemon 230 deletes information received from the specific one of the fast activation daemons API 220-1 to 220-*m* that has made the request as information on the corresponding one of the applications 210-1 to 210-*m* from the callback-function table 14. Then, at the next step S644 the fast activation daemon 230 decrements the value of the counter used for counting the number of registered applications by 1. Subsequently, at the next step S645, the fast activation daemon 230 informs the specific one of the fast-activation daemon APIs 220-1 to 220-*m* that has made the request that the execution of the processing to delete an application callback notification has been ended normally.

Figure 18:
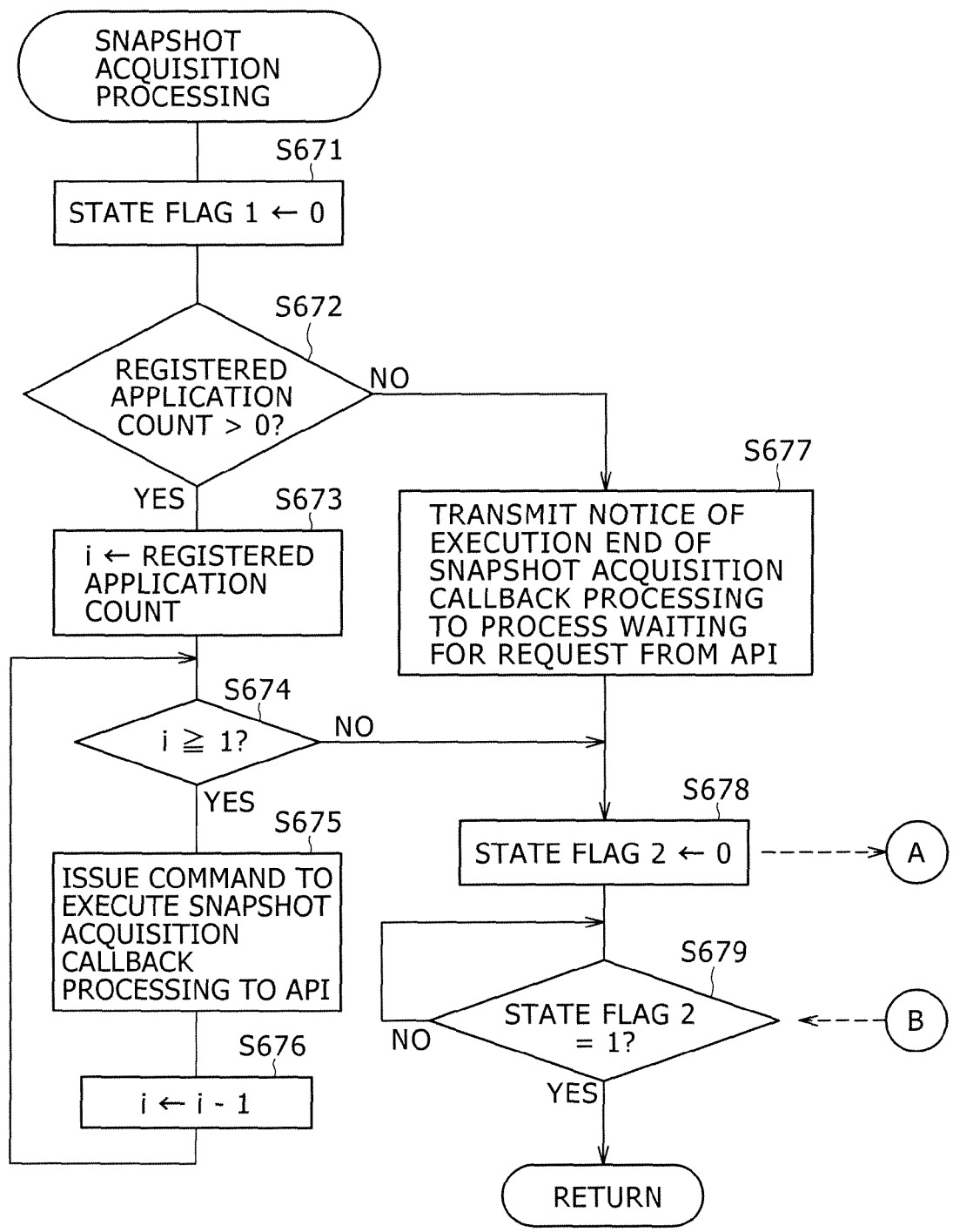
FIG. 18 is a diagram showing a typical procedure of entire snapshot acquisition processing in accordance with the embodiment of the present invention.

FIG. 18 is a diagram showing a typical procedure of the entire snapshot acquisition processing carried out by the fast activation daemon 230 at the step S670 in accordance with the embodiment of the present invention.

As shown in the figure, the processing procedure begins with a step S671 at which the fast activation daemon 230 clears state flag 1 to 0. Then, at the next step S672, the fast activation daemon 230 produces a result of determination as to whether or not the value of a counter used for counting the number of registered applications is greater than 0. If the result of the determination indicates that the value of the counter used for counting the number of registered applications is greater than 0, the flow of the processing goes on to a step S673 at which the fast activation daemon 230 sets a variable i at the value of the counter used for counting the number of registered applications. Then, at the next step S674, the fast activation daemon 230 produces a result of determination as to whether or not the value of the variable i is equal to or greater than 1. If the determination result produced at the step S674 indicates that the value of the variable i is equal to or greater than 1, the flow of the processing goes on to a step S675 at which the fast activation daemon 230 issues a command to execute snapshot acquisition callback processing to a specific fast-activation daemon API 220-*i*. Then, at the next step S676, the value of the variable i is decremented by 1. Subsequently, the flow of the processing goes back to the step S674. In this way, by carrying out the processes of the steps S674 to S676, the fast activation daemon 230 issues a command to execute snapshot acquisition callback processing to a specific one of the fast-activation daemon APIs 220-1 to 220-*m* sequentially one API after another in an order opposite to the order in which the applications 210-1 to 210-*m* have been registered as long as the value of the variable i is equal to or greater than 1.

If the determination result produced at the step S672 indicates that the value of the counter used for counting the number of registered applications is not greater than 0, on the other hand, the flow of the processing goes on to a step S677 at which the fast activation daemon 230 transmits a notice indicating the end of execution of the snapshot acquisition callback processing to the process carried out at the step S621 in a state of waiting for a request from a specific one of the fast-activation daemon APIs 220-1 to 220-*m*.

Then, at the next step S678, the fast activation daemon 230 clears state flag 2 to 0 to establish a synchronization point A. It is to be noted that the flow of the processing procedure also goes on from the step S673 to the step S678 if the determination result produced at the step S674 indicates that the value of the variable i is smaller than 1. Then, at the next step S679, the fast activation daemon 230 produces a result of determination as to whether or not state flag 2 is equal to 1 in a state of waiting state flag 2 to be set at 1 in the processing carried out at the step S650 to verify a notification revealing the end of the execution of the snapshot acquisition callback processing in order to establish a synchronization point B.

Figure 19:
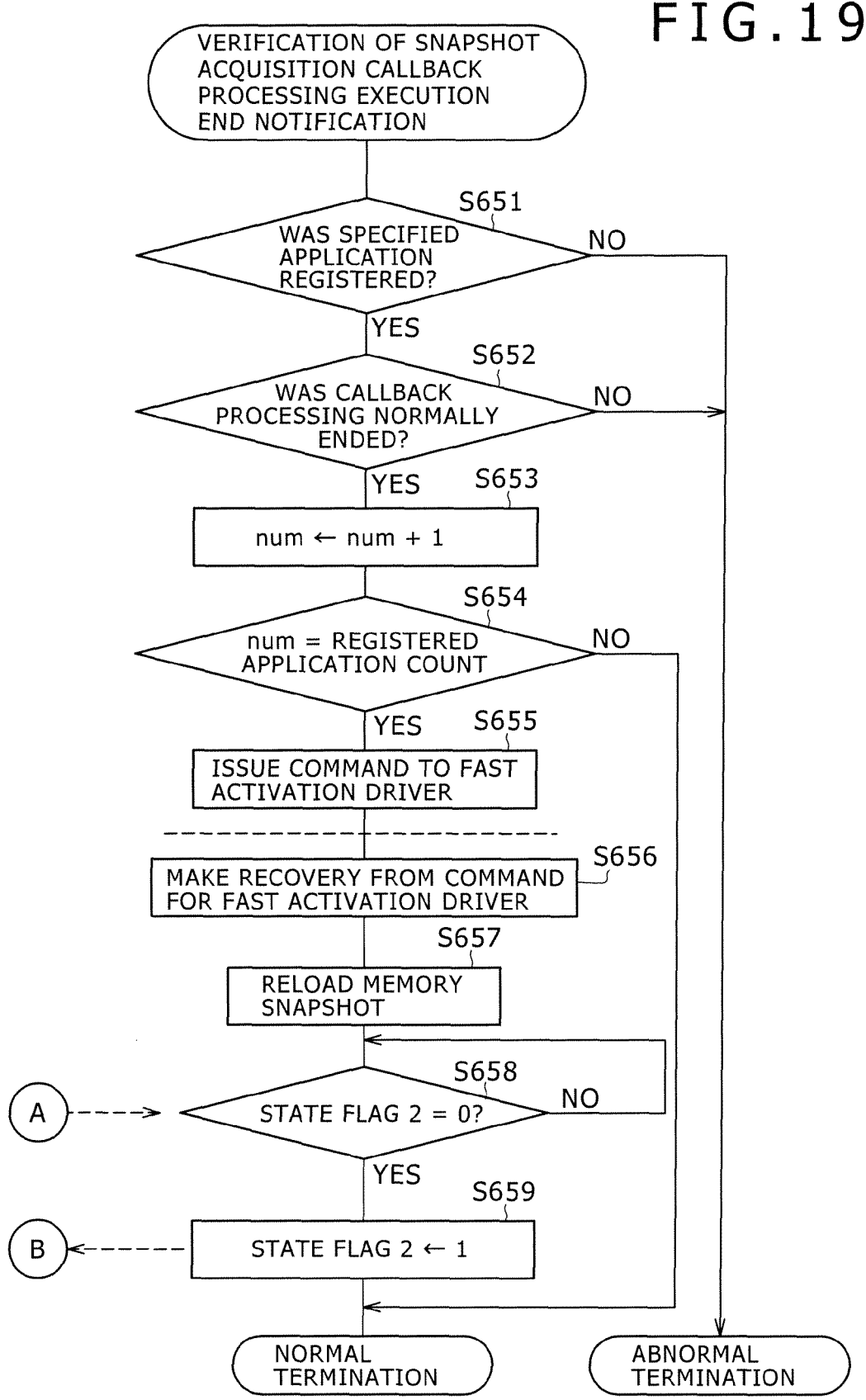
FIG. 19 is a diagram showing a typical procedure of entire processing to verify a notification of the end of the execution of snapshot acquisition callback processing in accordance with the embodiment of the present invention.

FIG. 19 is a diagram showing a typical procedure of the entire processing carried out by the fast activation daemon 230 at the step S650 to verify a notification revealing the end of the execution of the snapshot acquisition callback processing in accordance with the embodiment of the present invention.

As shown in the figure, the processing procedure begins with a step S651 at which the fast activation daemon 230 produces a result of determination as to whether or not a specified application has been registered. If the result of the determination indicates that a specified application has been registered, the flow of the processing procedure goes on to a step S652 at which the fast activation daemon 230 produces a result of determination as to whether or not the execution of the callback processing has been normally ended. If the determination result produced at the step S651 indicates that no specified application has been registered or the determination result produced at the step S652 indicates that the execution of the callback processing was not normally ended, the execution of the processing carried out by the fast activation daemon 230 is ended abnormally.

If the determination result produced at the step S651 indicates that a specified application has been registered and the determination result produced at the step S652 indicates that the execution of the callback processing has been normally ended, on the other hand, the flow of the processing procedure goes on to a step S653 at which the fast activation daemon 230 increments the value of the variable num by 1. Then, at the next step S654, the fast activation daemon 230 produces a result of determination as to whether or not the value of the variable num is equal to the value of a counter used for counting the number of registered applications. If the determination result produced at the step S654 indicates that the value of the variable num is not equal to the value of the counter, the execution of the processing to verify a notification of the end of the execution of snapshot acquisition callback processing is ended normally without doing anything else. This is because there is other snapshot acquisition callback processing waiting for the execution of this processing. If the determination result produced at the step S654 indicates that the value of the variable num is equal to the value of the counter, on the other hand, the flow of the processing procedure goes on to a step S655 at which the fast activation daemon 230 issues a command to the fast activation driver 260 because the execution of the last snapshot acquisition callback processing has been ended and, then, the fast activation daemon 230 enters a state of waiting for a recovery.

Then, at the next step S656, when an activation operation is carried out in a fast activation mode, a recovery is made from the command for the fast activation driver 260. Subsequently, at the next step S657, the fast activation daemon 230 reloads the memory snapshot program 290 into the SDRAM 120. Then, at the next step S658, the fast activation daemon 230 confirms that state flag 2 has been cleared to 0 in order to establish the synchronization point A. If state flag 2 has not been cleared to 0, the flow of the processing procedure goes back to the step S658 to repeat the confirmation process in a state of waiting for state flag 2 to be cleared to 0 in the snapshot acquisition processing carried out at the step S670. After state flag 2 has been cleared to 0, the flow of the processing procedure goes on to a step S659 at which the fast activation daemon 230 again sets state flag 2 at 1 in order to establish the synchronization point B.

Figure 20:
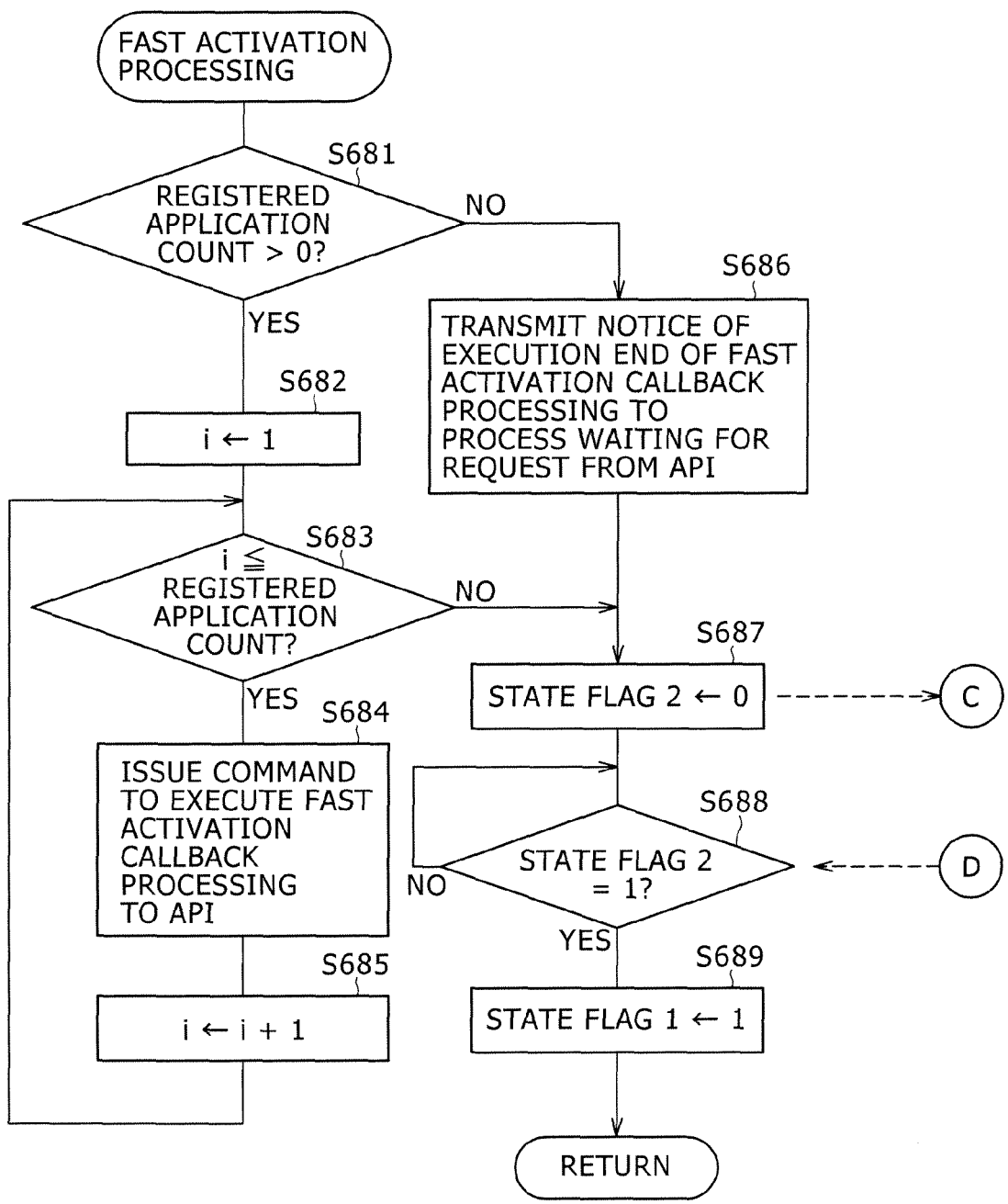
FIG. 20 is a diagram showing a typical procedure of entire fast activation processing in accordance with the embodiment of the present invention.

FIG. 20 is a diagram showing a typical procedure of the entire fast activation processing carried out by the fast activation daemon 230 at the step S680 in accordance with the embodiment of the present invention.

As shown in the figure, the processing procedure begins with a step S681 at which the fast activation daemon 230 produces a result of determination as to whether or not the value of a counter used for counting the number of registered applications is greater than 0. If the result of the determination indicates that the value of a counter used for counting the number of registered applications is greater than 0, the flow of the processing procedure goes on to a step S682 at which the fast activation daemon 230 sets the value of a variable i at 1. Then, at the next step S683, the fast activation daemon 230 produces a result of determination as to whether or not the value of the variable i is equal to or smaller than the value of the counter used for counting the number of registered applications. If the determination result produced at the step S683 indicates that the value of the variable i is equal to or smaller than the value of the counter, the flow of the processing goes on to a step S684 at which the fast activation daemon 230 issues a command to execute fast-activation callback processing to a specific fast-activation daemon API 220-i. Then, at the next step S685, the value of the variable i is incremented by 1. Subsequently, the flow of the processing goes back to the step S683. In this way, by carrying out the processes of the steps S683 to S685, the fast activation daemon 230 issues a command to execute fast-activation callback processing to a specific one of the fast-activation daemon APIs 220-1 to 220-m sequentially one API after another in an order in which the applications 210-1 to 210-m have been registered as long as the value of the variable i is equal to or smaller than the value of the counter used for counting the number of registered applications.

If the determination result produced at the step S681 indicates that the value of a counter used for counting the number of registered applications is not greater than 0, on the other hand, the flow of the processing procedure goes on to a step S686 at which the fast activation daemon 230 transmits a notice revealing the end of execution of the fast-activation callback processing to the process carried out at the step S621 to wait for a request from one of the fast-activation daemon APIs 220-1 to 220-m.

After the process carried out the step S686 is completed, the flow of the processing procedure goes on to a step S687 at which the fast activation daemon 230 clears state flag 2 to 0 in order to establish a synchronization point C. Then, at the next step S688, the fast activation daemon 230 enters a state of waiting for state flag 2 to be set at 1 in the processing carried out at the step S660 to verify a notification revealing the end of the execution of fast-activation callback processing in order to establish a synchronization point D. As state flag 2 is set at 1, the flow of the processing procedure goes on to a step S689 at which the fast activation daemon 230 sets state flag 1 at 1.

Figure 21:
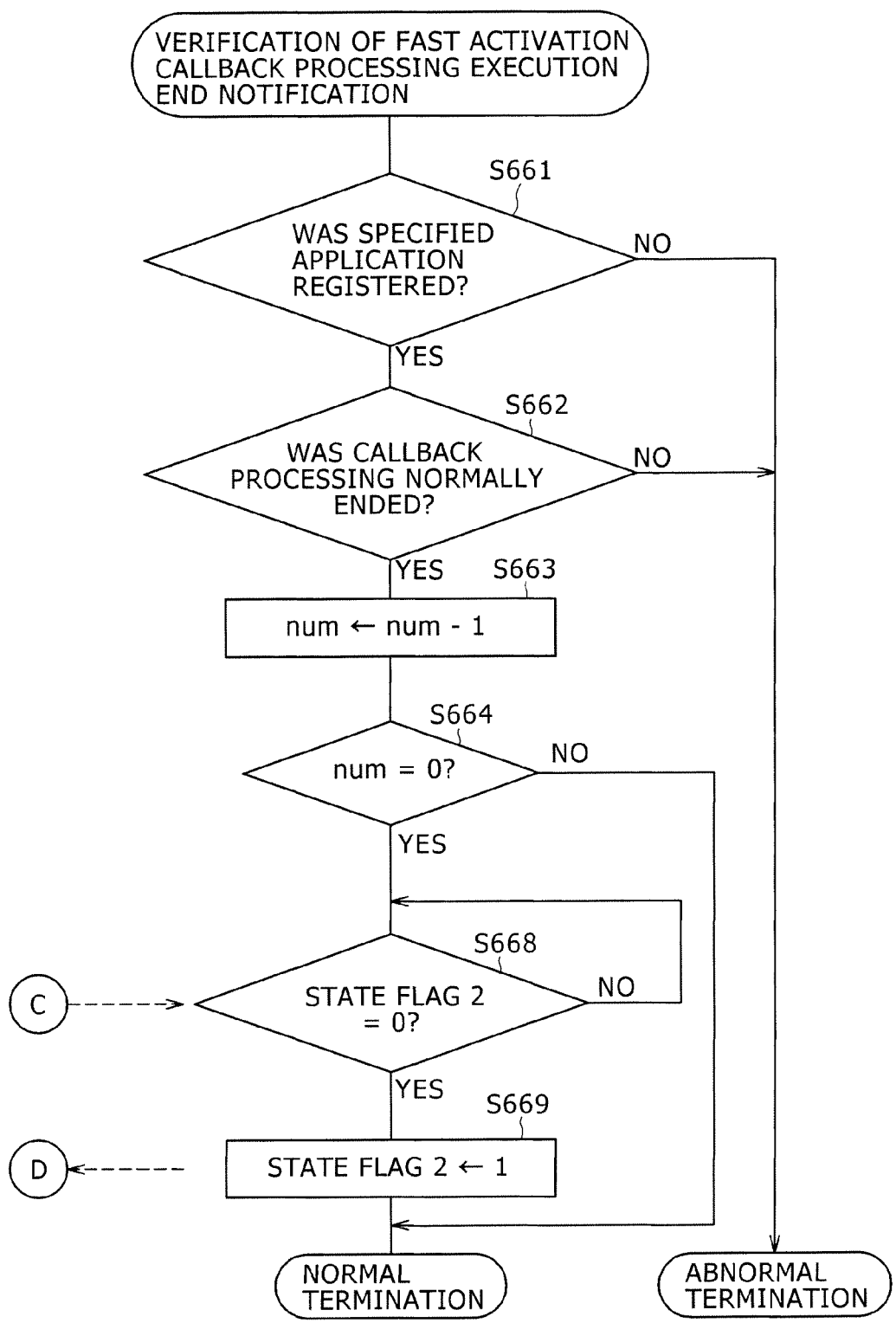
FIG. 21 is a diagram showing a typical procedure of entire processing carried out to verify a notification of the end of the execution of fast-activation callback processing in accordance with the embodiment of the present invention.

FIG. 21 is a diagram showing a typical procedure of the entire processing carried out by the fast activation daemon 230 at the step S660 to verify a notification revealing the end of the execution of fast-activation callback processing in accordance with the embodiment of the present invention.

As shown in the figure, the processing procedure begins with a step S661 at which the fast activation daemon 230 produces a result of determination as to whether or not a specified application has been registered. If the result of the determination indicates that a specified application has been registered, the flow of the processing procedure goes on to a step S662 at which the fast activation daemon 230 produces a result of determination as to whether or not the execution of the callback processing has been normally ended. If the determination result produced at the step S661 indicates that no specified application has been registered or the determination result produced at the step S662 indicates that the execution of the callback processing was not normally ended, the execution of the processing carried out by the fast activation daemon 230 to verify a notification revealing the end of the execution of fast-activation callback processing is ended abnormally.

If the determination result produced at the step S661 indicates that a specified application has been registered and the determination result produced at the step S662 indicates that the execution of the callback processing has been normally ended, on the other hand, the flow of the processing procedure goes on to a step S663 at which the fast activation daemon 230 decrements the value of the variable num by 1. Then, at the next step S664, the fast activation daemon 230 produces a result of determination as to whether or not the value of the variable num is equal to 0. If the determination result produced at the step S664 indicates that the value of the variable num is not equal to 0, the processing carried out by the fast activation daemon 230 to verify a notification revealing the end of the execution of fast-activation callback processing is ended normally without doing anything else. This is because there is other fast-activation callback processing waiting for the end of the execution of this processing represented by the flowchart shown in FIG. 21. If the determination result produced at the step S664 indicates that the value of the variable num is equal 0, on the other hand, the flow of the processing procedure goes on to a step S668 at which the fast activation daemon 230 confirms that state flag 2 has been cleared to 0 in order to establish the synchronization point C. If state flag 2 has not been cleared to 0, the flow of the processing procedure goes back to the step S668 to repeat the confirmation process in a state of waiting for state flag 2 to be cleared to 0 in the fast activation processing carried out at the step S680. After state flag 2 has been cleared to 0, the flow of the processing procedure goes on to a step S669 at which the fast activation daemon 230 again sets state flag 2 at 1 in order to establish the synchronization point D.

Figure 22:
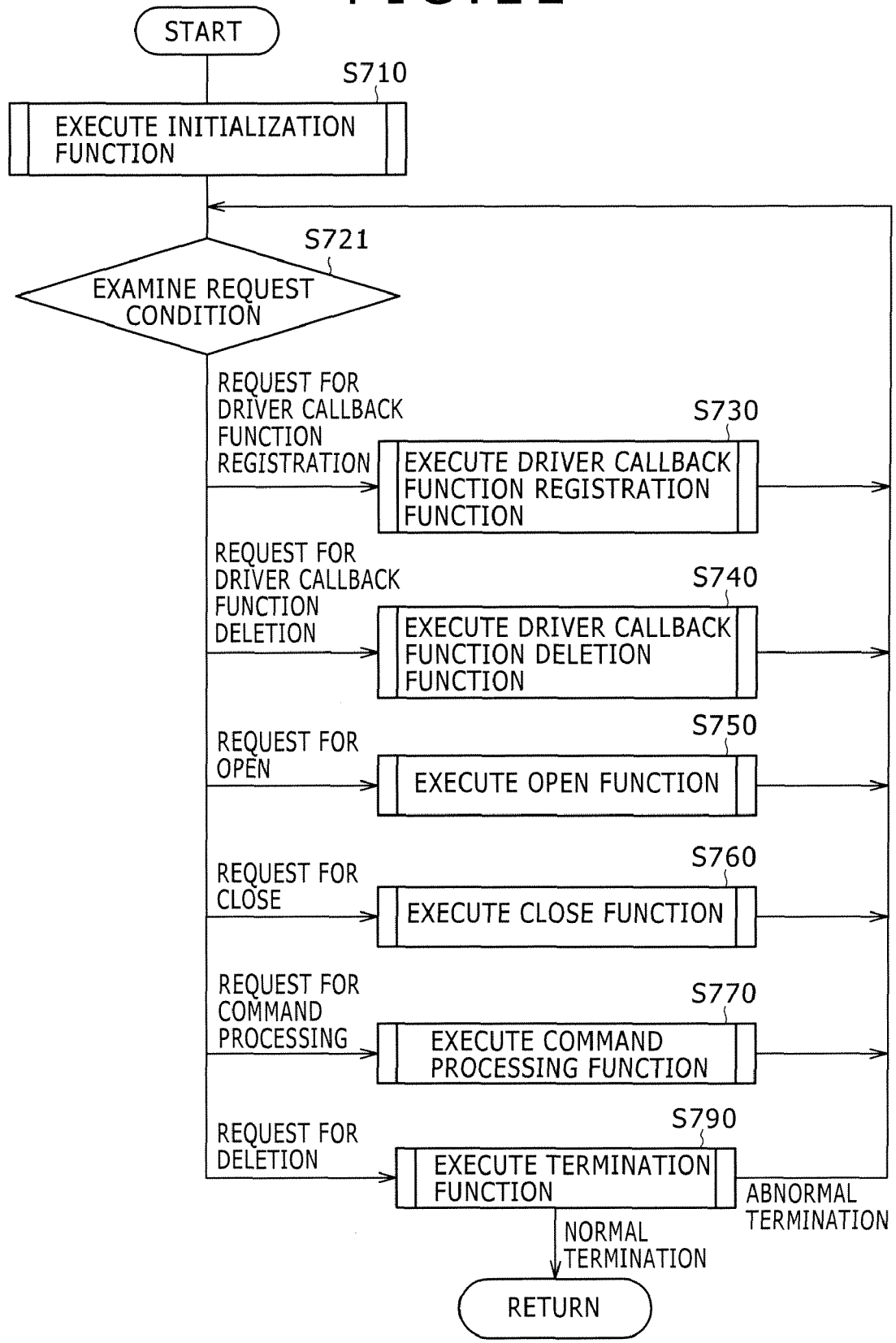
FIG. 22 is a diagram showing a typical procedure of entire processing carried out by a fast activation driver in accordance with the embodiment of the present invention.

FIG. 22 is a diagram showing a typical procedure of the entire processing carried out by the fast activation driver 260 in accordance with the embodiment of the present invention.

As shown in the figure, the processing procedure begins with a step S710 at which the fast activation driver 260 executes an initialization function upon installation of the fast activation driver 260. Then, at the next step S721, the fast activation driver 260 enters a state of waiting for a request to be transmitted by any of the other drivers 240 and 250-1 to 250-n or from any of the applications 210-1 to 210-m. As a request is received, the fast activation driver 260 examines a condition described in the request and executes a function in accordance with the condition. That is to say, if the received request is a request for registration of a driver callback function, the flow of the processing procedure goes on to a step S730 at which the fast activation driver 260 executes a function to register a driver callback function. If the received request is a request for deletion of a driver callback function, the flow of the processing procedure goes on to a step S740 at which the fast activation driver 260 executes a function to delete a driver callback function. If the received request is an open request, the flow of the processing procedure goes on to a step S750 at which the fast activation driver 260 executes an open function. If the received request is a close request, the flow of the processing procedure goes on to a step S760 at which the fast activation driver 260 executes a close function. If the received request is a request for command processing, the flow of the processing procedure goes on to a step S770 at which the fast activation driver 260 executes a command processing function. If the received request is a deletion request, the flow of the processing procedure goes on to a step S790 at which the fast activation driver 260 executes a termination function. After one of these functions is executed, the flow of the processing procedure goes back to the step S721, at which the fast activation driver 260 again enters a state of waiting for a request to be transmitted by any of the other drivers 240 and 250-1 to 250-n or from any of the applications 210-1 to 210-m. In the case of the termination function executed at the step S790, however, the flow of the processing procedure goes back to the step S721 only if the execution of the termination function is ended abnormally. If the execution of the termination function is ended normally, on the other hand, the fast activation driver 260 terminates the processing represented by the flowchart shown in FIG. 22.

Figure 23:
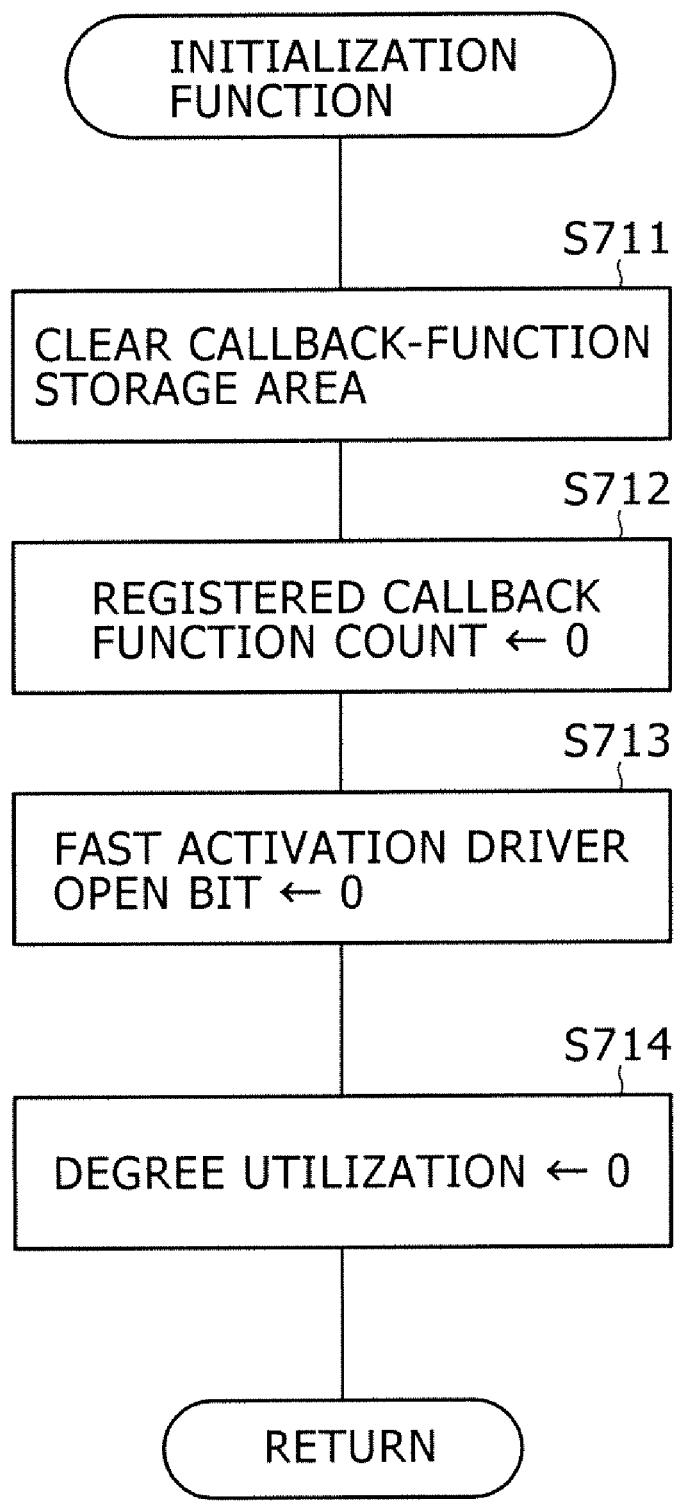
FIG. 23 is a diagram showing a typical entire processing procedure of an initialization function in accordance with the embodiment of the present invention.

FIG. 23 is a diagram showing a typical entire processing procedure of the initialization function executed by the fast activation driver 260 at the step S710 in accordance with the embodiment of the present invention.

As shown in the figure, the processing procedure begins with a step S711 at which the fast activation driver 260 clears the callback-function table 14. Then, at the next step S712, the fast activation driver 260 clears the value of a counter used for counting the number of callback functions registered in the callback-function table 14 to 0.

Subsequently, at the next step S713, the fast activation driver 260 clears an open bit of the fast activation driver 260 to 0. It is to be noted that the open bit is a bit for assuring exclusive execution of the fast activation driver 260. The exclusive execution prevents another executer from executing the fast activation driver 260 at the same time.

Finally, at the last step S714, the fast activation driver 260 clears a degree of utilization to 0. It is to be noted that the degree of utilization of a driver is an indicator representing the degree to which the driver is utilized in the operating system. When set at 1 or at an integer greater than 1, the degree of utilization of a driver indicates that the driver cannot be deleted.

Figure 24:
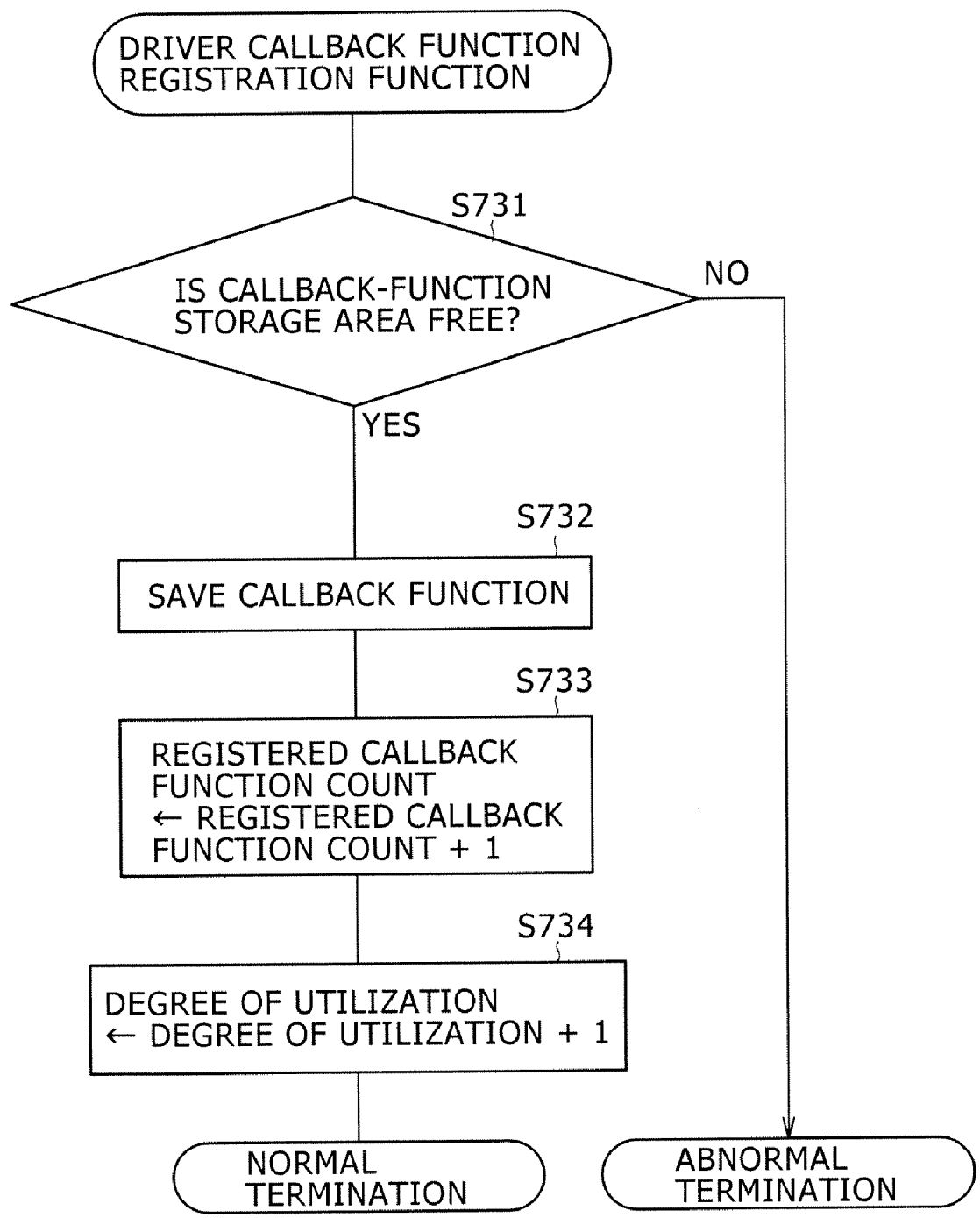
FIG. 24 is a diagram showing a typical entire processing procedure of a driver callback function registration function in accordance with the embodiment of the present invention.

FIG. 24 is a diagram showing a typical entire processing procedure of a function executed by the fast activation driver 260 at the step S730 to register a driver callback function in accordance with the embodiment of the present invention.

As shown in the figure, the processing procedure begins with a step S731 at which the fast activation driver 260 produces a result of determination as to whether or not the callback-function table 14 includes a free area. If the result of the determination indicates that the callback-function table 14 does not include a free area, the execution of the function to register a driver callback function is terminated abnormally. If the determination result produced at the step S731 indicates that the callback-function table 14 includes a free area, on the other hand, the flow of the processing procedure goes on to a step S732 at which the fast activation driver 260 saves the driver callback function in the callback-function table 14. Then, at the next step S733, the fast activation driver 260 increments the value of a counter used for counting the number of registered callback functions by 1. Finally, at the last step S734, the fast activation driver 260 increments the degree of utilization by 1.

Figure 25:
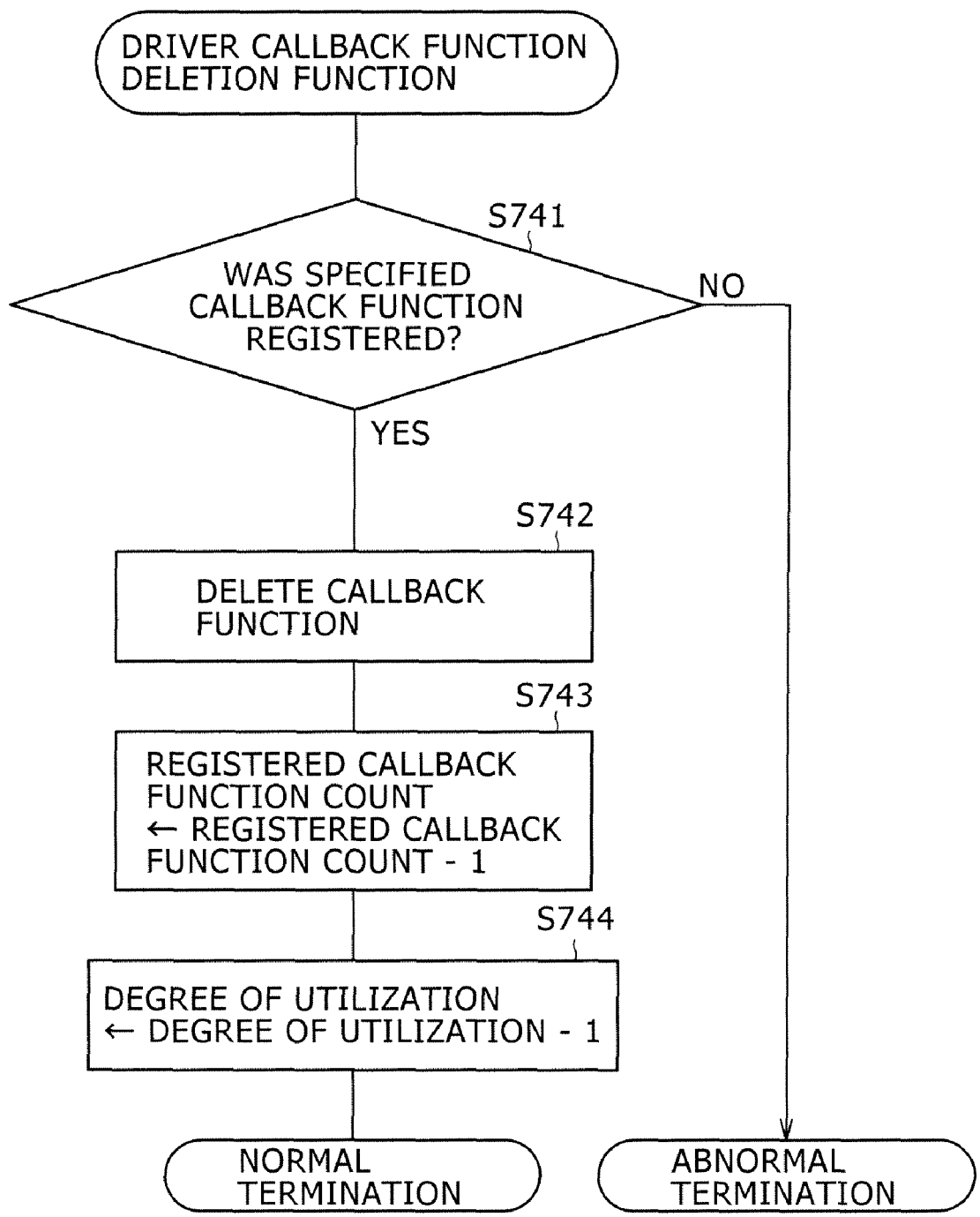
FIG. 25 is a diagram showing a typical entire processing procedure of a driver callback function deletion function in accordance with the embodiment of the present invention.

FIG. 25 is a diagram showing a typical entire processing procedure of a function executed by the fast activation driver 260 at the step S740 to delete a driver callback function in accordance with the embodiment of the present invention.

As shown in the figure, the processing procedure begins with a step S741 at which the fast activation driver 260 produces a result of determination as to whether or not a specified driver callback function has been registered. If the result of the determination indicates that no specified driver callback function has been registered, the execution of the driver callback function registration function is terminated abnormally. If the determination result produced at the step S741 indicates that a specified driver callback function has been registered, on the other hand, the flow of the processing procedure goes on to a step S742 at which the fast activation driver 260 deletes the driver callback function from the callback-function table 14. Then, at the next step S743, the fast activation driver 260 decrements the value of the counter used for counting the number of registered callback functions by 1. Finally, at the last step S744, the fast activation driver 260 decrements the degree of utilization by 1.

Figure 26:
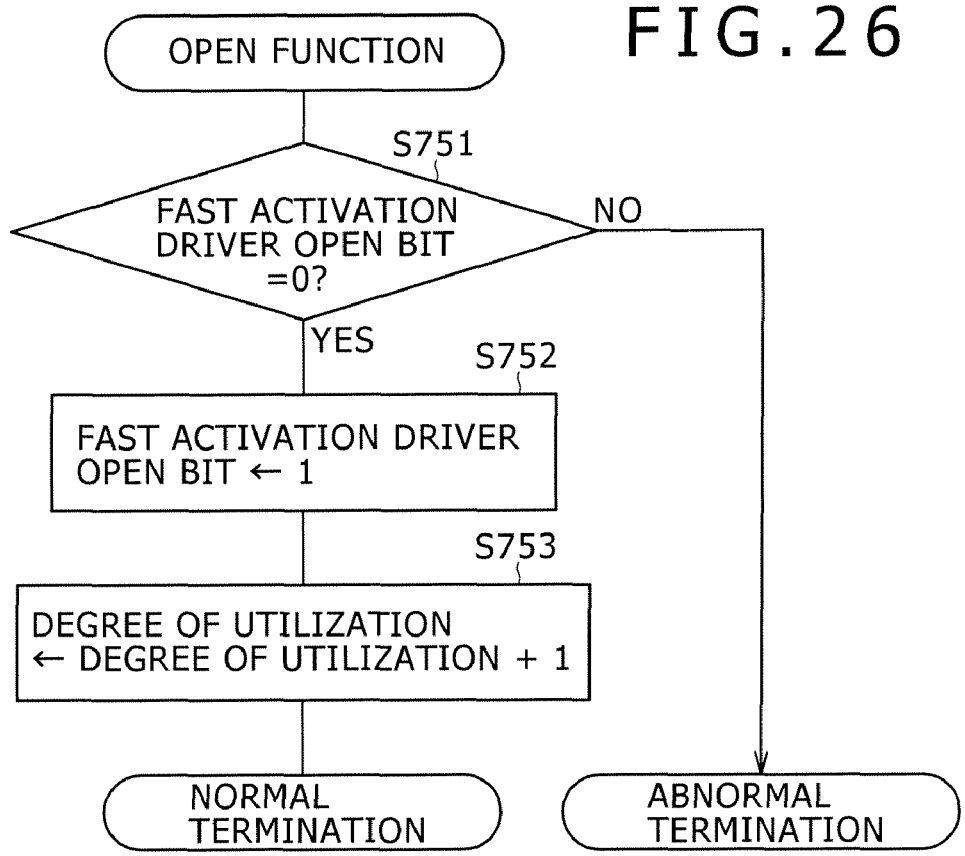
FIG. 26 is a diagram showing a typical entire processing procedure of an open function in accordance with the embodiment of the present invention.

FIG. 26 is a diagram showing a typical entire processing procedure of the open function executed by the fast activation driver 260 at the step S750 in accordance with the embodiment of the present invention.

As shown in the figure, the processing procedure begins with a step S751 at which the fast activation driver 260 produces a result of determination as to whether or not an open bit of the fast activation driver 260 has been cleared to 0. If the result of the determination indicates that the open bit of the fast activation driver 260 has not been cleared to 0, the execution of the open function is terminated abnormally. If the result of the determination indicates that the open bit of the fast activation driver 260 has been cleared to 0, on the other hand, the flow of the processing procedure goes on to a step S752 at which the fast activation driver 260 sets the open bit of the fast activation driver 260 at 1. Then, at the next step S753, the fast activation driver 260 increments the degree of utilization by 1.

Figure 27:
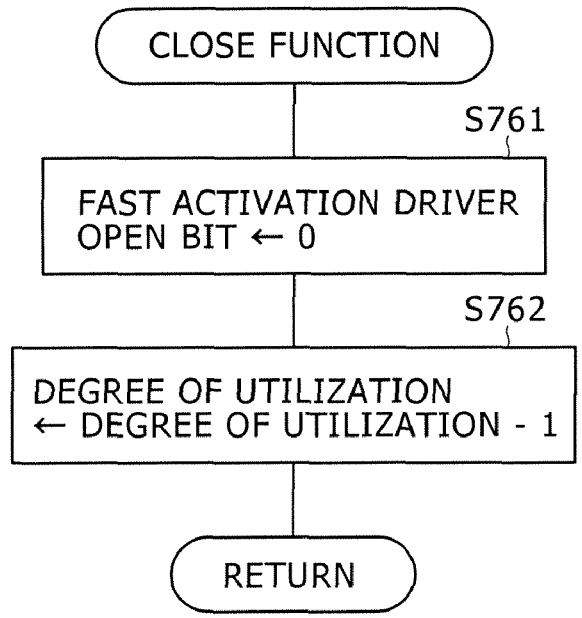
FIG. 27 is a diagram showing a typical entire processing procedure of a close function in accordance with the embodiment of the present invention.

FIG. 27 is a diagram showing a typical entire processing procedure of the close function executed by the fast activation driver 260 at the step S760 in accordance with the embodiment of the present invention.

As shown in the figure, the processing procedure begins with a step S761 at which the fast activation driver 260 clears the open bit of the fast activation driver 260 to 0. Then, at the next step S762, the fast activation driver 260 decrements the degree of utilization by 1.

Figure 28:
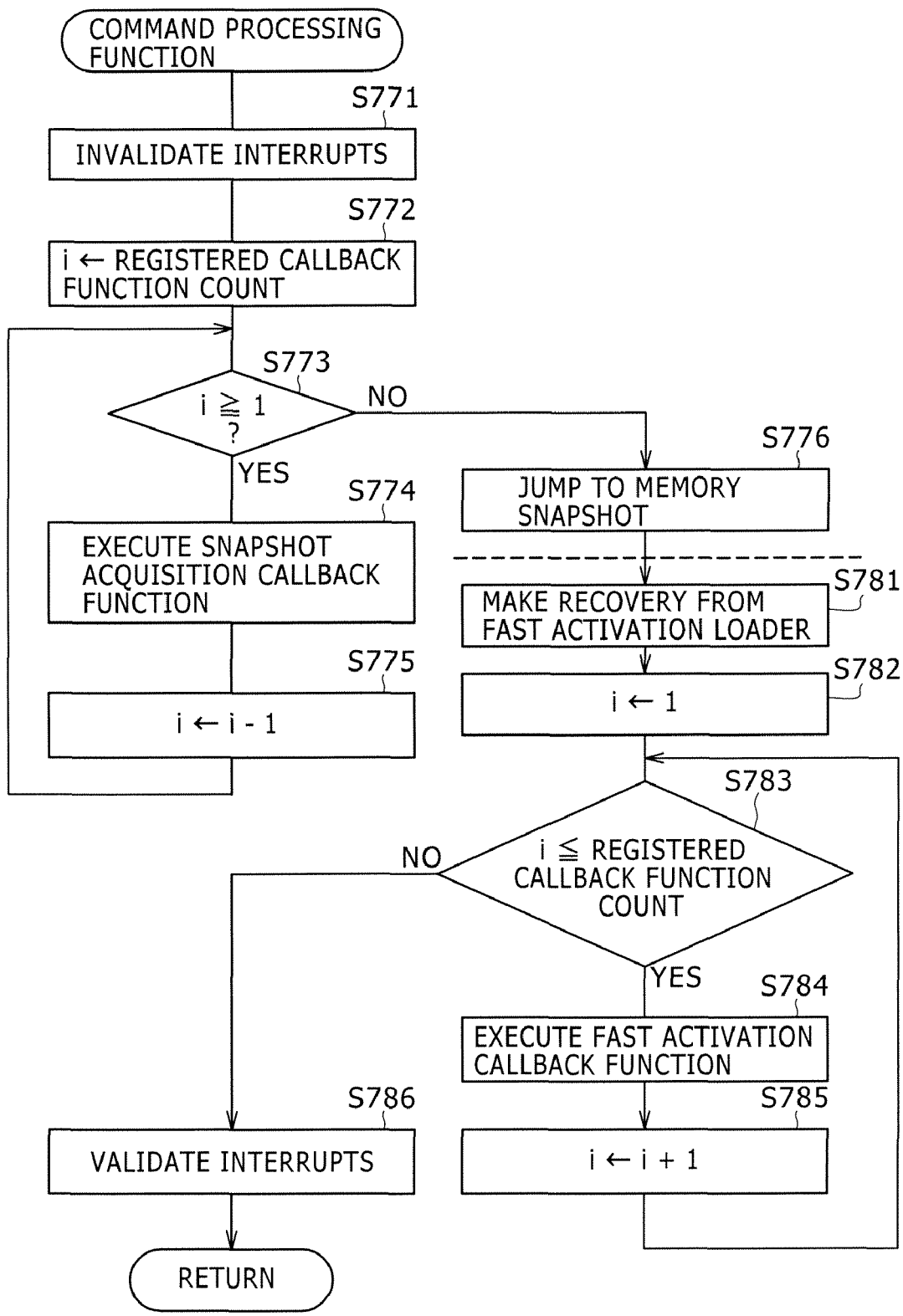
FIG. 28 is a diagram showing a typical entire processing procedure of a command processing function in accordance with the embodiment of the present invention.

FIG. 28 is a diagram showing a typical entire processing procedure of the command processing function executed by the fast activation driver 260 at the step S770 in accordance with the embodiment of the present invention.

As shown in the figure, the processing procedure begins with a step S771 at which the fast activation driver 260 invalidates other interrupts, ignoring the interrupts. Then, at the next step S772, the fast activation driver 260 sets a variable i at the value of a counter used for counting the number of registered callback functions.

Subsequently, at the next step S773, the fast activation driver 260 produces a result of determination as to whether or not the value of the variable i is equal to or greater than 1. If the result of the determination indicates that the value of the variable i is equal to or greater than 1, the flow of the processing procedure goes on to a step S774 at which the fast activation driver 260 executes the snapshot acquisition callback function of the key driver 240 for i=1 or the snapshot acquisition callback function of the device driver 250-(i−1) for i>1. Then, at the next step S775 the fast activation driver 260 decrements the value of the variable i. Subsequently, the flow of the processing procedure goes back to the step S773. In this way, by carrying out the processes of the steps S773 to S775, the fast activation driver 260 executes the snapshot acquisition callback function of the key driver 240 for i=1 or the snapshot acquisition callback function of the device driver 250-(i−1) for i>1 as long as the value of the variable i is equal to or greater than 1. The fast activation driver 260 executes the snapshot acquisition callback functions of the device drivers 250-(i−1) for i>1 sequentially for one device driver after another in an order opposite to the order in which the snapshot acquisition callback functions have been registered.

If the determination result produced at the step S773 indicates that the value of the variable i is equal to 0, on the other hand, the flow of the processing procedure goes on to a step S776 at which the fast activation driver 260 makes a jump to the start address of the memory snapshot program 290.

Then, as an activation operation in a fast activation mode is carried out, a recovery from the fast activation loader 280 is carried out at a step S781. Subsequently, at the next step S782, the fast activation driver 260 sets the value of the variable i set at 1. Then, at the next step S783, the fast activation driver 260 produces a result of determination as to whether or not the value of the variable i is equal to or smaller than the value of the counter used for counting the number of callback functions registered in the callback-function table 14. If the result of the determination indicates that the value of the variable i is equal to or smaller than the value of the counter, the flow of the processing procedure goes on to a step S784 at which the fast activation driver 260 executes the fast-activation callback function of the key driver 240 for i=1 or the snapshot acquisition callback function of the device driver 250-(i−1) for i>1. Then, at the next step S785 the fast activation driver 260 increments the value of the variable i by 1. Subsequently, the flow of the processing procedure goes back to the step S783. In this way, by carrying out the processes of the steps S783 to S785, the fast activation driver 260 executes the fast-activation callback function of the key driver 240 for i=1 or the snapshot acquisition callback function of the device driver 250-(i−1) for i>1 as long as the value of the variable i is equal to or smaller than the value of the counter used for counting the number of callback functions registered in the callback-function table 14. The fast activation driver 260 executes the fast-activation callback functions of the device drivers 250-(i−1) for i>1 sequentially for one device driver after another in an order in which the snapshot acquisition callback functions have been registered.

If the determination result produced at the step S783 indicates that the value of the variable i is greater than the value of the counter used for counting the number of callback functions registered in the callback-function table 14, on the other hand, the flow of the processing procedure goes on to a step S786 at which the fast activation driver 260 validates other interrupts, accepting interrupts.

Figure 29:
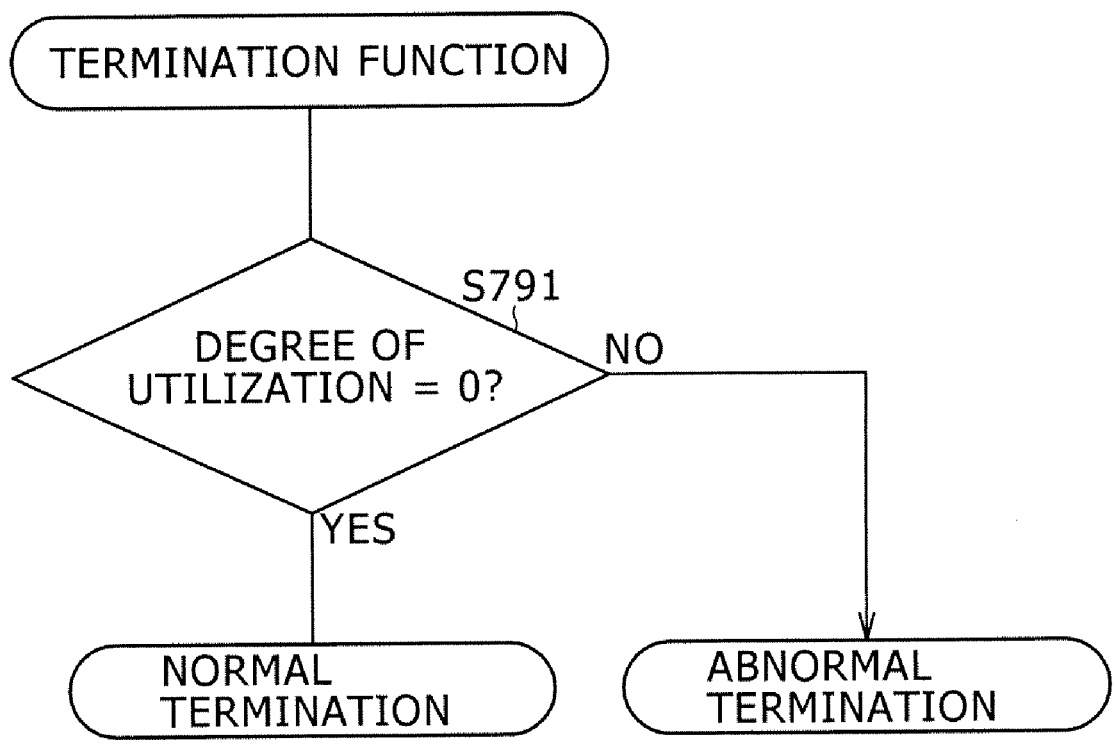
FIG. 29 is a diagram showing a typical entire processing procedure of a termination function in accordance with the embodiment of the present invention.

FIG. 29 is a diagram showing a typical entire processing procedure of the termination function executed by the fast activation driver 260 at the step S790 in accordance with the embodiment of the present invention.

As shown in the figure, the processing procedure begins with a step S791 at which the fast activation driver 260 produces a result of determination as to whether or not the degree of utilization is equal to 0. If the result of the determination indicates that the degree of utilization is equal to 0, the termination function executed by the fast activation driver 260 is ended in a normal termination process. If the result of the determination indicates that the degree of utilization is not equal to 0, on the other hand, the termination function executed by the fast activation driver 260 is ended in an abnormal termination process.

Figure 30:
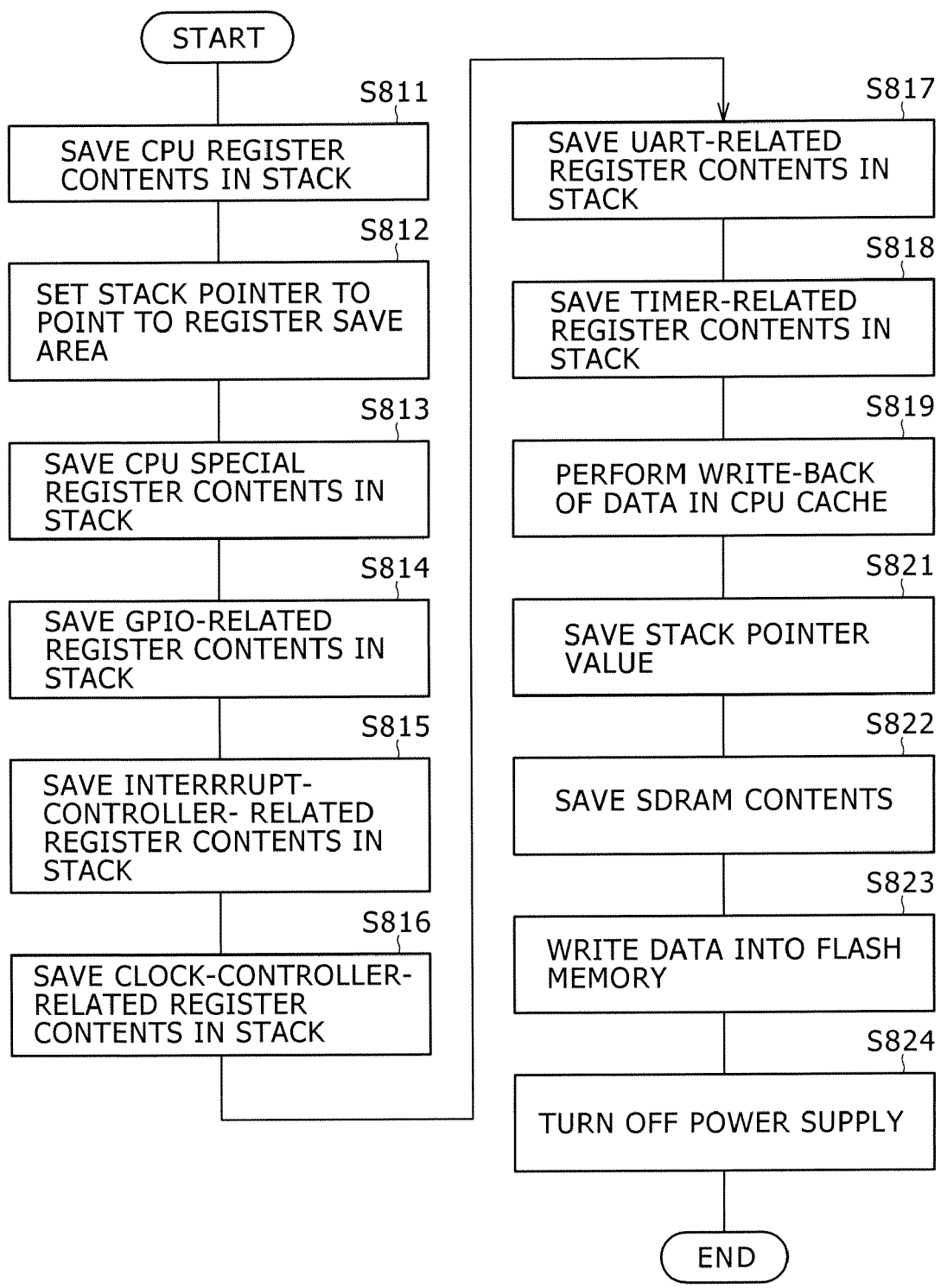
FIG. 30 is a diagram showing a typical procedure of entire processing carried out by a memory snapshot program in accordance with the embodiment of the present invention.

FIG. 30 is a diagram showing a typical procedure of entire processing carried out by the memory snapshot program 290 in accordance with the embodiment of the present invention.

As shown in the figure, the processing procedure begins with a step S811 at which the memory snapshot program 290 saves contents of every register employed in the CPU 110 in a stack. In general, the instruction set of a processor such as the CPU 110 includes an instruction named Push as an instruction for pushing the contents of a register employed in the processor into a stack. The processor registers, the contents of which are to be saved in a stack, vary from processor to processor. In the case of the embodiment, the CPU 110 is assumed to be a general-purpose processor. Thus, the contents of the registers employed in the CPU 110 need to be saved in the stack because, after a jump to the entry address of the memory snapshot program 290 at a fast activation time, the memory snapshot program 290 will store various kinds of data in the registers. It is to be noted that, depending on the operating system, a sufficiently large size of the stack is not assured. If the size of the stack is not sufficiently large, contents of registers other than those required as a minimum are stored in the register-content saving area 122.

Then, at the next step S812, the memory snapshot program 290 sets the stack pointer to point to the register-content saving area 122 after saving the previous value of the stack pointer at a specific address determined by the fast activation loader 280. That is to say, at the next step S813 and subsequent steps, the register-content saving area 122 will serve as a stack used for saving contents of a variety of registers others than the general-purpose registers employed in the CPU 110.

Then, at the next step S813, the memory snapshot program 290 saves contents of CPU special registers in the stack. The CPU special registers are registers employed in the CPU 110 as registers others than the general-purpose registers employed in the CPU 110. The CPU special registers also vary from CPU to CPU. In this case, the CPU special registers are assumed to be registers related to an MMU (Memory Management Unit) and a register, the contents of which points to an MMU table.

Then, at the next step S814, the memory snapshot program 290 saves contents of registers related to the GPIO in the stack. The GPIO-related registers, the contents of which are to be saved in the stack, are determined in a manner depending on the system. In the case of the embodiment, however, it is assumed that a group of such GPIO-related registers, the contents of which are to be saved in the stack, is determined that functions required by the embodiment as a minimum can be implemented. It is assumed that the registers related to the GPIO are used for storing data newly input from switches or the like in the case of the embodiment. Thus, previous contents of the registers related to the GPIO need to be saved in the stack.

Then, at the next step S815, the memory snapshot program 290 saves contents of registers related to an interrupt controller in the stack. The interrupt-controller-related registers, the contents of which are to be saved in the stack, are determined in a manner depending on the system. In the case of the embodiment, however, it is assumed that a group of such interrupt-controller-related registers, the contents of which are to be saved in the stack, is determined that functions required by the embodiment as a minimum can be implemented. It is assumed that the registers related to the interrupt controller are used for handling interrupts in the case of the embodiment. Thus, previous contents of the registers related to the interrupt controller need to be saved in the stack.

Then, at the next step S816, the memory snapshot program 290 saves contents of registers related to a clock controller in the stack. The clock-controller-related registers, the contents of which are to be saved in the stack, are determined in a manner depending on the system. In the case of the embodiment, however, it is assumed that a group of such clock-controller-related registers, the contents of which are to be saved in the stack, is determined that functions required by the embodiment as a minimum can be implemented. It is assumed that the registers related to the clock controller are used for handling clock signals in the case of the embodiment. Thus, previous contents of the registers related to the clock controller need to be saved in the stack.

Then, at the next step S817, the memory snapshot program 290 saves contents of registers related to a UART (Universal Asynchronous Receiver Transmitter) in the stack. The UART-related registers, the contents of which are to be saved in the stack, are determined in a manner depending on the system. In the case of the embodiment, however, it is assumed that a group of such UART-related registers, the contents of which are to be saved in the stack, is determined that functions required by the embodiment as a minimum can be implemented. It is assumed that the registers related to UART are used for handling asynchronous communications in the case of the embodiment. Thus, previous contents of the registers related to the UART need to be saved in the stack.

Then, at the next step S818, the memory snapshot program 290 saves contents of registers related to a timer in the stack. The timer-related registers, the contents of which are to be saved in the stack, are determined in a manner depending on the system. In the case of the embodiment, however, it is assumed that a group of such timer-related registers, the contents of which are to be saved in the stack, is determined that functions required by the embodiment as a minimum can be implemented. It is assumed that the registers related to the timer are used for handling timings in the case of the embodiment. Thus, previous contents of the registers related to the timer need to be saved in the stack.

Then, at the next step S819, the memory snapshot program 290 writes back data stored in a cache employed in the CPU 110 into a memory by copying the data from the cache to the memory, which is the SDRAM 120 in this case. Depending on the processor, the instruction set may include a cache write back instruction. Even if the instruction set does not include a cache write back instruction, a plurality of instructions can be used to carry out a cache write back operation. A cache write back operation is carried out in order to prevent a fast activation process from being no longer carried out correctly. This is because, without a cache write back operation, the SDRAM 120 may not contain necessary data so that a fast activation process can no longer be carried out.

Then, at the next step S821, the memory snapshot program 290 saves the value of the stack pointer at a specific absolute address determined by the fast activation loader 280.

Subsequently, at the next S822, the memory snapshot program 290 saves data stored in the SDRAM 120 into a memory. To put it concretely, for example, the memory snapshot program 290 saves data stored in the OS-use area 121 and the register-content saving area 122, which are included in the SDRAM 120, into a memory employed in the host PC 101 by way of the in-circuit emulator 102. It is to be noted that, if a memory management unit is employed, the memory management unit must be disabled in order to carry out the operation to save data stored in the SDRAM 120 into the memory by handling every address as a physical address.

Then, after saving the data stored in the SDRAM 120 into a memory employed in the host PC 101, at the next step S823, the memory snapshot program 290 transfers the data stored in the SDRAM 120 to the flash memory 130. To put it concretely, the memory snapshot program 290 stores the data, which has been saved at the step S822 from the OS-use area 121 of the SDRAM 120 into the memory employed in the host PC 101 by way of the in-circuit emulator 102, into the SDRAM image 135 included in the flash memory 130 as an OS-use area. On the other hand, the memory snapshot program 290 stores the data, which has been saved at the step S822 from the register-content saving area 122 of the SDRAM 120 into the memory employed in the host PC 101 by way of the in-circuit emulator 102, into the SDRAM image 136 included in the flash memory 130 as a register-content saving area.

Then, at the next step S824, the power supply of the information-processing apparatus 100 is turned off.

Figure 31:
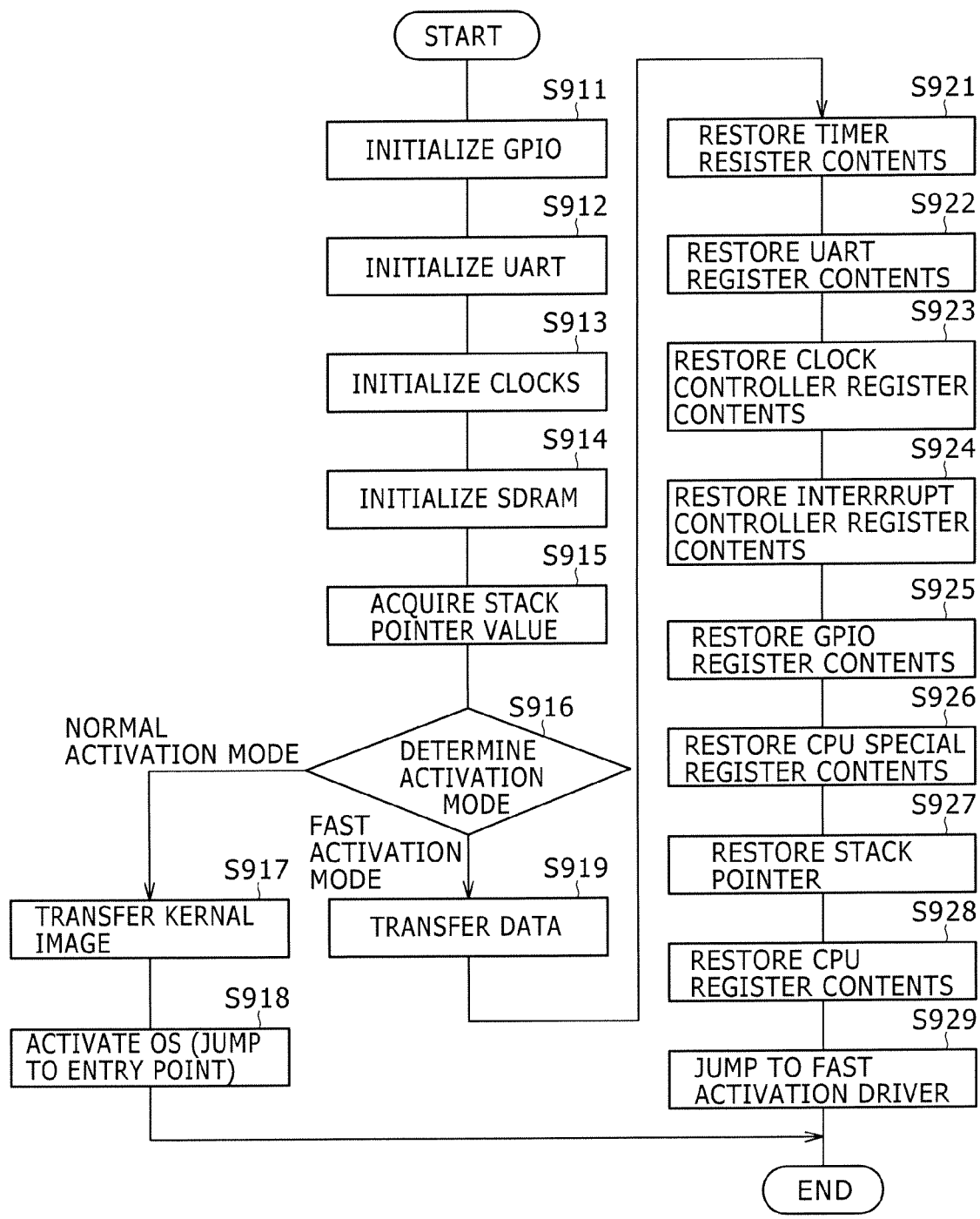
FIG. 31 is a diagram showing a typical procedure of entire processing carried out by a fast activation loader in accordance with the embodiment of the present invention.

FIG. 31 is a diagram showing a typical procedure of entire processing carried out by the fast activation loader 280 in accordance with the embodiment of the present invention.

As shown in the figure, the processing procedure begins with a step S911 at which the fast activation loader 280 initializes registers employed in the GPIO 150. This is because, in the case of the embodiment, the GPIO 150 is used to identify the activation mode. Then, at the next steps S912, S913 and S914 following the initialization of the GPIO 150, the fast activation loader 280 initializes registers employed in the UART, registers employed in a clock controller and the SDRAM 120 respectively. The processes of these steps are required as preparations of a process to transfer data from the flash memory 130 to the SDRAM 120.

Then, at the next step S915, the fast activation loader 280 acquires a value saved at the step S821 as the value of the stack pointer.

Subsequently, at the next step S916, the fast activation loader 280 retrieves the state of the activation-mode changeover switch 160 through the GPIO 150 in order to produce a result of determination as to whether the activation mode is the normal activation mode or the fast activation mode. If the result of the determination indicates that the activation mode is the normal activation mode, the flow of the processing procedure goes on to a step S917 at which the fast activation loader 280 transfers the kernel image 133 of the operating system to the OS-use area 121 of the SDRAM 120. Then, at the next step S918, the fast activation loader 280 activates the operating system in the normal activation mode by making a jump to the entry point of the operating system.

If the determination result produce at the step S916 indicates that the activation mode is the fast activation mode, on the other hand, the flow of the processing procedure goes on to a step S919 at which the fast activation loader 280 transfers data from the flash memory 130 to the SDRAM 120. To put it concretely, the fast activation loader 280 transfers data from the SDRAM image 135 included in the flash memory 130 to serve as an OS-use area to the OS-use area 121 of the SDRAM 120 and data from the SDRAM image 136 included in the flash memory 130 to serve as a register-content saving area to the register-content saving area 122 of the SDRAM 120. It is to be noted that the data can be transferred by execution of software. If a hardware transfer function such as the DMA (Direct Memory Access) function is provided, however, this function can also be used for transferring the data in order to increase the data-transfer speed.

Then, at the next steps S921 to S926, the fast activation loader 280 restores the contents of timer registers, the contents of UART registers, the contents of clock controller registers, the contents of interrupt controller registers, the contents of GPIO registers and the contents of CPU special registers respectively by acquiring the contents from the stack.

Subsequently, at the next step S927, the fast activation loader 280 acquires a value saved in the stack at the step S812 as the value of the stack pointer and restores the value to the stack pointer. Then, at the next step S928, the fast activation loader 280 restores the contents of every register employed in the CPU 110 by acquiring the contents from the stack.

Subsequently, at the next step S929, the fast activation loader 280 makes a jump to the fast activation driver 260. The jump to the fast activation driver 260 is seen from the whole flow as a jump to the same address as a return address saved at the step S776 when making a function call for calling the memory snapshot program 290.

As described above, in accordance with the embodiment of the present invention, data stored in the SDRAM 120 at the time the snapshot switch 170 is pressed is saved in the flash memory 130 in advance as an execution state of a program execution point to be used as a recovery point. Thus, by recovering the data of the SDRAM 120 from that saved in the flash memory 130 at an activation time, the information-processing apparatus 100 can be activated in a short period of time.

That is to say, in accordance with the embodiment of the present invention, unlike the process to save an execution state existing at the end of a preceding process as is the case with the conventional hibernation, an execution state at a recovery point set arbitrarily is saved in advance in order to make it possible to complete a recovery in a short period of time. Thus, by setting an arbitrary execution state in advance at a time the product is shipped from the factory for example, the user can have an activation screen shown in a short period of time on the basis of the saved execution state.

Next, modified versions of the embodiment of the present invention are explained by referring to diagrams as follows.

Figure 32:
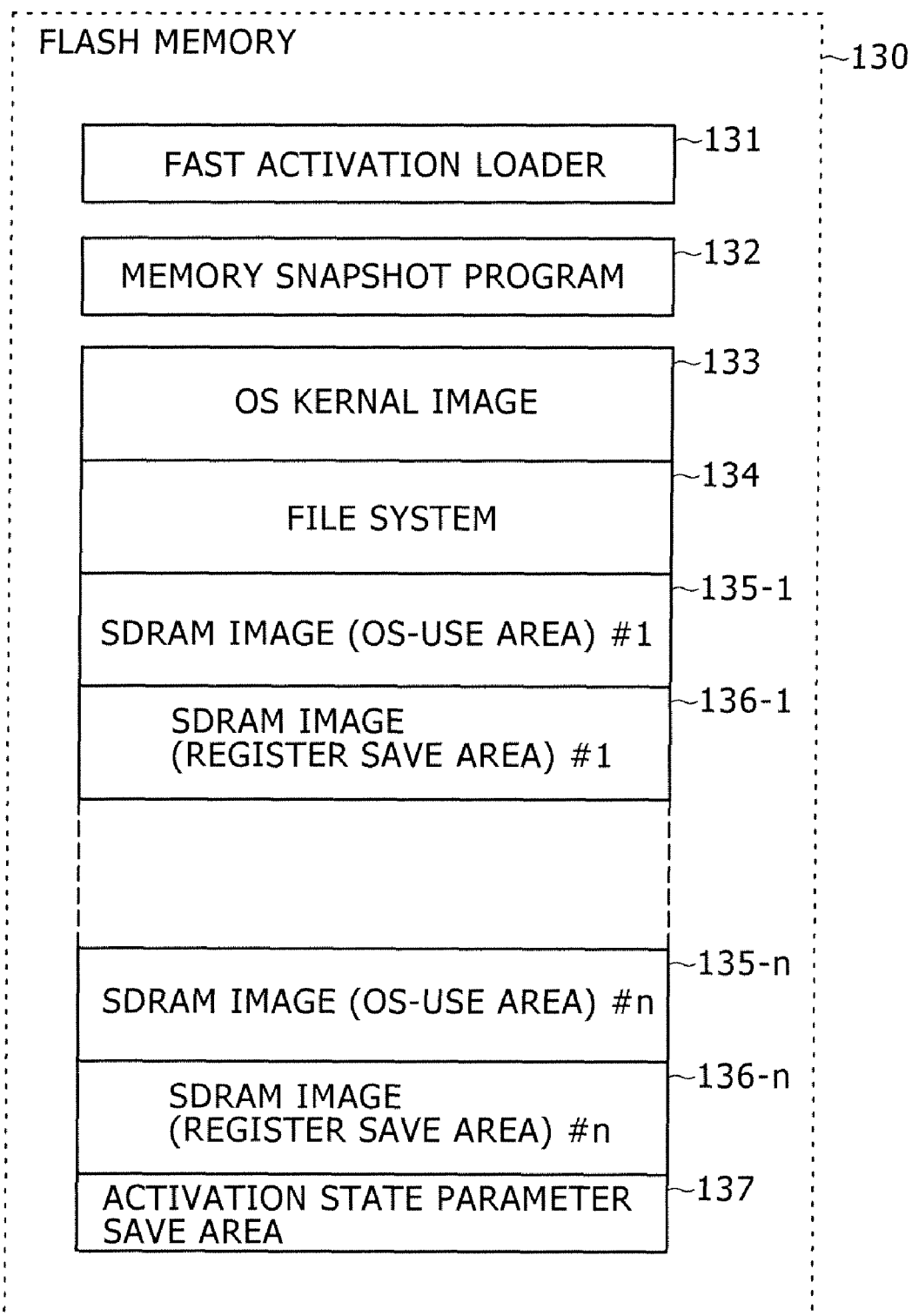
FIG. 32 is a diagram showing the memory map of a flash memory according to a first modified version of the embodiment of the present invention.

FIG. 32 is a diagram showing the memory map of the flash memory 130 according to a first modified version of the embodiment of the present invention.

In the case of the first modified version, as shown in the figure, the flash memory 130 includes n SDRAM images 135-1 to 135-n each used as an OS-use area and n SDRAM images 136-1 to 136-n each used as register-content saving area. That is to say, n pairs of SDRAM images are saved in the flash memory 130 in advance and, at a fast activation time, one of the n pairs of SDRAM images is selected to be used as a state of execution.

Thus, in the case of the first modified version, the activation-mode changeover switch 160 is provided as a switch to be operated to select the normal activation mode or the fast activation mode in the same way as the embodiment of the present invention, and an activation state parameter saving area 137 is provided in the flash memory 130 as an area used for storing one of n types of mode as a parameter of the fast activation mode. In the following description, the n types of mode are referred to as fast activation modes #1 to #n respectively. The fast activation loader 280 recognizes a value stored in the activation state parameter saving area 137 as the parameter of the fast activation mode and selects a pair of SDRAM images stored in the flash memory 130 as a pair to be restored in the SDRAM 120. It is to be noted that a multi-function activation-mode changeover switch 160 can also be provided. By operating the multi-function activation-mode changeover switch 160, the user is capable of specifying one of the n types of mode or one of fast activation modes #1 to #n.

Figure 33:
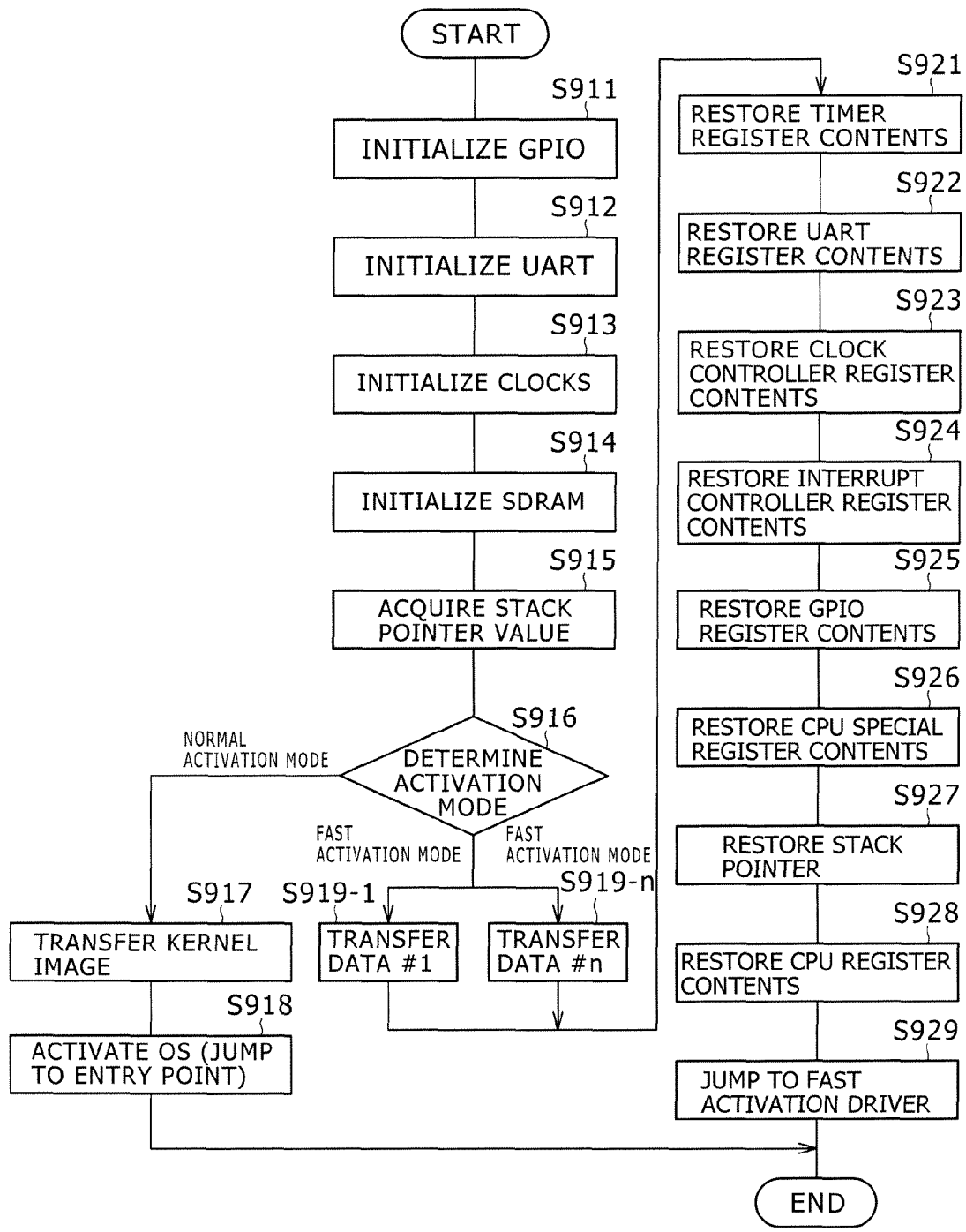
FIG. 33 is a diagram showing a typical procedure of entire processing carried out by a fast activation loader in accordance with the first modified version of the embodiment of the present invention.

FIG. 33 is a diagram showing a typical procedure of the entire processing carried out by the fast activation loader 280 in accordance with the first modified version of the embodiment of the present invention.

The processing to transfer data in the fast activation mode in the first modified version is different from that in the processing procedure represented by the flowchart shown in FIG. 31 as the processing procedure for the embodiment of the present invention. To be more specific, in the case of the first modified version, the parameter of the fast activation mode is also recognized at the step S916 in order to determine which fast activation mode is to be adopted. If the parameter of fast activation mode #i, where i is an integer, is recognized, the SDRAM image 135-i stored in an OS-use area of the flash memory 130 and the SDRAM image 136-i stored in a register-content saving area of the flash memory 130 are transferred to the SDRAM 120.

As described above, in the case of the first modified version of the embodiment implementing the present invention, a plurality of areas each used for storing a pair of fast activation images are provided in the flash memory 130 and a pair of fast activation images is selected in accordance with a parameter stored in the activation state parameter saving area 137 as the parameter indicating the fast activation mode as a pair of fast activation images to be restored into the SDRAM 120. The activation-mode changeover switch 160 can be operated to select one of a plurality of fast activation images in order to change an interface provided initially to the user. For example, the user can specify either of a photographing mode screen or a viewing mode screen as the initial screen of a digital still camera.

Figure 34:
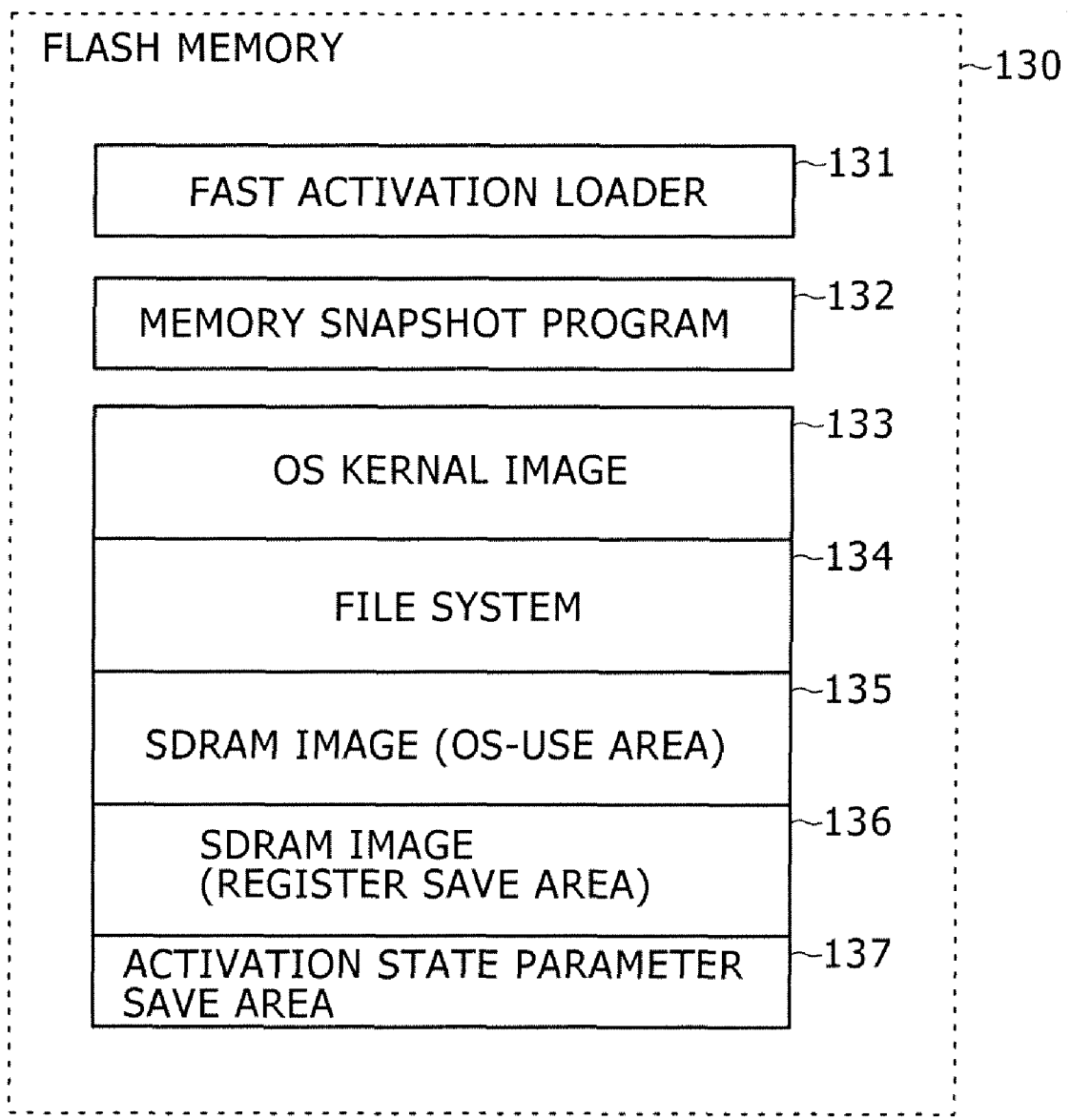
FIG. 34 is a diagram showing the memory map of a flash memory according to a second modified version of the embodiment of the present invention.

FIG. 34 is a diagram showing the memory map of the flash memory 130 according to a second modified version of the embodiment of the present invention.

In the case of the second modified version, as shown in the figure, the flash memory 130 also includes an activation state parameter saving area 137. That is to say, additional processing to be carried out after fast activation processing is selected in accordance with a parameter stored in the activation state parameter saving area 137.

Figure 35:
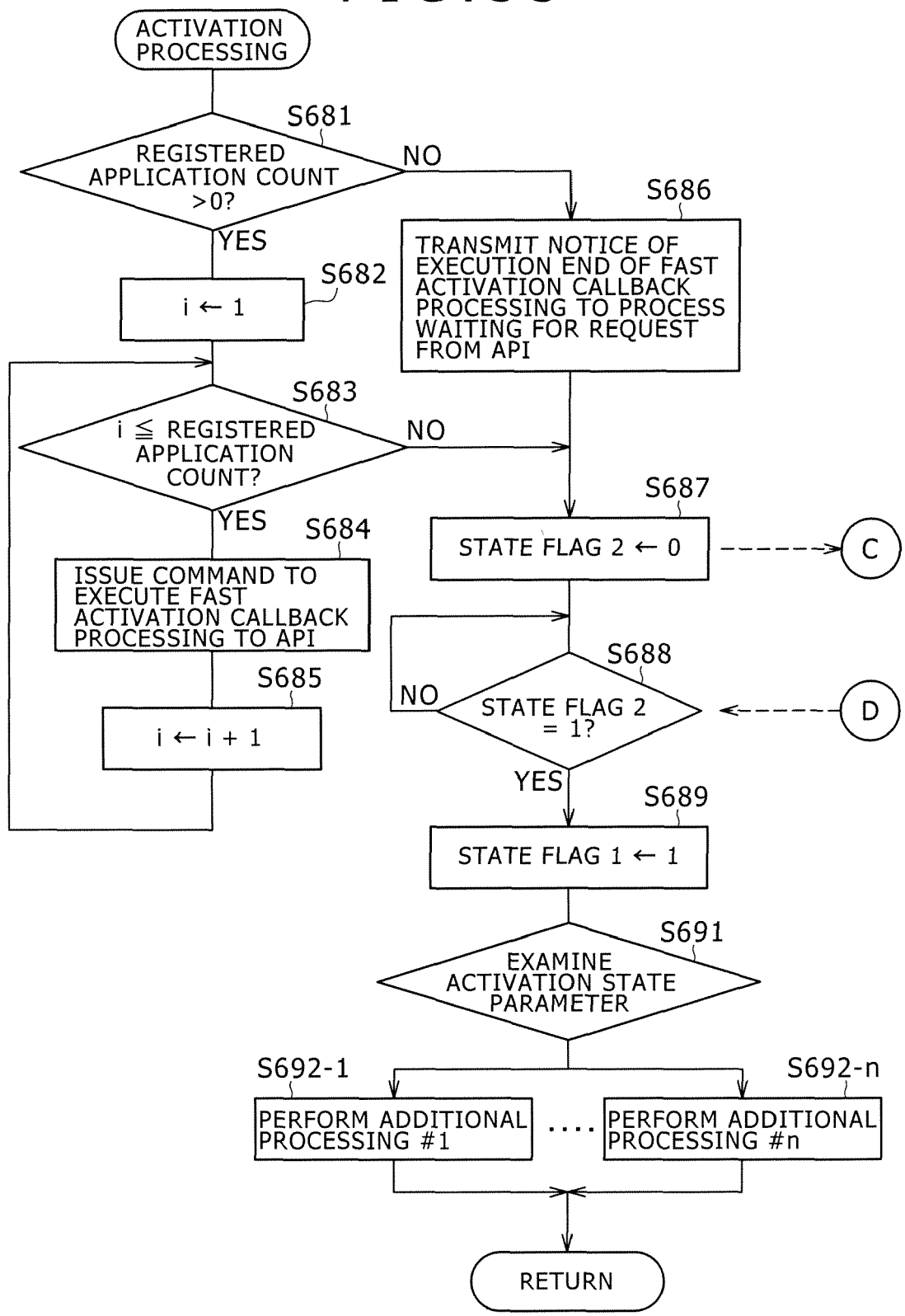
FIG. 35 is a diagram showing a typical procedure of entire fast activation processing according to the second modified version of the embodiment of the present invention.

FIG. 35 is a diagram showing a typical procedure of the entire fast activation processing carried out at the step S680 by the fast activation daemon 230 in accordance with the second modified version of the embodiment of the present invention.

In the case of the second modified version, a step S691 is added to the processing procedure represented by the flowchart shown in FIG. 20 as the processing procedure for the embodiment of the present invention. At this step, the parameter stored in the activation state parameter saving area 137 is recognized. Then, in accordance with the value of the parameter, additional processing is carried out at one of steps 692-1 to 692-n following the step S691. In the additional processing, either of a script or a command, which generally exist on the file system 134, is executed in order to carry out a function peculiar to the activation mode corresponding to the parameter stored in the activation state parameter saving area 137. In the case of the second modified version, it is assumed that the recovery in the activation mode corresponding to the parameter stored in the activation state parameter saving area 137 cannot be made by merely restoring the SDRAM image 135 stored in the operating system-use area of the flash memory 130 and the SDRAM image 136 stored in the register-content saving area of the flash memory 130 without carrying out the peculiar function. It is to be noted that a multi-function activation-mode changeover switch 160 can also be provided. By operating the multi-function activation-mode changeover switch 160, the user is capable of specifying one of n types of additional processing or one of additional processing #1 to additional processing #n.

As described above, in the case of the second modified version of the embodiment implementing the present invention, an activation state parameter saving area 137 and only one activation image is stored in the flash memory 130. In accordance with the value of the parameter stored in the activation state parameter saving area 137, additional processing is selected and carried out. For example, the second modified version is useful for an apparatus in which processing to initialize an LCD (Liquid Crystal Display) unit employed in the apparatus is shared as common processing by a plurality of fast activation modes and additional processing is provided for each of the fast activation modes.

It is to be noted that the embodiment of the present invention and the modified versions are each no more than a typical concrete implementation of the present invention. The embodiment of the present invention and the modified versions are each associated with a characteristic described in a claim appended to this patent specification as a characteristic of the present invention. However, the scope of the present invention is by no means limited to the embodiment of the present invention and the modified versions. That is to say, it is possible to provide further modifications within a domain not deviating from essentials of the present invention.

To be more specific, in an information-processing apparatus according to the embodiment of the present invention, an execution-state holding unit, a return-point setting unit, an execution-state saving unit and an execution-state transfer unit typically correspond to the execution-state holding unit 12, the return-point setting unit 17, the execution-state saving unit 13 and the transfer control unit 11 respectively.

In an information-processing apparatus according to a modified version of the embodiment, a callback function registration unit corresponds to the callback-function table 14.

In an information-processing apparatus according to another modified version of the embodiment, an activation mode setting unit typically corresponds to the activation-mode setting unit 16.

In an information-processing apparatus according to a further modified version of the embodiment, an activation mode setting unit and an activation processing unit typically correspond to the activation-mode setting unit 16 and the activation unit 15 respectively.

In an information-processing apparatus according to a still further modified version of the embodiment, an execution-state holding unit, a return-point setting unit and an execution-state saving unit typically correspond to the execution-state holding unit 12, the return-point setting unit 17 and the execution-state saving unit 13 respectively.

In an information processing method provided in accordance with another embodiment of the present invention as the information processing method of an information-processing apparatus, a procedure for setting a program execution point to be restored after activation of the information-processing apparatus at an execution point prior to the activation typically corresponds to the step S670. A procedure for saving an execution state, which is held by an execution-state holding unit of the information-processing apparatus at a program execution point to be restored after activation of the information-processing apparatus, prior to activation typically corresponds to the steps S811 to S823. A procedure for transferring a saved execution state at an activation time typically corresponds to the steps S919 to 928.

It is to be noted that each of the processing procedures according to the other embodiment of the present invention can be interpreted as a method having a sequence of procedures. In addition, each of the sequences of procedures can be interpreted as a program to be executed by a computer or interpreted as a recording medium used for storing such a program.

What is claimed is:

1. An information-processing apparatus comprising:
a computer including a processor;
an execution-state holding unit configured to hold an execution state of a program executed by said computer;
a callback function registration unit configured to register a snapshot acquisition callback function for said program, said snapshot acquisition callback function including a process to execute said program to a delimiter point of said program and to acquire a program snapshot at said delimiter point;
a return-point setting unit configured to set a return execution point of said program, said return execution point to be restored to continue execution from said return execution point after activation of said information-processing apparatus, prior to said activation;
an execution-state saving unit configured to save an execution state held by said execution-state holding unit as a program execution state at said return execution point to be restored to continue execution from said return execution point after said activation, prior to said activation; and
an execution-state transfer unit configured to transfer said execution state saved by said execution-state saving unit to said execution-state holding unit at said activation.

2. The information-processing apparatus according to claim 1, wherein
said execution state includes contents of each register employed in said information-processing apparatus and data stored in a memory managed by an operating system executed in said information-processing apparatus.

3. The information-processing apparatus according to claim 1, wherein
said return-point setting unit is capable of setting an execution point, which is executed when a predetermined operation is carried out, as an execution point at which said program executing is to be restored after said activation.

4. The information-processing apparatus according to claim 1, wherein
said execution-state saving unit includes a non-volatile memory.

5. The information-processing apparatus according to claim 1, wherein
the callback function registration unit is further configured to register a fast-activation callback function to be executed at said return execution point set by said return-point setting unit at said activation.

6. The information-processing apparatus according to claim 1, further comprising:
an activation-mode setting unit configured to set an activation mode selected from N activation modes, where N is an integer equal to at least 2, as a mode to be adopted at said activation, wherein
said execution-state saving unit is configured to save N execution states respectively associated with said N activation modes, and
said execution-state transfer unit transfers said execution state of said N execution states associated with said selected activation mode to said execution-state holding unit at said activation.

7. The information-processing apparatus according to claim 1, further comprising:
an activation-mode setting unit configured to set an activation mode selected from N activation modes, where N is an integer equal to at least 2, as a mode to be adopted at said activation; and
an activation process unit configured to select said activation mode set in advance in accordance with said activation-mode setting unit and activate said information processing apparatus based on said selected activation mode set.

8. An information-processing apparatus comprising:
a computer including a processor;
an execution-state holding unit configured to hold an execution state of a program executed by said computer;
a callback function registration unit configured to register a snapshot acquisition callback function for said program, said snapshot acquisition callback function including a process to execute said program to a delimiter point of said program and to acquire a program snapshot at said delimiter point;
a return-point setting unit configured to set a return execution point of a program, said return execution point to be restored to continue execution from said return execution point after activation of said information-processing apparatus, prior to said activation; and
an execution-state saving unit configured to save an execution state held by said execution-state holding unit as a program execution state at said return execution point to be restored to continue execution from said return execution point after said activation, prior to said activation.

9. A method for activating an information-processing apparatus including a computer and an execution-state holding unit configured to hold an execution state of a program executed by said computer, said method for activating said information-processing apparatus comprising:

registering a snapshot acquisition callback function for a program, said snapshot acquisition callback function including a process to execute said program to a delimiter point of said program and to acquire a program snapshot at said delimiter point;
setting, by a processor of said information processing apparatus, a return-point as a return execution point of said program, said return execution point to be restored to continue execution from said return execution point after activation of said information-processing apparatus, prior to said activation;
saving an execution state held by said execution-state holding unit as a program execution state at said return execution point to be restored to continue execution from said return execution point after said activation, prior to said activation;
transferring said execution state saved by said execution-state saving step to said execution-state holding unit at said activation time.

10. A non-transitory computer readable medium storing an apparatus activation program of an information-processing apparatus which, when executed by a processor, directs said processor to perform:
registering a snapshot acquisition callback function for a program, said snapshot acquisition callback function including a process to execute said program to a delimiter point of said program and to acquire a program snapshot at said delimiter point;
setting a return-point as a return execution point of said program, said return execution point to be restored to continue execution from said return execution point after activation of said information-processing apparatus, prior to said activation;
saving an execution state to an execution-state saving unit as a program execution state at said return execution point to be restored to continue execution from said return execution point after said activation, prior to said activation; and
transferring said execution state saved by said execution-state saving step to an execution-state holding unit at said activation time.

11. The information-processing apparatus according to claim 5, wherein
a plurality of programs are executed by said computer;
a plurality of drivers are executed by said computer; said callback function registration unit is further configured to
register a program snapshot acquisition callback function for each program executed by said computer,
register a driver snapshot acquisition callback function for each driver executed by said computer, and
execute a memory snapshot acquisition program.

12. The information-processing apparatus according to claim 11, wherein
said program and driver snapshot acquisition callback functions are registered in an order to satisfy dependence among said programs and drivers.

13. The information-processing apparatus according to claim 11, wherein
said callback function registration unit is further configured to, after notification that a program has ended, delete a registered program snapshot acquisition callback function associated with said ended program.

* * * * *